US012587949B2

(12) United States Patent
Chitrakar et al.

(10) Patent No.: US 12,587,949 B2
(45) Date of Patent: Mar. 24, 2026

(54) COMMUNICATION APPARATUS AND COMMUNICATION METHOD FOR EHT VIRTUALIZATION WITH MULTI-LINK DEVICES

(71) Applicant: Panasonic Intellectual Property Corporation of America, Torrance, CA (US)

(72) Inventors: Rojan Chitrakar, Singapore (SG); Lei Huang, Singapore (SG); Yoshio Urabe, Nara (JP)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 629 days.

(21) Appl. No.: 18/002,443

(22) PCT Filed: Jun. 1, 2021

(86) PCT No.: PCT/SG2021/050310
§ 371 (c)(1),
(2) Date: Dec. 19, 2022

(87) PCT Pub. No.: WO2021/262092
PCT Pub. Date: Dec. 30, 2021

(65) Prior Publication Data
US 2023/0232315 A1 Jul. 20, 2023

(30) Foreign Application Priority Data
Jun. 22, 2020 (SG) ............................ 10202005958Q

(51) Int. Cl.
*H04W 48/12* (2009.01)
*H04L 12/46* (2006.01)
(Continued)

(52) U.S. Cl.
CPC ......... *H04W 48/12* (2013.01); *H04L 12/4641* (2013.01); *H04W 48/16* (2013.01); *H04W 76/15* (2018.02)

(58) Field of Classification Search
CPC ..... H04W 48/12; H04W 48/16; H04W 76/15; H04L 12/4641
See application file for complete search history.

(56) References Cited

U.S. PATENT DOCUMENTS

| | | | |
|---|---|---|---|
| 2019/0215884 A1* | 7/2019 | Patil | .................... H04W 74/004 |
| 2019/0268956 A1* | 8/2019 | Xiao | .................... H04W 76/15 |

(Continued)

OTHER PUBLICATIONS

Cariou et al., "Multi-Link Discovery—Part 2," 20/0390r3, Feb. 13, 2020. (14 pages).

(Continued)

*Primary Examiner* — Blake J Rubin
(74) *Attorney, Agent, or Firm* — Seed Intellectual Property Law Group LLP

(57) ABSTRACT

Communication devices and methods for EHT virtualization for MLD devices. are provided. One exemplary embodiment provides an Access Point (AP) included in a plurality of APs affiliated with an AP Multi-link Device (MLD), wherein each of the plurality of APs advertises a Basic Service Set Identifier (BSSID), and provides a link identified by a Link Identifier (ID), the AP comprising: circuitry, which in operation, generates a frame carrying a multi-link element containing information about the AP MLD and the plurality of APs; and a transmitter, which in operation, transmits the frame on a link, the Multi-link element indicating a Link ID of the link on which the frame is transmitted.

20 Claims, 50 Drawing Sheets

2100

(51) Int. Cl.
　　*H04W 48/16*　　　(2009.01)
　　*H04W 76/15*　　　(2018.01)

(56)　　　　　References Cited

U.S. PATENT DOCUMENTS

| | | | |
|---|---|---|---|
| 2019/0335454 A1 | 10/2019 | Huang et al. | |
| 2021/0014911 A1* | 1/2021 | Patil ...................... | H04L 1/1621 |
| 2021/0051574 A1* | 2/2021 | Chu ....................... | H04W 84/18 |
| 2021/0298102 A1* | 9/2021 | Kwon ................... | H04W 48/08 |
| 2021/0337613 A1* | 10/2021 | Seok ..................... | H04W 76/15 |
| 2022/0255774 A1* | 8/2022 | Jia ....................... | H04L 12/4641 |

OTHER PUBLICATIONS

Gan et al., "BSS parameter update for Multi-link Operation," IEEE 802.11-20/0503-02-00be, Apr. 1, 2020. (14 pages).

International Search Report, mailed Aug. 17, 2021, for International Patent Application No. PCT/SG2021/050310. (4 pages).

Jang et al., "Indication of Multi-link Information," IEEE 802.11-20/0028r6, Jan. 13, 2020. (14 pages).

Chu et al., "EHT BSS with Wider BW," Doc.: IEEE 802.11-20/0396r0, Mar. 1, 2020, 12 pages.

Singaporean Invitation to Respond to Written Opinion dated Jul. 19, 2024, for the corresponding Singaporean Patent Application No. 11202261444P, 11 pages.

Extended European Search Report, dated Oct. 16, 2023, for European Patent Application No. 21829145.8-1216. (11 pages).

Chitrakar et al., Panasonic Corporation, "Multi-link Element Format," IEEE 802.11-20/0772r0, May 11, 2020. (9 pages).

Chu et al., NXP, "EHT BSS with Wider BW," IEEE 802.11-20/0396r3, Mar. 1, 2020. (11 pages).

* cited by examiner

Broadcast Data frame (AP-1)

Broadcast Management frame (AP-1)

MAC frames (AP-1)

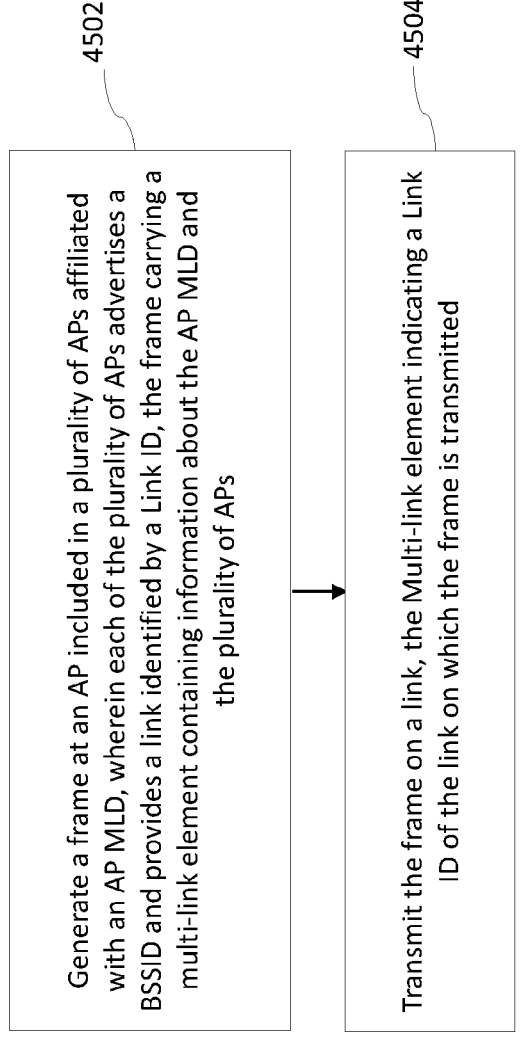

Generate a frame at an AP included in a plurality of APs affiliated with an AP MLD, wherein each of the plurality of APs advertises a BSSID and provides a link identified by a Link ID, the frame carrying a multi-link element containing information about the AP MLD and the plurality of APs

4502

Transmit the frame on a link, the Multi-link element indicating a Link ID of the link on which the frame is transmitted

COMMUNICATION APPARATUS AND COMMUNICATION METHOD FOR EHT VIRTUALIZATION WITH MULTI-LINK DEVICES

BACKGROUND

1. Technical Field

The present embodiments generally relate to communication apparatuses, and more particularly relate to methods and apparatuses for Extra High Throughput (EHT) virtualization for multi-link devices (MLDs).

2. Description of the Related Art

In the standardization of next generation wireless local area network (WLAN), a new radio access technology having backward compatibilities with IEEE 802.11a/b/g/n/ac/ax technologies has been discussed in the IEEE 802.11 Working Group and is named 802.11be Extremely High Throughput (EHT) WLAN.

In IEEE 802.11be EHT WLAN, in order to provide better link adaptation and higher throughput over 802.11ax high efficiency (HE) WLAN, it is desired to increase the maximum channel bandwidth from 160 MHz to 320 MHz, increase the maximum number of space-time streams from 8 to 16, and support multi-link operation.

Further, in order to enable multi-link operations between an access point (AP) multi-link device (MLD) and a non-AP MLD, multi-link setup may be performed over one of the supported links to establish association for affiliated stations (STAs) in one or more links. Virtual APs (VAPs) may also be implemented.

However, there has been no discussion so far concerning EHT virtualization for MLD devices especially with regards to interconnections with Virtual LANs (VLANs).

There is thus a need for communication apparatuses and methods that can solve the above mentioned issue. Furthermore, other desirable features and characteristics will become apparent from the subsequent detailed description and the appended claims, taken in conjunction with the accompanying drawings and this background of the disclosure.

SUMMARY

Non-limiting and exemplary embodiments facilitate providing communication apparatuses and communication methods for EHT virtualization for MLD devices.

According to an aspect of the present disclosure, there is provided an Access Point (AP) included in a plurality of APs affiliated with an AP Multi-link Device (MLD), wherein each of the plurality of APs advertises a Basic Service Set Identifier (BSSID) and provides a link identified by a Link Identifier (ID), the AP comprising: circuitry, which in operation, generates a frame carrying a multi-link element containing information about the AP MLD and the plurality of APs; and a transmitter, which in operation, transmits the frame on a link, the Multi-link element indicating a Link ID of the link on which the frame is transmitted.

According to another aspect of the present disclosure, there is provided a non-AP Station (STA) included in a plurality of non-AP STAs affiliated with a non-AP MLD, the non-AP STA comprising: circuitry, which in operation, generates a Probe Request frame carrying a Multi-link element containing a MLD MAC Address of an AP MLD and one or more Link IDs of links affiliated with the AP MLD; and a transmitter, which in operation, transmits the Probe Request frame to request information about the AP MLD and the one or more links of the AP MLD.

According to another aspect of the present disclosure, there is provided a communication method comprising: generating a frame at an AP included in a plurality of APs affiliated with an AP MLD, wherein each of the plurality of APs advertises a BSSID and provides a link identified by a Link ID, the frame carrying a multi-link element containing information about the AP MLD and the plurality of APs; and transmitting the frame on a link, the Multi-link element indicating a Link ID of the link on which the frame is transmitted.

It should be noted that general or specific embodiments may be implemented as a system, a method, an integrated circuit, a computer program, a storage medium, or any selective combination thereof. Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

The accompanying figures where like reference numerals refer to identical or functionally similar elements throughout the separate views and which together with the detailed description below are incorporated in and form part of the specification, serve to illustrate various embodiments and to explain various principles and advantages in accordance with present embodiments.

FIG. 45 shows a flow diagram illustrating a method for EHT virtualization for MLD devices according to various embodiments.

Skilled artisans will appreciate that elements in the figures are illustrated for simplicity and clarity and have not necessarily been depicted to scale.

DETAILED DESCRIPTION

The following detailed description is merely exemplary in nature and is not intended to limit the embodiments or the application and uses of the embodiments. Furthermore, there is no intention to be bound by any theory presented in the preceding Background or this Detailed Description. Furthermore, other desirable features and characteristics will become apparent from the subsequent detailed description and the appended claims, taken in conjunction with the accompanying drawings and this background of the disclosure.

VAPs enable a physical AP to act as two or more logical APs. Generally, all VAPs in a network operate on a same channel. BSSIDs (basic service set identifiers) corresponding to different VAPs typically have different settings (security, Quality of Service (QoS) etc.).

There are two main ways to implement VAPs:

Legacy method (Co-hosted BSSID): Each VAP transmits unique Beacon frames.

Multiple BSSID: A single Beacon frame is transmitted carrying information of all VAPs. The BSSID that transmits the Beacon frame is a transmitting BSSID while the rest are non-transmitting BSSIDs. A maximum of 8 VAPs can be supported.

A VLAN logically groups together two or more devices regardless of their physical presence in a wired network. VLAN allows devices on a same physical network to be partitioned into separate broadcast domains for simplicity, better security, traffic management, etc. Each VLAN is identified by a VLAN ID. One of the primary objectives for implementing a VLAN is to reduce broadcast traffic. The specification for VLAN is standardized by IEEE 802.1Q.

A common way to extend a VLAN to wireless LANs is to create a separate service set identifier (SSID) for each VLAN. It is also possible that more than one VLAN are mapped to a SSID. Each SSID is then mapped to a VAP (BSSID). Frames destined for different VLANs are transmitted by the VAPs wirelessly on different SSIDs, thus ensuring that only the clients associated with that VLAN receive those packets.

Figure 1:
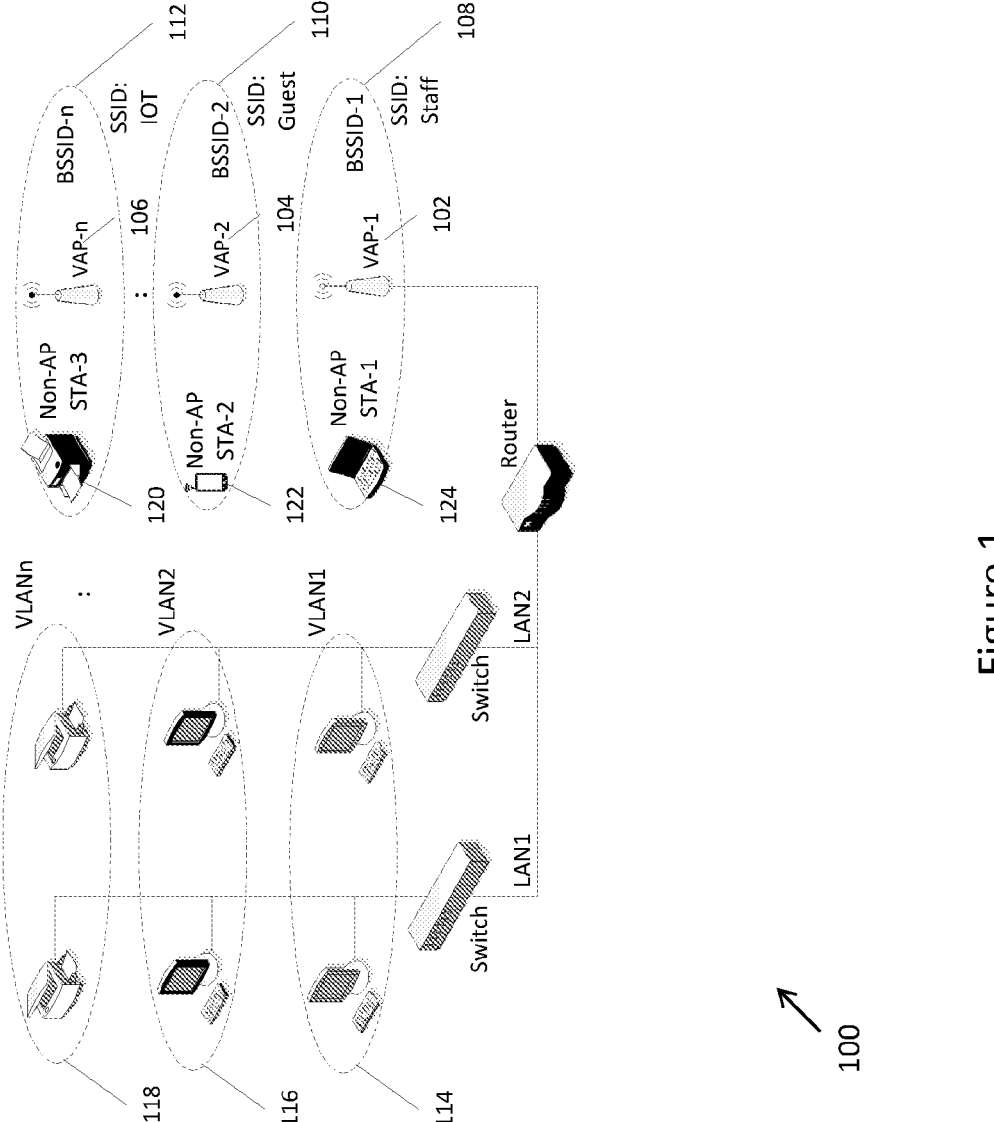
FIG. 1 illustrates an implementation of VLANs according to an example.

FIG. 1 illustrates an example of how VLANs can be implemented. There are n VAPs in network 100, namely VAP-1 102, VAP-2 104 up to VAP-n 106. BSSID-1 108 corresponds to VAP-1 102, BSSID-2 110 corresponds to VAP-2 104 and BSSID-n 112 corresponds to VAP-n 106. There are also n VLANs in the network, namely VLAN1 114, VLAN2 116 up to VLANn 118. For example, VLAN1 114 is designated for staff and is mapped to SSID: Staff, VLAN2 116 is designated for guests and is mapped to SSID: Guest, and VLANn 118 is designated for IOT (Internet of Things) usage and is mapped to SSID: IOT. Each of these SSIDs is then mapped to a VAP. SSID: Staff is mapped to VAP-1 102 (or BSSID-1 108), SSID: Guest is mapped to VAP-2 104 (or BSSID-2 110) and SSID: IOT is mapped to VAP-n 106 (or BSSID-n 112). Even though all the VAPs and non-AP STAs are operating on the same channel, only non-AP STA-1 120 can receive packets transmitted by VAP-1 102, only non-AP STA-2 122 can receive packets transmitted by VAP-1 104, and only non-AP STA-n 124 can receive packets transmitted by VAP-1 106.

Figure 2:
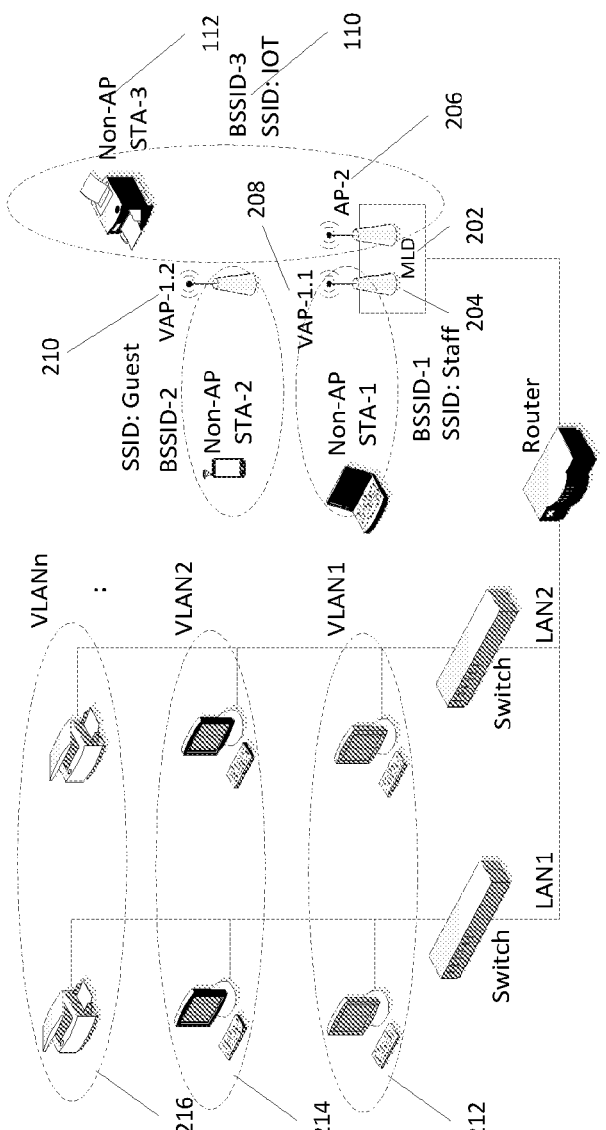
FIG. 2 illustrates an implementation of a network according to an example.

Typically a VLAN is mapped to a SSID; in legacy systems, there is one to one mapping of BSSID and SSID, hence it is straightforward. For MLDs, however, mapping of SSIDs to BSSIDs is not clear as there can be multiple methods for doing so. Referring to an exemplary system as shown in FIG. 2, AP MLD 202 comprises of AP-1 204 and AP-2 206. AP-1 204 operates two virtual APs: VAP-1.1 208 and VAP-1.2 210. This allows AP MLD 202 having only two physical APs (AP-1 204 and AP-2 206) to support 3 SSIDs (SSID: Staff, SSID: Guest and SSID: IOT) or VLANs (VLAN1 212, VLAN2 214 and VLANn 216). However, in such deployments it is not possible to support non-AP MLDs since non-AP MLDs concurrently operate on multiple links, and could theoretically join multiple SSIDs but they should not be allowed to join multiple SSIDs at the same time due to security and other considerations.

To address the above-mentioned issues, the present disclosure proposes a two-tiered approach to implement virtualization using MLDs. Further, unified signalling that can support different virtualization architectures and usage is proposed to enable MLDs to quickly find information about other links of a peer link (for example, during Discovery, Multi-link setup etc.).

In a Tier 1 virtualization, the APs of an AP MLD are grouped into two or more AP groups to create multiple virtual AP MLDs from a single AP MLD. There is a single MLD MAC Address and a single MAC-SAP (medium access control— service access point) to the DS (distribution service). There can be 2 or more SSIDs per AP MLD and multiple virtual networks per AP MLD. Advantageously, Tier 1 virtualization is suitable for small deployments that only need few virtual networks, e.g. home networks or small businesses. The implementation is simple and there are less hardware requirements. SSID reconfigurations are also easier as there is no need to re-define MLDs.

In a Tier 2 virtualization, co-located APs are grouped into two or more AP groups to create multiple AP MLDs. There can be multiple MLD MAC-SAP to the DS and multiple MLD MAC Addresses, one per AP MLD. There is a single SSID per AP MLD and one AP MLD per virtual network. An advantage of Tier 2 virtualization is its suitability for large deployments that need more virtual networks, e.g. enterprise networks or big venues e.g. airports. However, implementation can be complicated and hardware requirements are higher as compared to Tier 1 virtualization.

Figure 3:
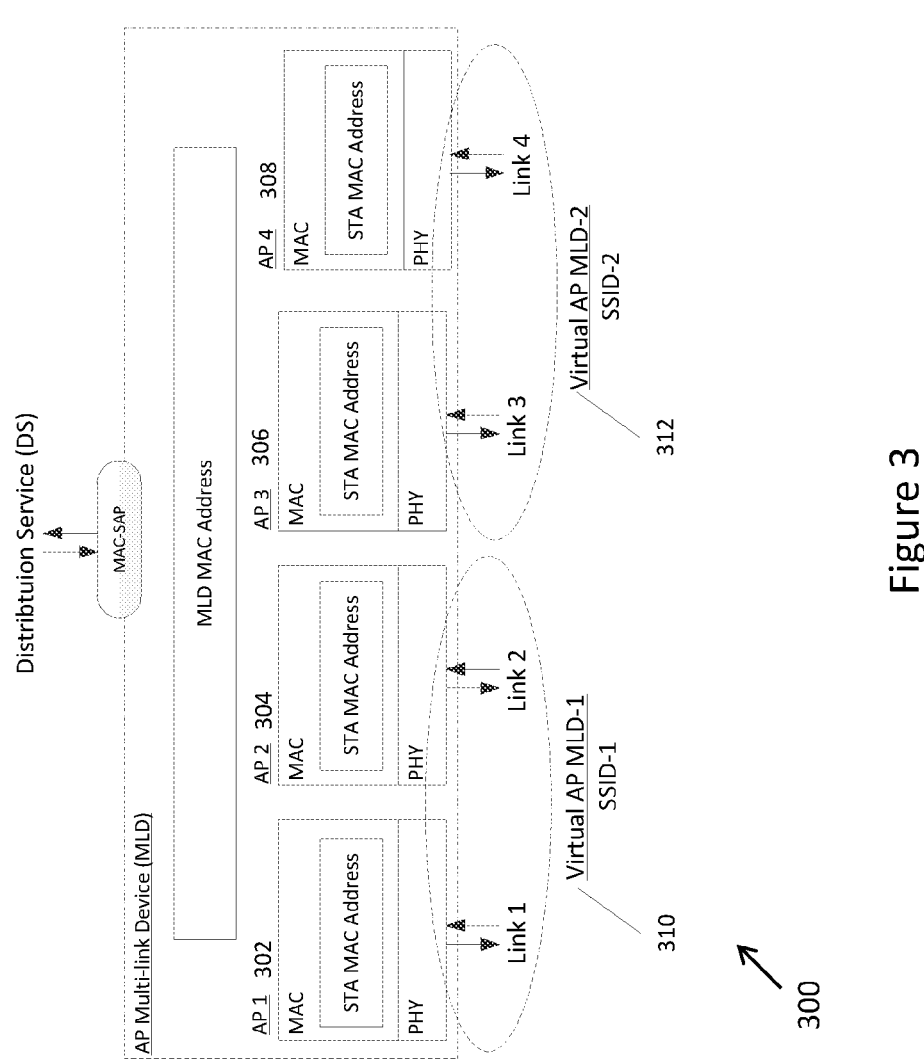
FIG. 3 depicts an illustration of an AP MLD having a Tier 1 virtualization in accordance with various embodiments.

FIG. 3 depicts an illustration of an AP MLD 300 implementing a Tier 1 virtualization in accordance with various embodiments. AP MLD 300 comprises of AP-1 302, AP-2 304, AP-3 306 & AP-4 308. AP-1 302 & AP-2 304 form the virtual AP MLD-1 310, while AP-3 306 and AP-4 308 form the virtual AP MLD-2 312. Further, virtual AP MLD-1 310 is mapped to a SSID-1 while virtual AP MLD-2 312 is mapped to a SSID-2. In other words, the APs of the AP MLD 300 are grouped into two or more AP groups to create multiple virtual AP MLDs from a single AP MLD. Each group of APs is mapped to a unique SSID, such that all the APs of a virtual AP MLD advertise the same SSID, thus allowing 2 or more SSIDs per AP MLD. In this Tier-1 virtualization example, there is a single MLD MAC Address and a single MAC-SAP to the DS. Non-AP MLDs are only allowed to perform multi-link setup for links that are part of the same virtual AP MLD (i.e. same SSID). IDs may also be assigned to the virtual MLDs for easier identification purpose.

Figure 4A:
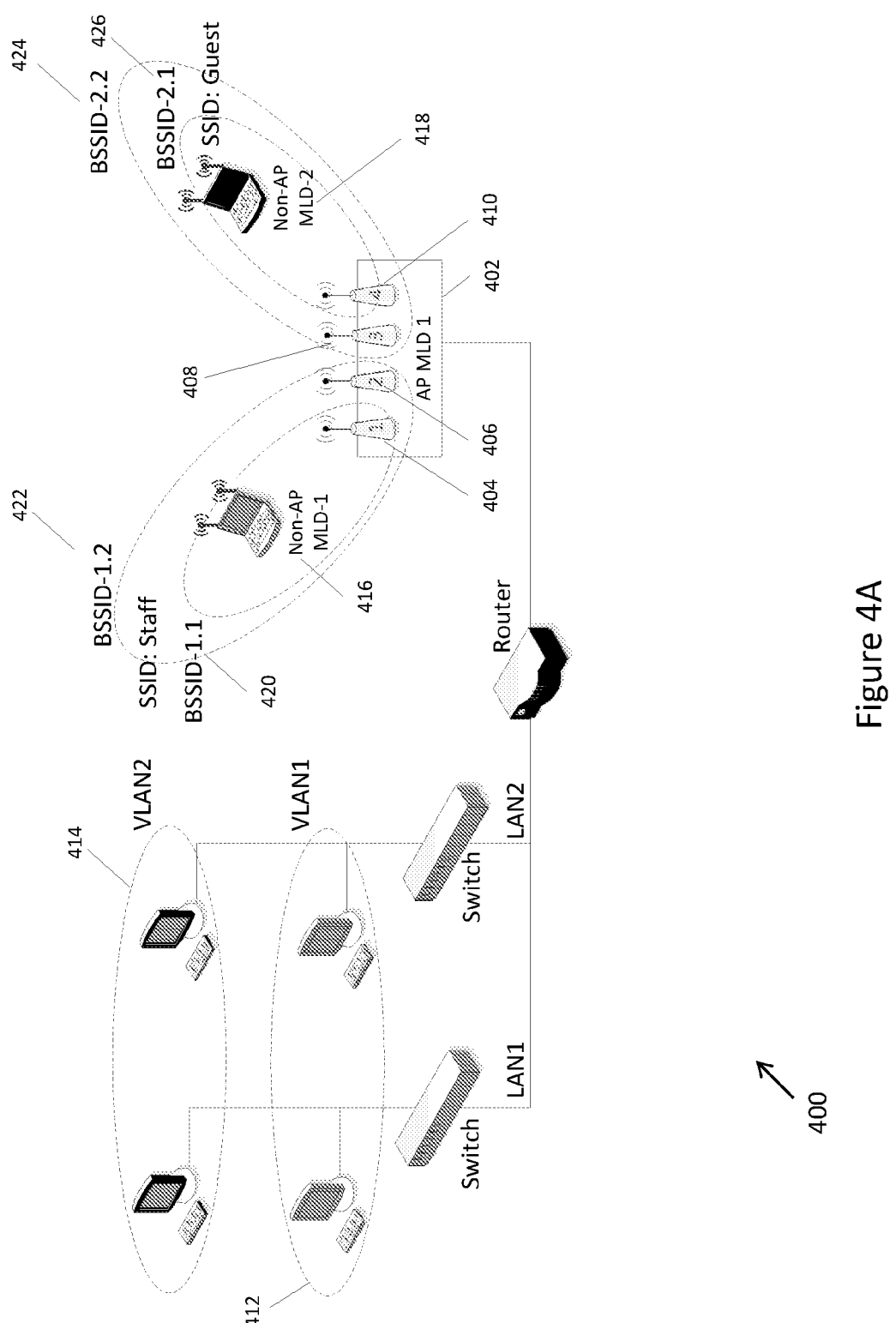
FIGS. 4A and 4B illustrate an implementation of a network having Tier 1 virtualization only with physical APs in accordance with various embodiments.
Figures 4B, 4C:
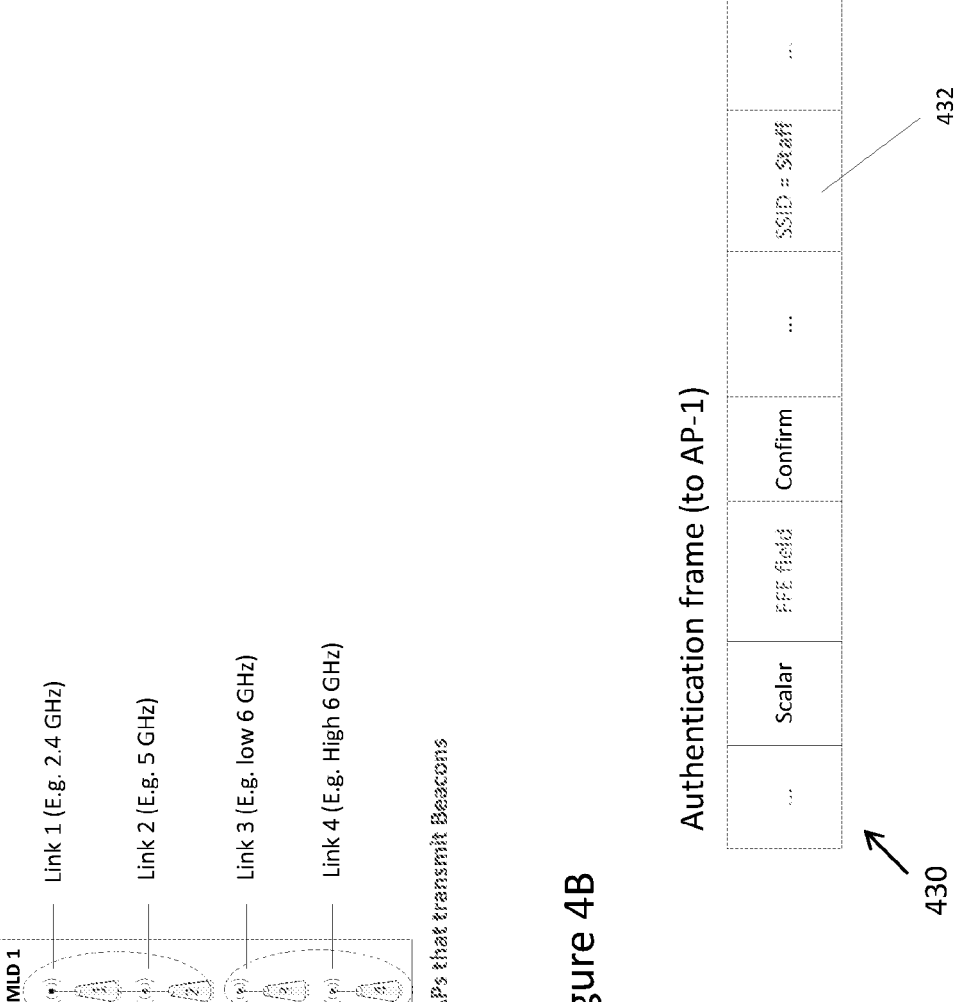
FIG. 4C illustrates an Authentication frame that is used to request authentication for a specific SSID.

FIGS. 4A and 4B illustrate an implementation of a network 400 having Tier 1 virtualization only with physical APs in accordance with various embodiments. In network 400 of FIG. 4A, 4 physical APs of AP MLD 402 are divided into 2 groups. AP-1 404 (corresponding to BSSID-1.1 420) and AP-2 406 (corresponding to BSSID-1.2 422) advertise SSID: Staff. AP-3 408 (corresponding to BSSID-2.2 424) and AP-4 410 (corresponding to BSSID-2.1 426) advertise SSID: Guest. SSID: Staff is mapped to VLAN1 412 while SSID: Guest is mapped to VLAN2 414. In other words, the AP MLD 402 bridges wireless frames between the APs and the VLANs such that each SSID is mapped to a corresponding VLAN. Non-AP MLD-1 416 is associated with SSID: Staff, while non-AP MLD-2 418 is associated with SSID: Guest. FIG. 4B shows an alternate view of the 4 APs. AP-1 404, AP-2 406, AP-3 408 and AP-4 410 operate on link 1, 2, 3 and 4 with Link IDs 1, 2, 3 and 4 respectively. A Link ID uniquely identifies the BSSID of an AP affiliated with an AP MLD. A Link ID is also associated with the Operating channel (i.e. Operating class and Channel number) associated with the BSSID, but the Link ID remains the same even if the operating channel changes. In this example, the wireless network represented by SSID Staff runs over Links 1 & 2, while the wireless network represented by SSID Guest runs over Links 3 & 4. An example of MAC addresses for the AP MLD 402 and the 4 APs are shown below:

MLD MAC Address=0A-20;

BSSID-1.1 (AP-1)=0A-21; BSSID-1.2 (AP-2)=0A-22;

BSSID-2.1 (AP-3)=0D-21; BSSID-2.2 (AP-4)=0D-22;

For brevity, the MAC Addresses are only shown as 2 Octets instead of the full 6 Octets. Advantageously, this implementation for network 400 is simple and is suitable for AP MLDs with 3 or more APs. However, only a limited number of VLANs can be supported using this method.

As a further analysis, the implementation of network 400 is equivalent to logically splitting an MLD into 2 virtual MLDs. During discovery, different APs can advertise different SSIDs. For Multi-link setup, the Non-AP MLD only requests to setup links belonging to SSID of interest. In terms of security, Group Keys (GTK/IGTK) are allowed to be different for different links, so there is no issue. Pairwise Keys (PTK) is same for all links, but there is also no issue since PTK is only for a single non-AP MLD. However all SSIDs will have the same security scheme (e.g. WPA-2). In some security associations, such as simultaneous authentication of equals (SAE), the SSID of a network and the corresponding password are used in the generation of the session specific Password Element of an ECC group (PWE). Specifically, the SSID and password is used to generate the pwd-seed, which in turn is used to generate the PWE:

$$pwd\text{-}seed=HKDF\text{-}Extract(ssid,password[\|identifier])$$

Here, HKDF-Extract is the hash function as defined in IETF RFC 5869, and ([\|identifier]) indicates the optional inclusion of a password identifier, if present. In such cases, although the security associations between different non-AP MLDs and AP MLD happen over the same MAC-SAP, different non-AP MLDs will use different SSID & password combinations to generate the PWE depending on which SSID the non-AP MLDs are joining. Since the PWE is used in the SAE commit messaged (during Authentication), in such cases the non-AP MLD or a non-AP STA also includes the SSID field in the Authentication frame so as to explicitly inform the AP MLD for which SSID it is requesting authentication. This is illustrated in FIG. 4C in which the non-AP MLD indicates in the Authentication frame 430 transmitted by the non-AP MLD to an AP MLD that it is requesting authentication for the network Staff by including the SSID field 432 set to Staff in the Authentication frame 430. Since the AP MLD is made aware which SSID the non-AP MLDs are joining, there is no confusion at the AP MLD side on how to generate the PWE.

In regards to interconnection with VLANs, one VLAN ID is mapped to a SSID. The MLD needs to ensure that incoming frames (from DS) are sent to the correct SSID (BSSIDs) based on their VLAN ID, while correct VLAN IDs are attached to outgoing frames (to DS) based on SSID (BSSIDs) on which the frames are received. MLDs may also assign virtual MLD ID to each SSID (or VLAN) but there is just one MLD MAC address and one MAC SAP to DS. The constraint is that APs of a virtual MLD should not advertise different SSIDs. Otherwise, non-AP MLDs associated with the virtual MLD will receive frames from multiple VLANs. Thus, it is possible to segment an MLD to map to two or more VLANs. However, the number of VLANs that can be supported is low (Maximum number is only half the number of APs).

Figures 5A, 5B:
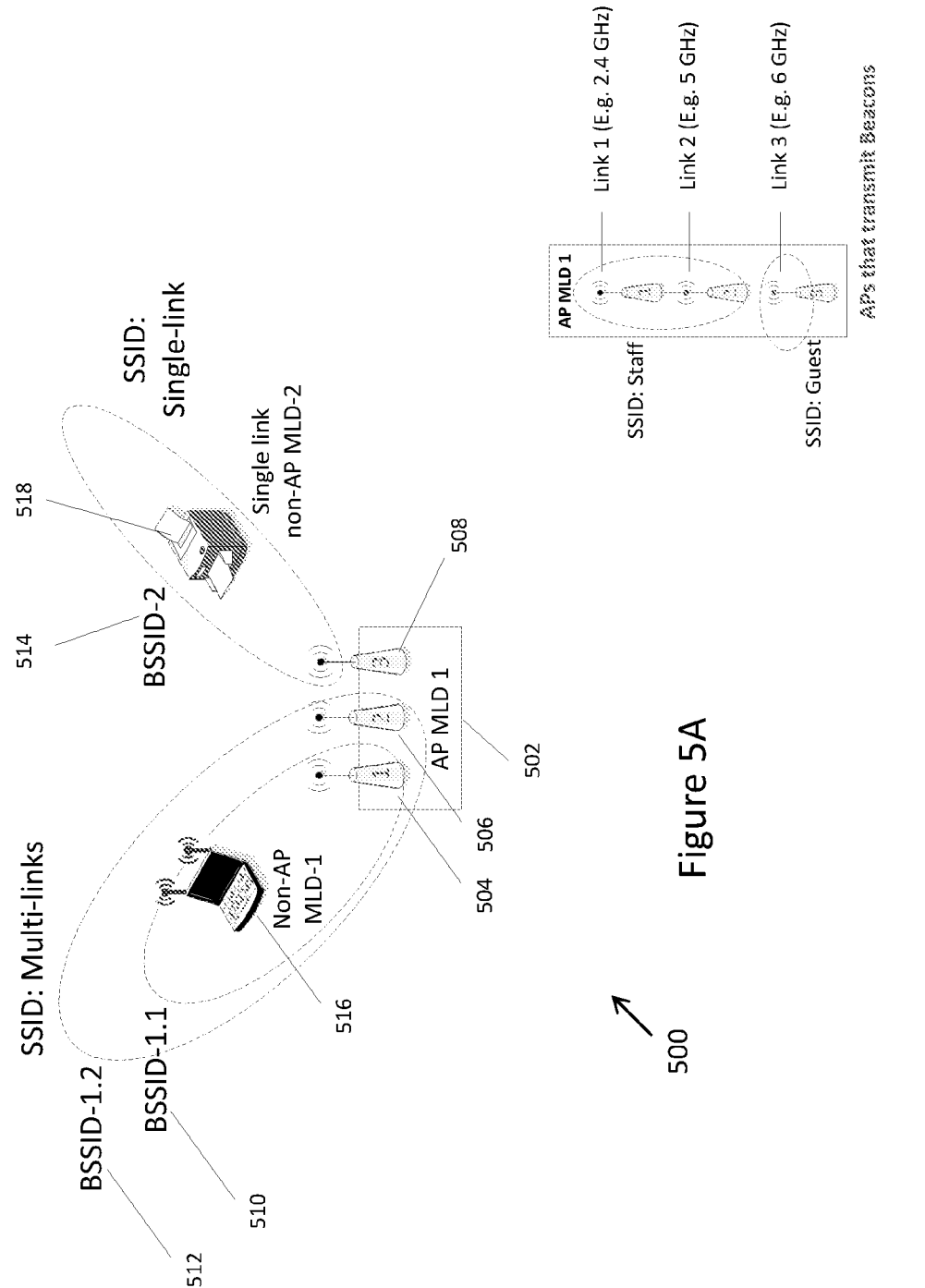
FIGS. 5A and 5B illustrate an implementation of a network having Tier 1 virtualization without any interconnection to VLANs in accordance with various embodiments.

FIGS. 5A and 5B illustrate an implementation of a network 500 having Tier 1 virtualization without any interconnection to VLANs in accordance with various embodiments. In network 500 of FIG. 5A, AP MLD 502 provides 2 virtual networks based on device types: one for regular MLDs, one for single-link MLDs and legacy STAs. 3 physical APs of AP MLD 502 are divided into 2 groups. AP-1 504 (corresponding to BSSID-1.1 510) and AP-2 506 (corresponding to BSSID-1.2 512) advertise SSID: Multi-links and caters for Multi-link non-AP MLDs such as non-AP MLD-1 516. AP-3 508 (corresponding to BSSID-2 514) advertise SSID: Single-link and caters to legacy STAs and Single Link MLDs i.e. MLDs that are capable of switching between multiple links but can only operate on one link at any given time, such as single link non-AP MLD-2 518. Non-AP MLD-1 516 is associated with SSID: Multi-links while the single link non-AP MLD-2 518 is associated with SSID: Single-link. FIG. 5B shows an alternate view of the 3 APs. AP-1 504, AP-2 506 and AP-3 508 operate on links 1, 2 and 3 with Link IDs 1, 2 and 3 respectively.

Figure 6A:
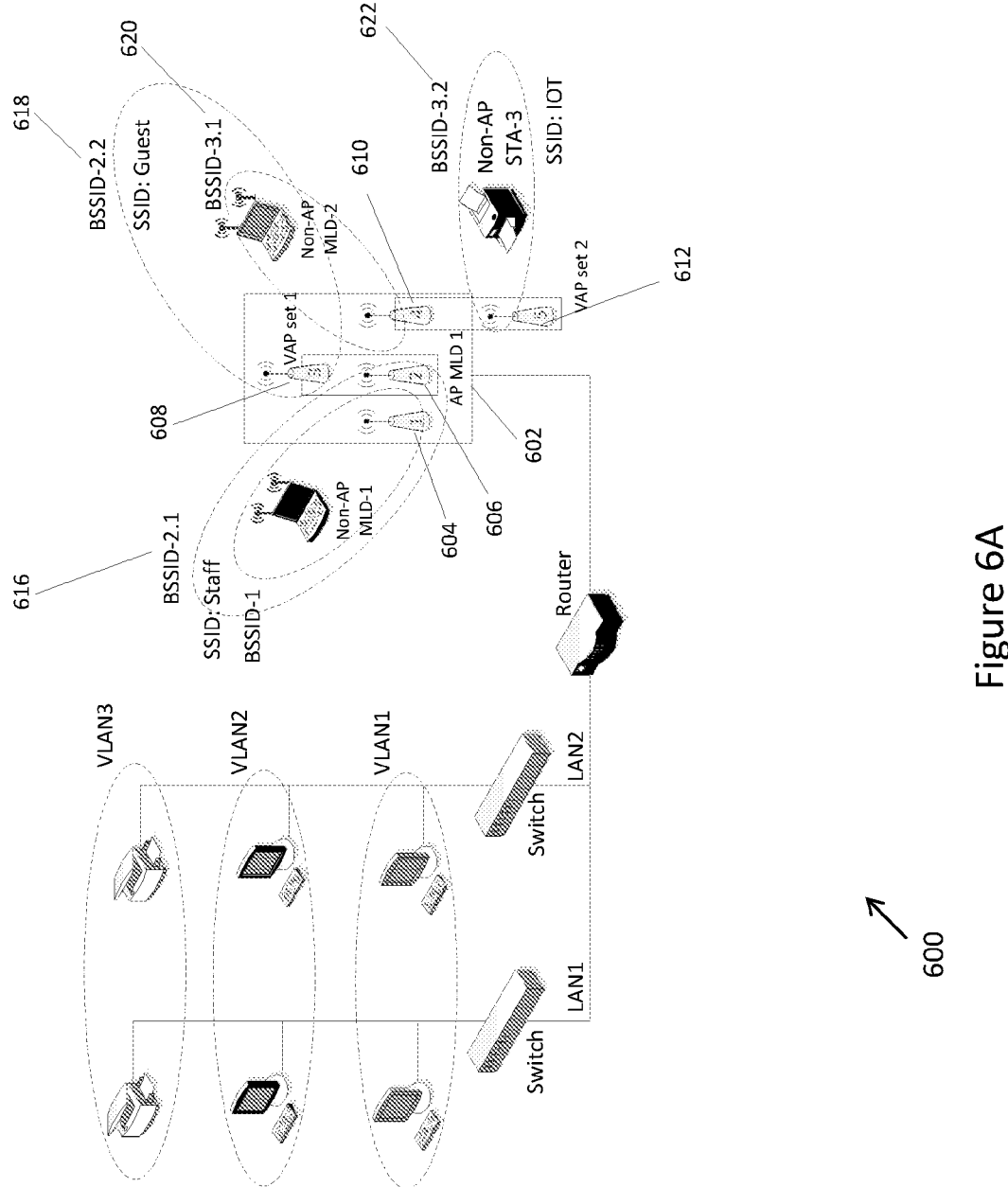
FIGS. 6A and 6B illustrate an implementation of a network having Tier 1 virtualization using a combination of physical APs and VAPs in accordance with various embodiments.
Figure 6B:
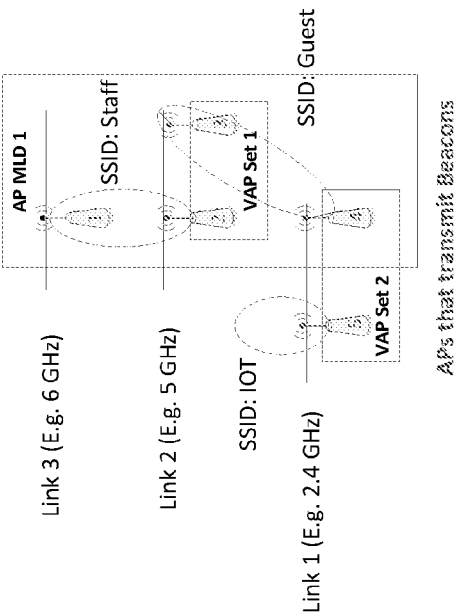

FIGS. 6A and 6B illustrate an implementation of a network 600 having Tier 1 virtualization using a combination of physical APs and VAPs in accordance with various embodiments. In network 600 of FIG. 6A, 1 Physical AP and 2 sets of VAPs of an MLD are divided into 3 SSIDs. AP MLD 602 comprises of AP-1 604, VAP-2 606, VAP-3 608 & VAP-4 610. VAP-5 612 is a standalone AP. AP-1 604 (corresponding to BSSID-1 614) and VAP-2 606 (corresponding to BSSID-2.1 616) advertise SSID: Staff; VAP-3 608 (corresponding to BSSID-2.2 618) and VAP-4 610 (corresponding to BSSID-3.1 620) advertise SSID: Guest. Standalone VAP-5 612 (corresponding to BSSID-3.2 622) advertises SSID: IOT. SSID: Staff is mapped to VLAN1 624, SSID: Guest is mapped to VLAN2 626 and SSID: IOT is mapped to VLAN3 628. In other words, the AP MLD 602 bridges wireless frames between the APs and the VLANs such that each SSID is mapped to a corresponding VLAN. Non-AP MLD-1 630 joins the network with SSID: Staff, non-AP MLD-2 632 joins the network with SSID: Guest. STA-3 634 joins the network with SSID: IOT.

VAP-2 606 & VAP-3 608 are virtual APs of the same AP and form a VAP Set 1. VAP-4 610 & VAP-5 612 are virtual APs of the same AP and form a VAP Set 2. Further, AP-1 604 & VAP-2 606 form a VAP MLD-1 (virtual AP MLD-1), while VAP-3 608 and VAP-4 610 form a VAP MLD-2. VAPs may be member of a co-hosted BSSID set or member of a Multiple BSSID set. In this example, the VAPs are implemented as Multiple BSSIDs. VAP-2 606 & VAP-3 608 are members of Multiple BSSID set 1 comprising BSSID-2.1 616 and BSSID-2.2 618, while VAP-4 610 & VAP-5 612 are members of Multiple BSSID set 2 comprising BSSID-3.1 620 and BSSID-3.2 622. In these Multiple BSSID sets, transmitting BSSIDs correspond to VAP-3 608 and VAP-5 612; nontransmitting BSSIDs correspond to VAP-2 606 and VAP-4 610. AP-1 604, VAP-3 608 and VAP-5 612 transmit Beacon frames. Even though multiple APs/VAPs may operate on the same link (frequency channel), different Link IDs may be assigned to the APs/VAPs. FIG. 6B shows an alternate view of the 5 APs/VAPs. AP-1 604 operates on link 3, VAP-2 606 and VAP-3 608 operate on link 2, while VAP-4 610 and VAP-5 612 operate on link 1. AP-1 604, VAP-2 606, VAP-3 608 and VAP-5 612 are assigned with Link IDs 1, 2, 3 and 4 respectively. An example of MAC addresses for the AP MLD 602 and the 5 APs/VAPs are shown below:

MLD MAC Address=0A-20;

BSSID-1 (AP-1)=0A-21;

BSSID-2.1 (VAP-2)=0D-21; BSSID-2.2 (VAP-3)=0D-22;

BSSID-3.1 (VAP-4)=0E-21; BSSID-3.2 (VAP-5)=0E-22;

Advantageously, it is possible to extend an MLD by using VAPs and map to two or more VLANs with this implementation of network 600. However, the number of VLANs that can be support is low (Maximum number of VLANs=Number of Physical APs).

As a further analysis, the implementation of network 600 is equivalent to logically expanding an MLD into 2 virtual MLDs & 1 standalone AP. During discovery, VAPs can advertise different SSIDs without any issues. For Multi-link setup, all APs of the MLD (including VAPs) advertise the same MLD address. However, different VAPs operate on different links (even though some of them operate on the same channel). In terms of security, different VAPs should have different Group Keys (GTK/IGTK). In regards to interconnection with VLANs, one VLAN ID is mapped to a SSID (and to a Virtual MLD). There is a single MLD MAC address and one MAC SAP to DS. Virtual MLD ID can be used for faster translation between VLAN IDs and SSIDs. The constraint is that APs of a virtual MLD should not advertise different SSIDs. Otherwise, non-AP MLDs associated with the virtual MLD will receive frames from multiple VLANs. Thus, it is possible to extend an MLD by using VAPs and map to two or more VLANs. However, the number of VLANs that can be supported is low, with the maximum number being the number of Physical APs. Another point to note for such deployment as shown in FIGS. 6A and 6B, is that since VAPs that belong to the same VAP set (either co-hosted BSSID set or Multiple BSSID set), are part of the same AP MLD, and since they cannot transmit and receive at the same time, special coordination is required between the virtual MLDs for multi-link transmission. For example, when AP1 604 and VAP2 606 are engaged in a multi-link transmission with the non-AP MLD-1 in the Staff network, it is not possible for VAP3 608 to also transmit at the same time due to the shared hardware resources with VAP2 606, and only VAP4 610 can be used to transmit/receive frames to/from the non-AP MLD-2 in the Guest network.

Under Tier 1 virtualization, each SSID is mapped to 1 or more VLANs. When a VLAN tagged frame (for example, tagged with VLAN1) is received at a wired interface of an AP MLD, the AP MLD needs to ensure that the frame is only broadcasted on WLANs with SSID that is mapped to the VLAN whose ID is tagged in the received frame (for example, WLANs with SSID that is mapped to VLAN1). Similarly, when a frame destined to the DS is received on any of the wireless interfaces, based on the SSID, the AP MLD needs to ensure that the correct VLAN ID is tagged to the outgoing wired frame. In order to do so, the AP MLD needs to maintain a mapping of VLAN ID to SSIDs and AP MAC Addresses. An example of a mapping is shown in Table 1 below.

TABLE 1

| VLAN ID | SSID | V-MLD | AP1 | AP2 |
|---------|------|-------|-----|-----|
| VLAN1 | Staff | 1 | 0A-21 | 0D-21 |
| VLAN2 | Guest | 2 | 0D-22 | 0E-21 |
| VLAN3 | IOT | x | 0E-22 | X |

An example of a broadcasted 802.3 frame 700 and 802.11 frame 702 based on the mapping of Table 1 is shown in FIG.

7. 802.3 frame 700 is transmitted from a router to an AP-MLD. 802.1Q header of the 802.3 frame 700 indicates VLAN1 in VID field 706. As per Table 1, VLAN1 is mapped to SSID: Staff. Therefore, the resulting 802.11 frame 702 can only be broadcasted by the APs that are mapped to the SSID corresponding to the VLAN ID in the received Ethernet frame i.e. in the 802.3 frame 700. In this example, the received broadcast Ethernet packet will be transmitted by AP1 or AP2 of SSID: Staff.

Since multiple SSIDs may share the same MAC-SAP in Tier 1 virtualization, the MA-UNITDATA.request primitive needs to indicate the destination SSID (or Virtual MLD ID instead if it exists), especially for broadcast data. An example of such a MAC data service primitive is shown below:

```
MA-UNITDATA.request(
    source address,
    destination address,
    routing information,
    data,
    priority,
    drop eligible,
    service class,
    station vector,
    MSDU format,
    SSID
)
```

Based on the SSID field indicated in the MAC data service primitive, broadcast data frames are only transmitted on the BSSIDs corresponding to the indicated SSID. Alternatively, a list of BSSIDs can be provided instead of the SSID.

Figure 8:
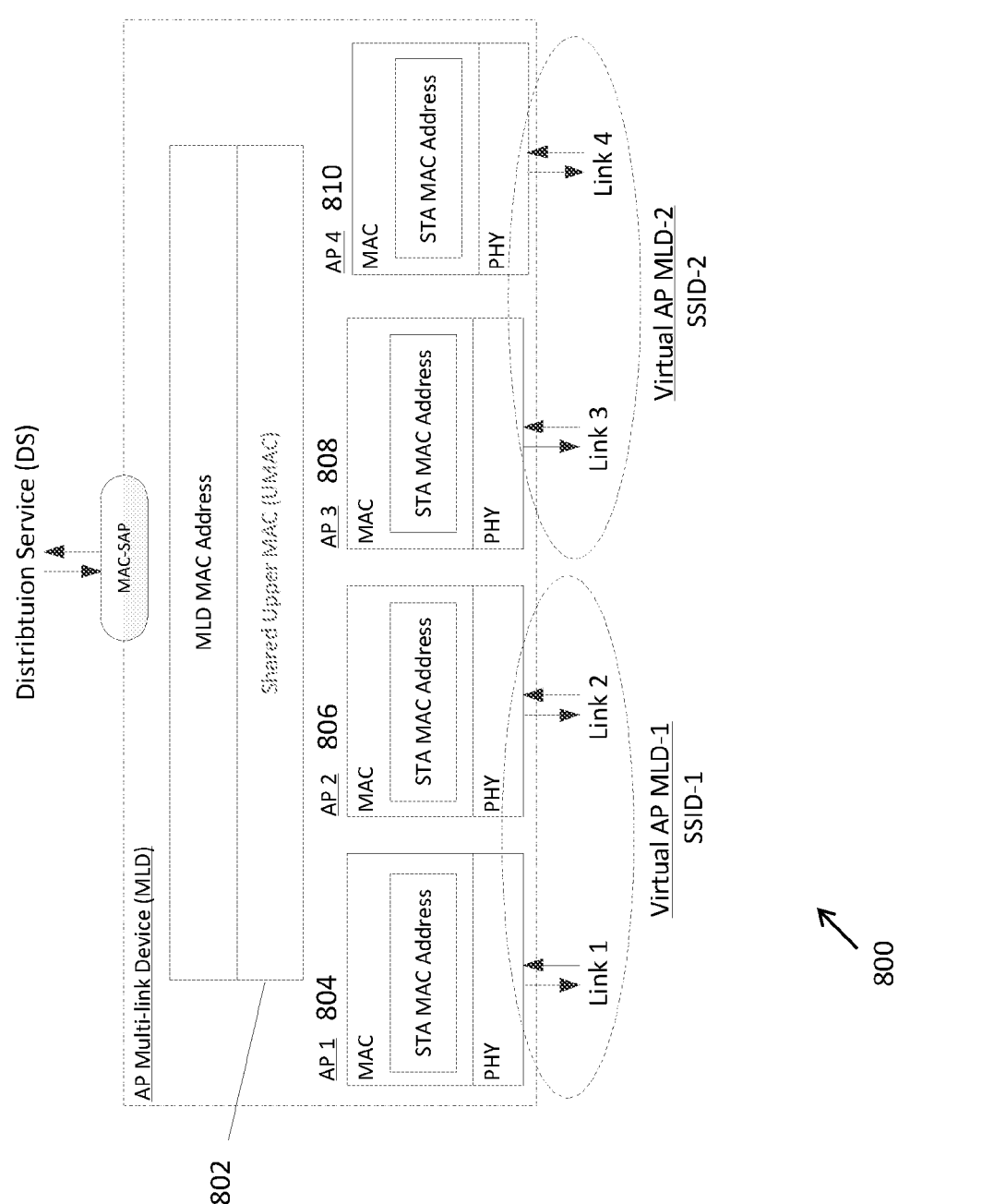
FIG. 8 depicts an illustration of an AP MLD having Tier 1 virtualization with a shared upper medium access control (UMAC) structure in accordance with various embodiments.

Tier 1 AP MLDs may be implemented as a shared Upper MAC (UMAC) structure without requiring complicated virtualization techniques like hypervisor. FIG. 8 depicts an illustration of an AP MLD 800 having Tier 1 virtualization with a shared UMAC structure in accordance with various embodiments. Shared UMAC 802 is responsible for ensuring the correct translation of wired VLAN frames to and from wireless frames. The constituent APs (AP-1 804, AP-2 806, AP-3 808 and AP-4 810) are tightly coupled together, so sharing of information is easier, but performance may be affected by the sharing of common resources (e.g. memory etc.).

Figure 9:
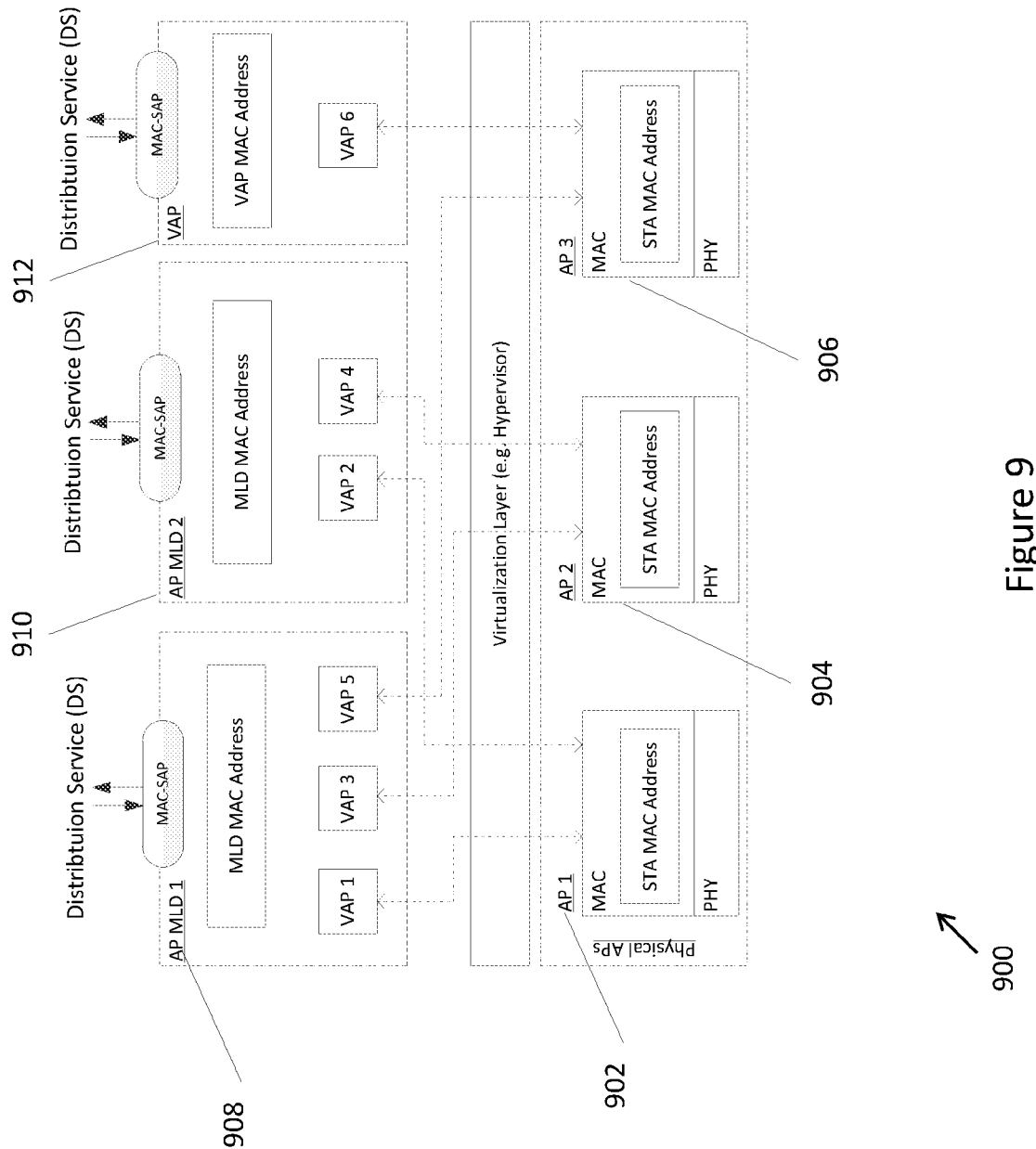
FIG. 9 depicts an illustration of co-located APs that are grouped into two or more AP groups to create multiple AP MLDs for a Tier 2 virtualization in accordance with various embodiments.

Under Tier 2 virtualization, co-located APs are grouped into two or more AP groups to create multiple AP MLDs. FIG. 9 depicts an illustration of co-located APs that are grouped into two or more AP groups to create multiple AP MLDs for a Tier 2 virtualization in accordance with various embodiments. In this illustration, co-located APs (AP1 902, AP2 904 and AP3 906) are used to create AP MLD1 908, AP MLD2 910 and VAP 912. Each AP MLD is mapped to a unique SSID. Each SSID is mapped to 1 or more VLANs. There are multiple MAC-SAPs to the DS and multiple MAC Addresses, one per AP MLD or VAP. By using VAPs (up to 8 per physical AP), many MLDs can be created to support a large number of VLANs. Since the APs/VAPs may be affiliated with different AP MLDs, the link IDs can be assigned in two ways:

1. Link IDs are local to an AP MLD i.e. each AP MLD assigns Link IDs to its affiliated APs independent from other co-located AP MLDs.
2. Link IDs are assigned globally for co-located AP MLDs such that a Link ID is never repeated within the set of co-located AP MLDs.

Figure 10A:
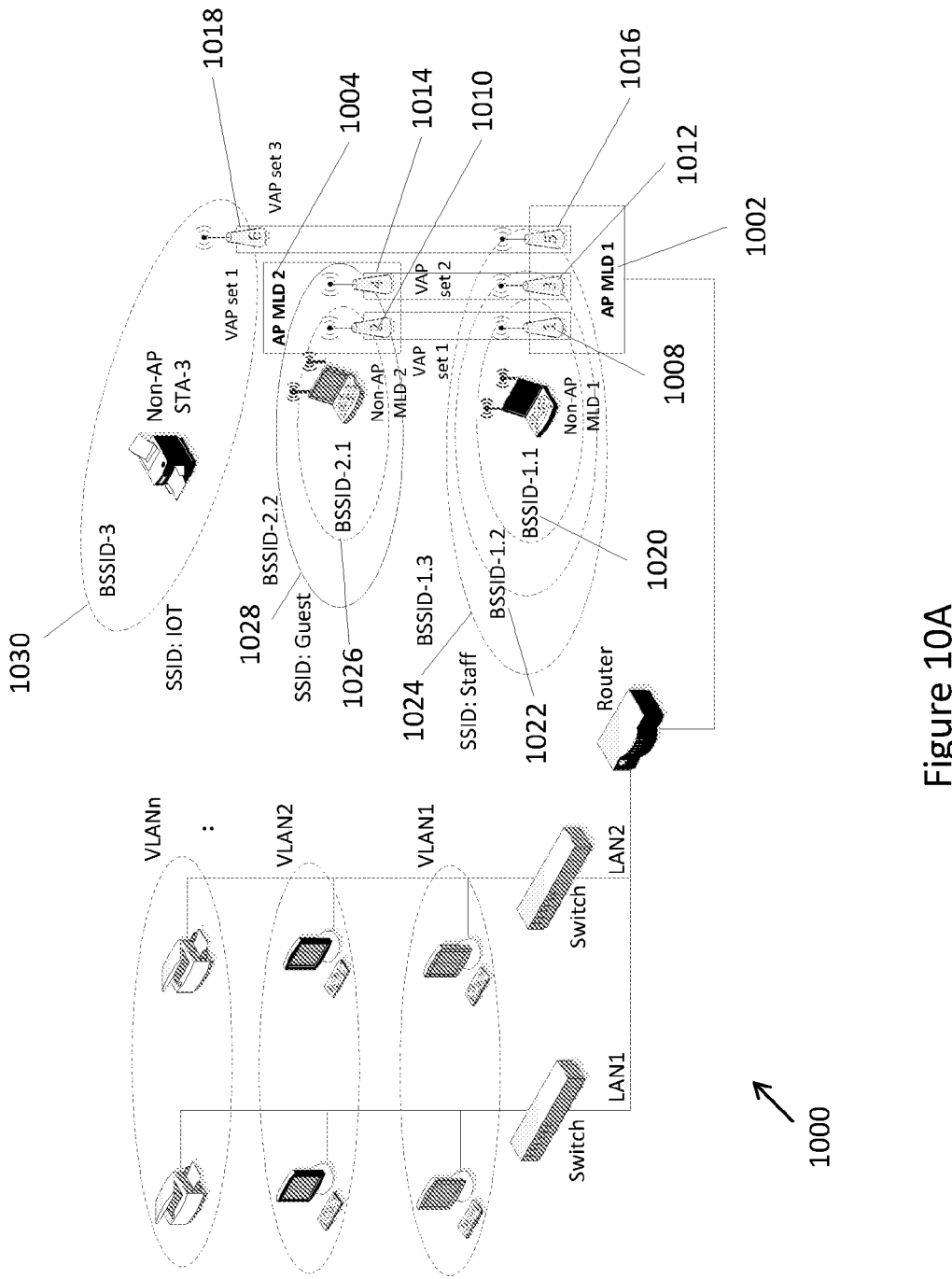
FIGS. 10A and 10B illustrate an implementation of a network having Tier 2 virtualization using multiple AP MLDs in accordance with various embodiments.
Figure 10B:
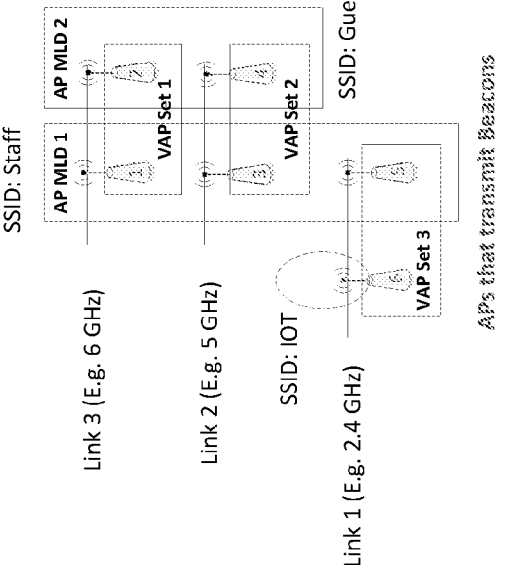

FIGS. 10A and 10B illustrate an implementation of a network 1000 having Tier 2 virtualization with multiple AP MLDs in accordance with various embodiments. 3 sets of VAPs are mapped to 2 MLDs and 3 SSIDs. AP MLD1 1002 comprises of VAP-1 1008 (corresponding to BSSID-1.1 1020), VAP-3 1012 (corresponding to BSSID-1.2 1022) and VAP-5 1016 (corresponding to BSSID-1.3 1024), and advertises SSID: Staff. AP MLD2 1004 comprises of VAP-2 1010 (corresponding to BSSID-2.1 1026) and VAP-4 1014 (corresponding to BSSID-2.2 1028), and advertises SSID: Guest. Standalone VAP-6 1018 corresponds to BSSID-3 1030 and advertises SSID: IOT. Non-AP MLD-1 1032 is associated with SSID: Staff, non-AP MLD-2 1034 is associated with SSID: Guest and STA-3 1036 is associated with SSID: IOT. In this example, the VAPs may be co-hosted BSSIDs or Multiple BSSIDs. When the VAPs are members of Multiple BSSID set, transmitting BSSIDs correspond to VAP-1 1008, VAP-4 1014 and VAP-6 1018 such that each virtual network has at least one Beacon frame; accordingly, VAP-1 1008, VAP-4 1014 and VAP-6 1018 transmit Beacon frames.

FIG. 10B shows an alternate view of the APs/VAPs. VAP-1 1008 and VAP-2 1010 operate on link 3, VAP-3 1012 and VAP-4 1014 operate on link 2, while VAP-5 1016 and VAP-6 1018 operate on link 1. Since the VAPs are affiliated with different AP MLDs, the link IDs can be assigned in two ways. In a first way, Link IDs are local to an AP MLD. e.g. VAP-1 1008, VAP-3 1012 & VAP-5 1016 are assigned Link IDs 1, 2 and 3 respectively by AP MLD1 1002, while VAP-2 1010 and VAP-4 1014 are assigned Link IDs 1 and 2 by AP MLD2 1004. In a second way, Link IDs are assigned globally for co-located MLDs. E.g. VAPs 1-5 are assigned Link IDs 1-5 respectively. An example of MAC addresses for the MLDs and the 6 VAPs are shown below:

> MLD-1 MAC Address=0A-20; MLD-2 MAC Address=0D-20; VAP-6 MAC address=0D-32
> BSSID-1.1 (VAP-1)=0A-21; BSSID-1.2 (VAP-3)=0D-22; BSSID-1.3 (VAP-5)=0A-23;
> BSSID-2.1 (VAP-2)=0A-22; BSSID-2.2 (VAP-4)=0D-21; BSSID-3 (VAP-6)=0D-31;

As a further analysis, the implementation of network 1000 is equivalent to expanding groups of co-located physical APs into multiple MLDs using VAPs. During discovery, when the number of MLDs is greater than the number of Physical APs, Multiple BSSID approach will have an issue of advertising MLD information (e.g. MLD MAC address). There may also be issues in MLD MAC address assignment and signaling efficiency. For Multi-link setup, non-AP MLDs should be able to easily discover the APs or VAPs on the other links of a MLD, especially if the VAPs are Nontransmitted BSSIDs. In terms of security, different VAPs should have different Group Keys (GTK/IGTK). In regards to interconnection with VLANs, one VLAN ID is mapped to a SSID (and to a Virtual MLD). There are multiple MLD MAC addresses and multiple MAC SAPs to the DS. If a single SSID is mapped to a single MLD, a VLAN ID can be mapped to a MLD MAC Address. But a single MLD MAC address would be more appropriate if there is only 1 physical connection to the DS. Thus, using VAPs, MLDs can be virtualized to support multiple VLANs.

Figure 11A:
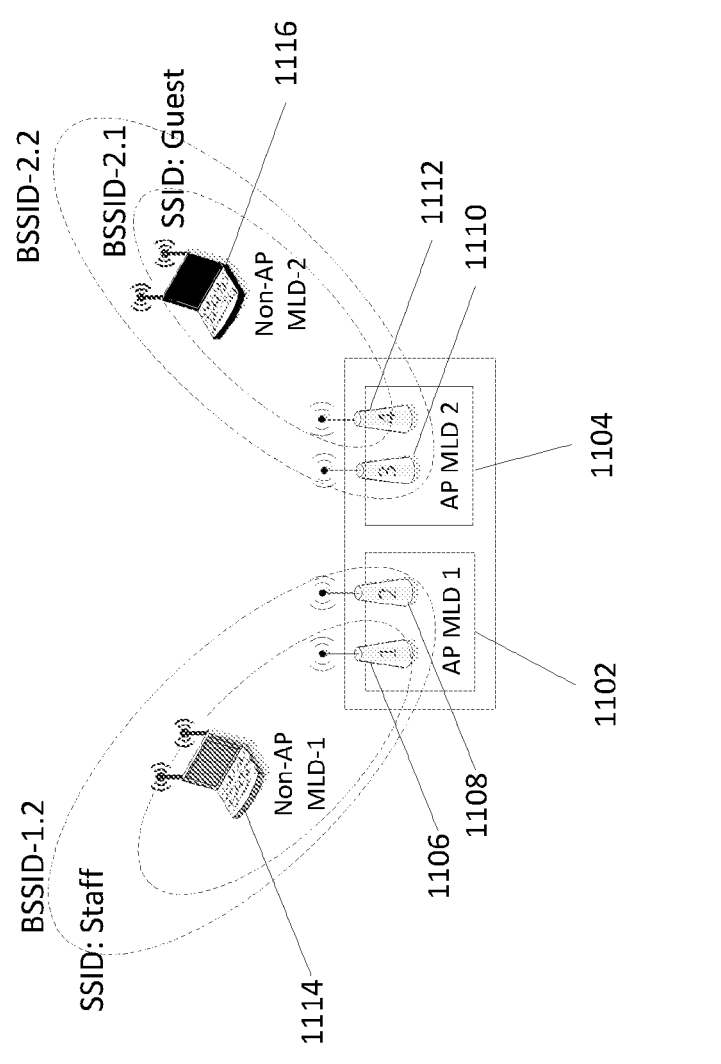
FIGS. 11A and 11B illustrate an implementation of a network having Tier 2 virtualization using multiple AP MLDs with only physical APs in accordance with various embodiments.
Figure 11B:
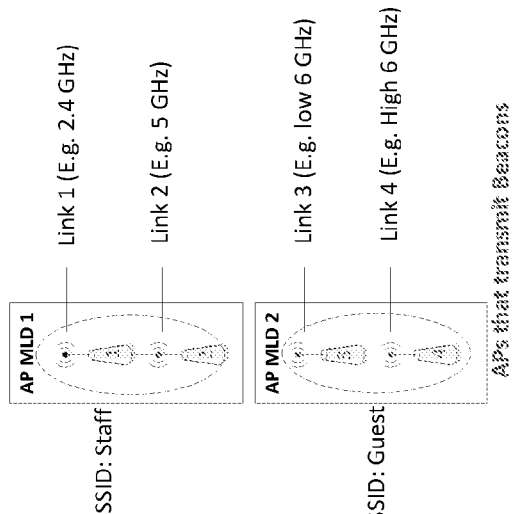

FIGS. 11A and 11B illustrate an implementation of a network 1100 having Tier 2 virtualization using multiple AP MLDs with only physical APs in accordance with various embodiments. Referring to FIG. 11A, 2 sets of VAPs mapped to 2 MLDs and 2 SSIDs. AP MLD1 1102 comprises of VAP-1 1106 and VAP-2 1108, and advertises SSID: Staff. AP MLD2 comprises of VAP-3 1110 and VAP-4 1112, advertises SSID: Guest. Non-AP MLD-1 1114 is associated with SSID: Staff, while non-AP MLD-2 1116 is associated with SSID: Guest. FIG. 11B shows an alternate view of the VAPs. VAPs 1-4 operate on links 1-4 respectively. Since the VAPs are affiliated with different AP MLDs, the Link IDs can be assigned in two ways. In a first way, Link IDs are local to an AP MLD. For example, VAP-1 1106 and VAP-2 1108 are assigned Link IDs 1 and 2 respectively by AP MLD1 1102, while VAP-3 1110 and VAP-4 1112 are also assigned Link IDs 1 and 2 by AP MLD2 1104. In a second way, Link IDs are assigned globally for co-located MLDs. For example, VAPs 1-4 are assigned Link IDs 1-4 respectively.

Under Tier 2 virtualization, each SSID is mapped to 1 or more VLANs. When a VLAN tagged frame is received at a wired interface of an AP MLD, the AP MLD needs to ensure that the frame is only broadcasted on WLANs with SSID that is mapped to the VLAN ID tagged in the received frame. Similarly, when a frame destined to the DS is received on any of the wireless interfaces, based on the SSID, the AP MLD needs to ensure that the correct VLAN ID is tagged to the outgoing wired frame. Further, the AP MLD needs to maintain a mapping of VLAN ID to SSIDs and MLD/AP MAC Addresses. A mapping based on the network 1000 is shown in Table 2 below:

TABLE 2

| VLAN ID | SSID | V-MLD/VAP | AP1 | AP2 | AP3 |
|---------|-------|-----------|-------|-------|-------|
| VLAN1 | Staff | AP MLD 1 | 0A-21 | 0D-22 | 0A-23 |
| VLAN2 | Guest | AP MLD 2 | 0A-22 | 0D-21 | x |
| VLAN3 | IOT | VAP6 | OD-31 | x | |

Figure 12:
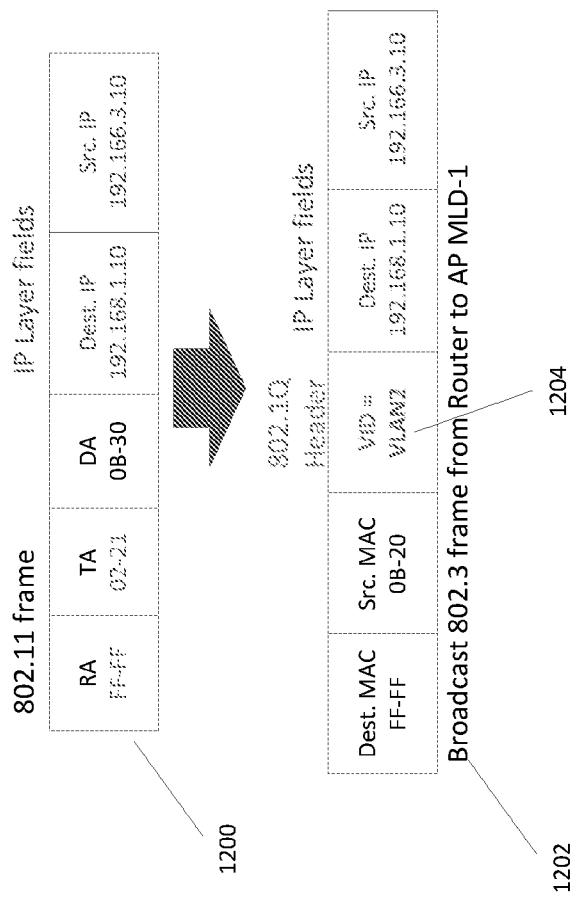
FIG. 12 depicts an illustration of a broadcasted 802.11 frame and 802.3 frame for the networks illustrated in FIGS. 10A to 11B.

Further, an example of an 802.11 frame 1200 and 802.3 frame 1202 based on the mapping of Table 2 is shown in FIG. 12. The 802.11 frames are only broadcasted by the APs affiliated with the AP MLD that is mapped to the SSID corresponding to the VLAN ID in the received ethernet frames. In this example, the broadcast 802.11 packets received by VAP-3 1012 & VAP-4 1014 of SSID: Guest will be tagged with IEEE 802.1Q tag with VLAN ID=VLAN2 (as shown in VID field 1204 of 802.3 frame 1202) before forwarding to the Ethernet interface.

Figure 13:
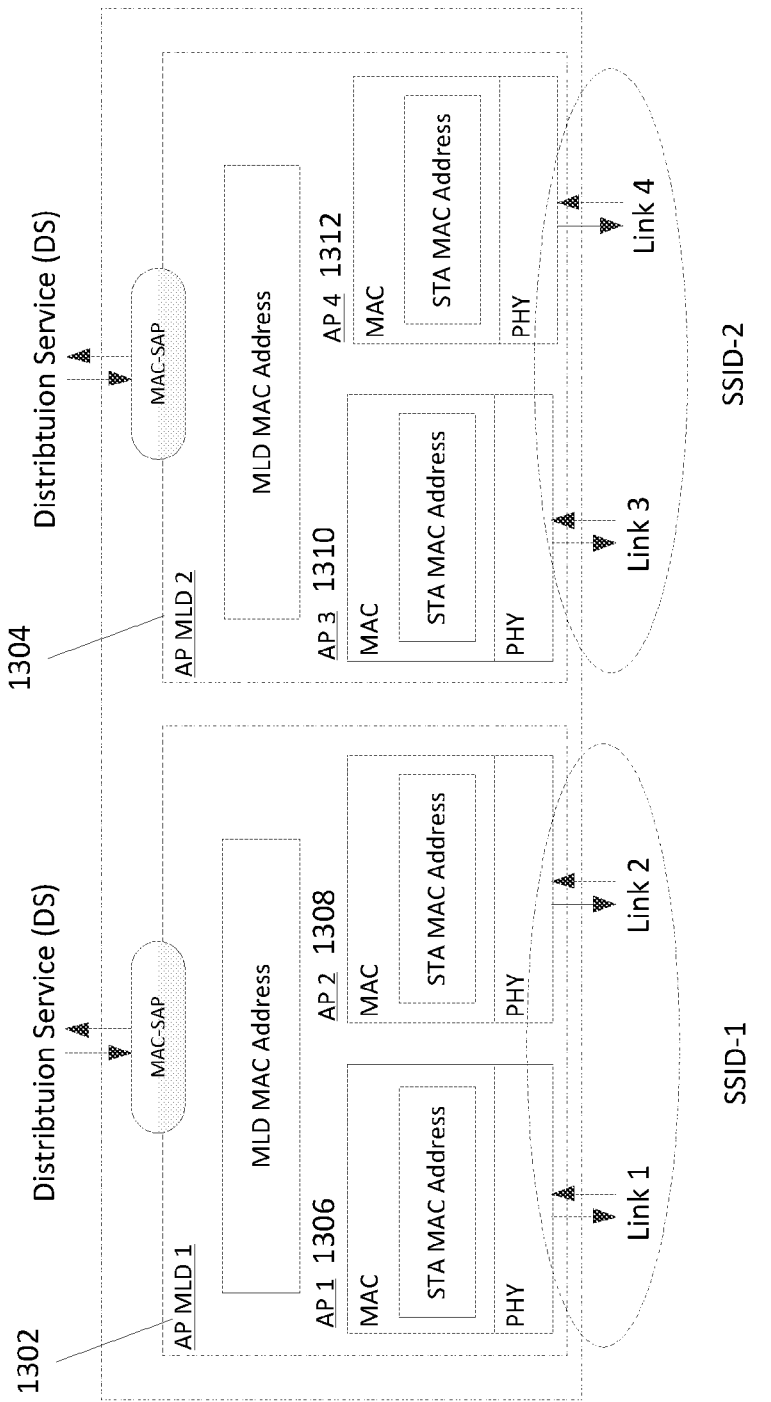
FIG. 13 depicts an illustration of Tier 2 AP MLDs without hypervisor virtualization in accordance with various embodiments.

When only physical APs are involved or only a few VAPs are involved, Tier 2 AP MLDs may also be implemented without using hypervisor virtualization. FIG. 13 depicts an illustration 1300 of Tier 2 AP MLD1 1302 and AP MLD2 1304 without hypervisor virtualization in accordance with various embodiments. AP MLD1 1302 comprises an AP-1 1306 and AP-2 1308, while AP MLD2 1304 comprises an AP-3 1310 and AP-4 1312. In this implementation, each AP MLD1 1302 and AP MLD2 1304 behaves as a distinct entity, with its own MAC-SAP to the DS. Advantageously, translation of VLAN frames and wireless frames is simple due to the one-to-one mapping between AP MLDs and VLANs.

Figure 14:
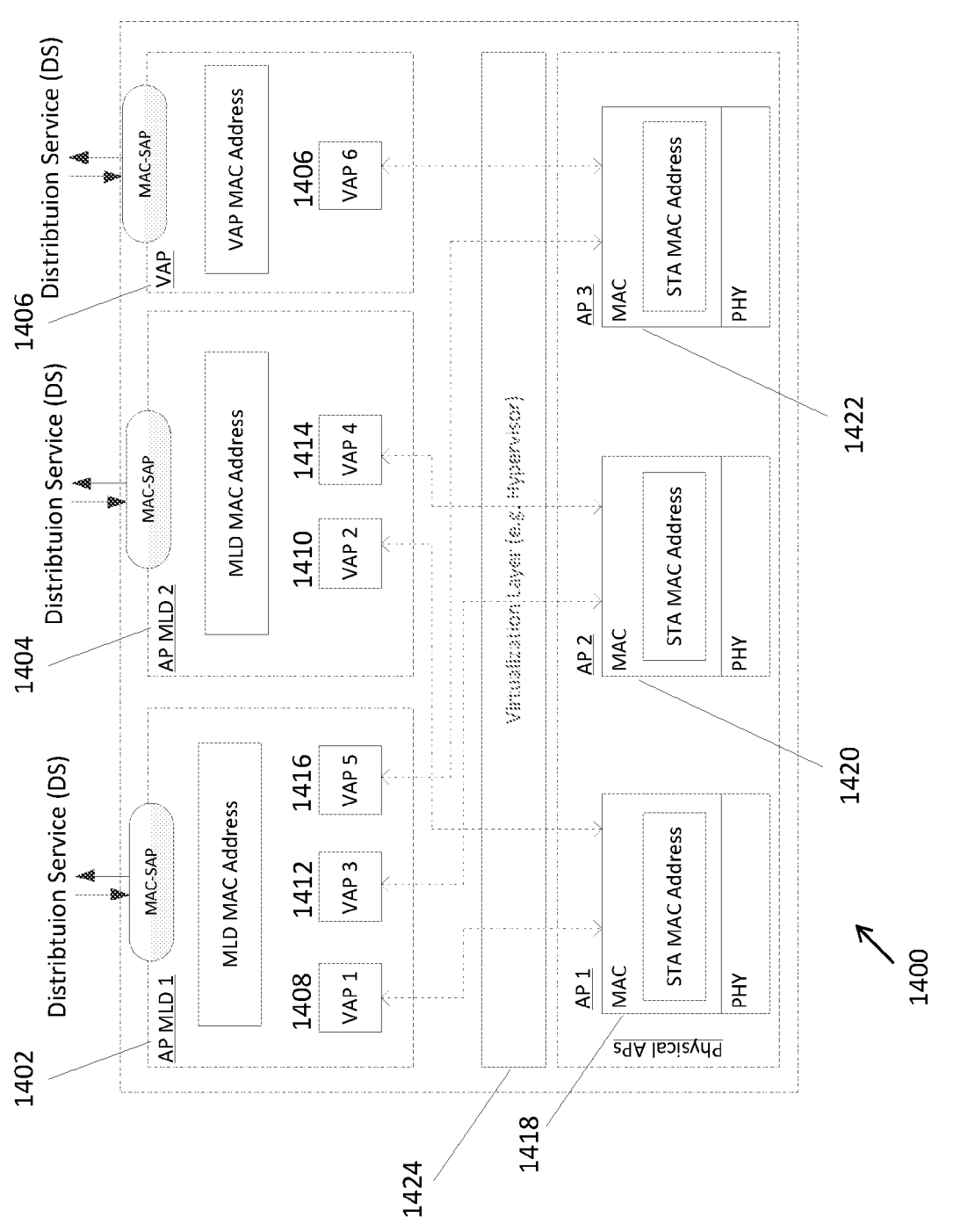
FIG. 14 depicts an illustration of Tier 2 AP MLDs with hypervisor virtualization in accordance with various embodiments.

When many VAPs are involved, Tier 2 AP MLDs may need to be implemented using hypervisor virtualization. FIG. 14 depicts an illustration 1400 of Tier 2 AP MLD1 1402, AP MLD2 1404 and VAP-6 1406 with hypervisor virtualization in accordance with various embodiments. AP MLD1 1402 comprises VAP-1 1408, VAP-3 1412 and VAP-5 1416, while AP MLD2 1404 comprises VAP-2 1410 and VAP-4 1414. Virtualization layer 1424 is responsible for ensuring the correct binding of the virtual APs with physical APs AP-1 1418, AP-2 1420 and AP-3 1422. Each AP MLD1 1402, AP MLD2 1404 and VAP-6 1406 behaves as a distinct entity, with its own MAC-SAP to the DS. Advantageously, translation of VLAN frames and wireless frames is simple due to the one-to-one mapping between AP MLDs and VLANs.

Figure 15:
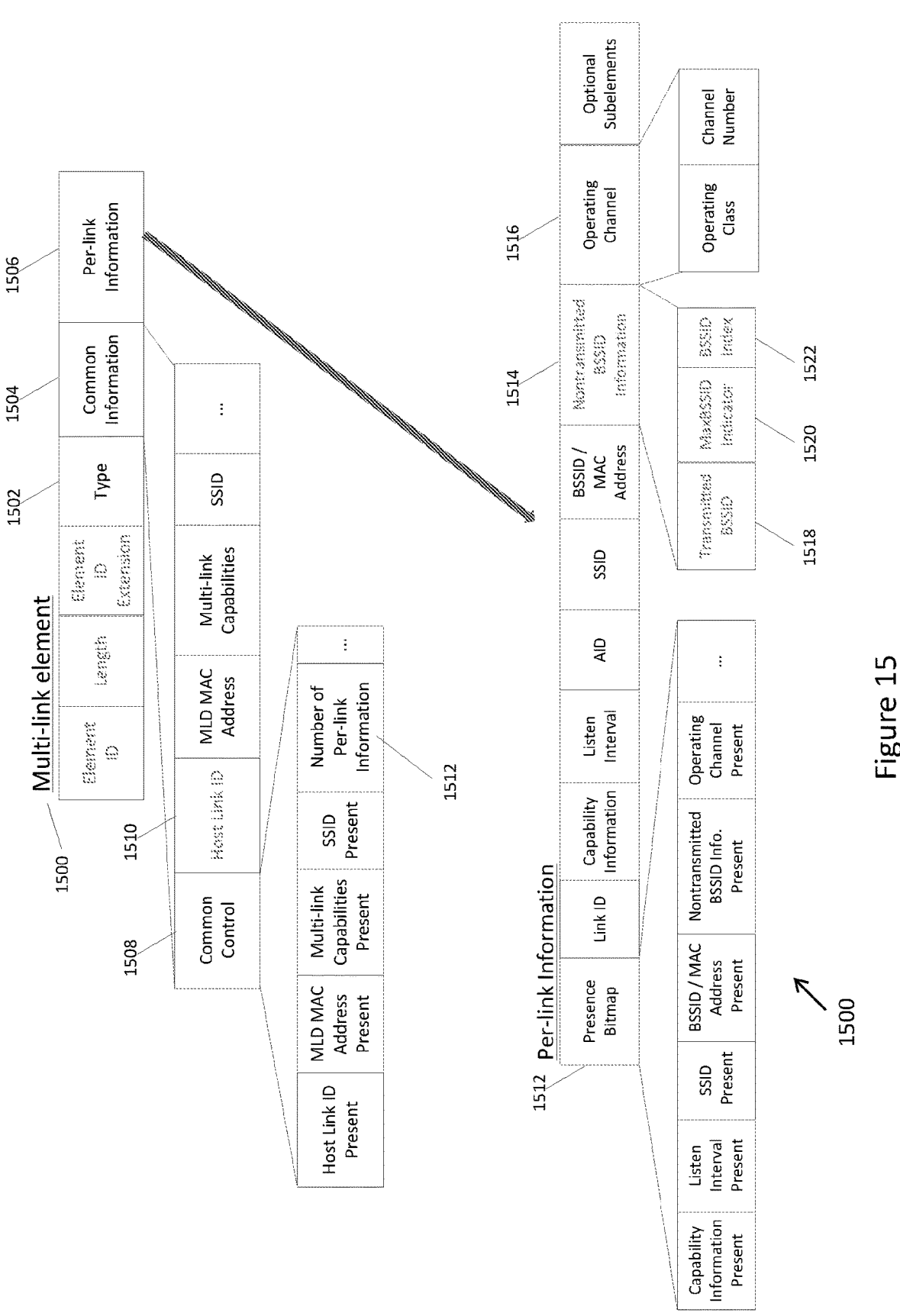
FIG. 15 depicts an illustration of a Multi-link element configured for unified signalling in accordance with various embodiments.

Unified signaling that can support different architectures & different usages is proposed. FIG. 15 depicts an illustration of a Multi-link element 1500 configured for unified signalling in accordance with various embodiments. The Multi-link element 1500 comprises an Element ID field, a Length field, an Element ID extension field, a Type field 1502, a Common Information field 1504 and one or more Per-link information field 1506. Type field 1502 is set to Discovery when used by an AP MLD to advertise link information, or set to Multi-link Setup when used by a non-AP MLD during Multi-link Setup. An example of various Type field values that can be implemented are shown in Table 3 below:

TABLE 3

| Type field Values | |
| --- | --- |
| Value | Meaning |
| 0 | Discovery |
| 1 | Multi-link Setup |
| 2 | Multi-link BSS Parameter update |
| 3 | TID-to-link Mapping |
| 4 | Multi-link TIM |
| 5 | Update MAC Address |
| 6~255 | Reserved |

Common Information field 1504 comprises a Common Control field 1508, a Host Link ID field 1510, a MLD MAC Address field, Multi-link Capabilities field and a SSID field. The Common Control field 1508 comprises a Host Link ID Present field, MLD MAC Address Present field, Multi-link Capabilities Present field, SSID Present field and Number of Per-link Information field 1512. The Number of Per-link Information field 1512 indicates how many Per-link Information fields are present. 0 indicates none. The Common Information field 1504 carries information about the MLD that is common across all links e.g. MLD MAC Address, Multi-link capabilities, common SSID etc. The Host Link ID field 1508 indicates a Link ID assigned to the link in which the Multi-link element 1500 is transmitted (i.e. host link). If all the links of an AP MLD advertise the same SSID, MLD level SSID may be defined and indicated in the Common Information field and the SSID fields are omitted in the per-link info. Fields. In such cases, the beacon frame carries the SSID for legacy devices, which may be different from the MLD level SSID defined for non-AP MLDs.

The Per-link information field 1506 comprises a Presence Bitmap field 1512, a Link ID field, a Capability Information field, a Listen Interval field, an AID field, SSID field, BSSID/MAC Address field, a Nontransmitted BSSID Information field 1514, an Operating Channel field 1516 and zero or more Optional Subelements field. The Presence Bitmap field 1512 comprises a Capability Information Present field, a Listen Interval Present field, a SSID present field, a BSSID/MAC Address Present field, a Nontransmitted BSSID Info. Present field and an Operating Channel Present field etc. The Nontransmitted BSSID Information comprises a Transmitted BSSID field 1518, a MaxBSSID Indicator field 1520 and a BSSID Index field 1522. The Operating Channel field 1516 comprises an Operating Class field and a Channel Number field. When present, each Per-link Information fields represents one of the links of the MLD; typically information of the host link (the link on which the frame carrying the Multi-link element is transmitted on, or the link on which the AP/VAP associated with the Multi-link element operates on) is not carried in the Per-link Information field. If a link corresponds to a Nontransmitted BSSID, the Nontransmitted BSSID Information field 1518 provides identity of the transmitted BSSID. Other subelements related to the link, e.g. EHT Operation element, EDCA (Enhanced Distributed Channel Access) Parameter Set element etc. may be carried if different from the information of the host link.

As a variation, the Common control field may also be placed outside the Common Information field right after the Type field, or it may even replace the Type field. The Common control field in such case can also indicate whether the ML element carries the Common Information field, or the per-link information fields. Instead of fields, each Per-link information may also be a sub-element. Also, instead of the full SSID, a 4-octer long short/compressed SSID (32-bit CRC calculated over the SSID) may also be used in the Common Information field as well as the Per-link information fields. The Multi-Link element may also carry a non-inheritance element to indicate which element carried in the host frame is not inherited by the link information. The concept of non-inheritance can be useful when a reported link/AP doesn't inherit certain element. For example, if the reporting AP (i.e. the AP corresponding to the host link/element) supports UORA (UL OFDMA-based Random Access) while the reporting AP's (APs corresponding to the per-link information) does not support UORA, then the non-inheritance element signals this information—i.e., not inheriting UORA.

Thus, the Link ID of the host link is indicated in the Host Link ID field 1508 of the Multi-link element 1500. Advantageously, if a link of MLD is a nontransmitted BSSID (i.e. does not transmit Beacon), the Per-link information field 1506 in the Multi-link element 1500 shall provide information of the corresponding transmitted BSSID to help a non-AP MLD to find the beacon easily.

Aside from the Link ID field which is always present, the presence of other fields in the Per-link Information depend on the usage scenario. For e.g. if used during Discovery, the Capability information, Listen Interval, AID fields may be omitted. Similarly, when used during Multi-link Setup, the Operating channel field, Nontransmitted BSSID information field may be omitted. The Listen Interval field is only present in Association Request frames transmitted by a non-AP MLD while the AID field is only present in Association Response frames transmitted by an AP MLD. The SSID field may be included in the Per-link information field 1506 if the SSID associated with a link is different from the SSID indicated in the host frame or the common information field. The BSSID/MAC Address field carries the BSSID corresponding to the link indicated in Association Response frames, while it carries the MAC address of the link in Association Request frames. It will be appreciated that other names may also be used e.g. "Host link" may be called "transmitted link"; "Host Link ID" may also be called "Transmitted Link ID"; "Per-link Information" may be called "AP Information" or "Per-STA Information" etc.

Several embodiments are possible for implementing the techniques as discussed above. In a first embodiment, Beacon & Probe Response frames carry a Multi-link element (ML element) that carries MLD common information (e.g. MLD MAC Address) as well as information of the other links of the MLD. The ML element identifies the link ID assigned to the Host link. Information of the Host link may not be carried in the ML element. The ML element also carries basic information of the other links (Link ID, SSID, BSSID, Operating channel etc.) of the AP MLD with which the AP transmitting the frame is affiliated with. Information that is same as the Host link may not repeated but is inherited from the information carried in the frame or the nontransmitted BSSID profile (in a Multiple BSSID element) that carries the Multi-link element (Inheritance). If a link of the MLD corresponds to a Nontransmitted BSSID, the link information in the ML element also provides information required to identify the corresponding transmitted BSSID. Advantageously, ML element overhead is low but provides enough information to help a non-AP MLD to quickly locate more information about the link of interest before deciding whether or not to associate with this AP MLD.

In a second embodiment, a host frame also carries RNR elements and/or Neighbor Report elements that carry information of some of the other APs (co-located or not co-located). The elements also indicate the MLD MAC address and the Link ID associated with APs that are affiliated with MLDs. The ML element carries minimal information (Link ID) of links already included in the RNR/Neighbor Report elements, and carry full/complete information of the other links (Link ID, SSID, BSSID, Operating channel, TBTT (Target Beacon Transmission Time) etc.) except the host link. Advantageously, non-AP MLDs can receive information of all the APs hosted on the same device from a single frame.

In a third embodiment, a host frame carries RNR elements or Neighbor Report elements that carry information of all the co-located APs. The ML element carries minimal information of the other links (Link ID, BSSID) which is used to refer to the RNR or Neighbor Report elements for more information. A benefit of this implementation is that no modifications are made to the RNR or Neighbor Report elements for legacy compatibility. Further, while ML element overhead is very low, it depends on the inclusion of other Neighbor Report elements to provide further details of the other links of the MLD.

In a fourth embodiment, the advertisement of neighboring MLDs is made more efficient by defining a new Neighbor MLD Report element. The Neighbor MLD element can be used to carry information about co-located MLDs as well as MLDs that are not co-located. Advantageously, non-AP STAs can obtain information of MLDs from a single report element. However, there may be repetition of information if RNR or Neighbor report elements are also carried for legacy STAs.

Figure 16:
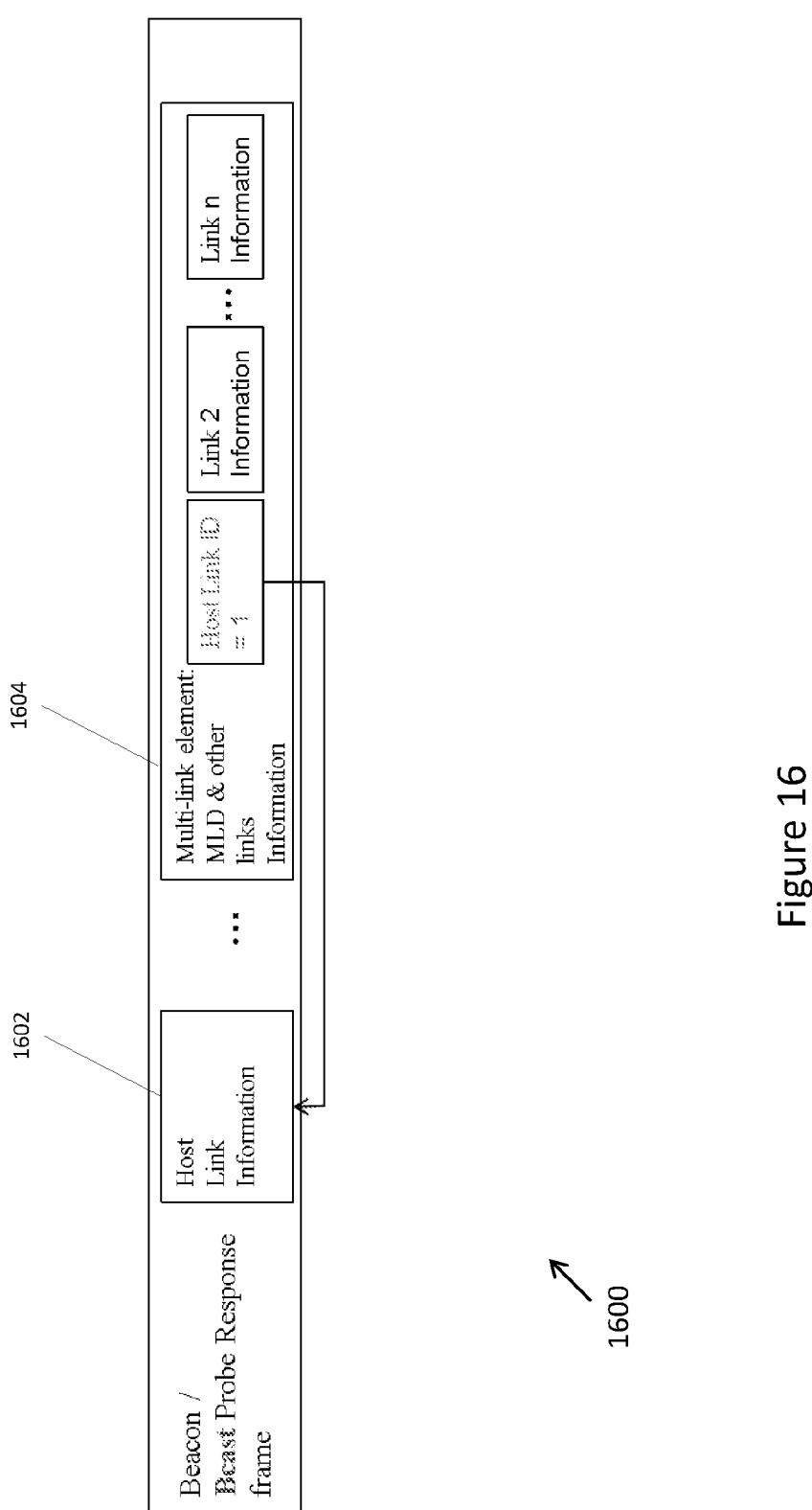
FIG. 16 depicts a simplified illustration of a Beacon/Broadcast Probe Response frame configured for Tier 1 virtualization with all physical APs in accordance with a first embodiment.

FIG. 16 depicts a simplified illustration of a Beacon/Broadcast Probe Response frame 1600 configured for Tier 1 virtualization with all physical APs in accordance with the first embodiment. Beacon/Broadcast Probe Response frame 1600 may be implemented as a Beacon frame or Broadcast Probe Response frame. It carries a Multi-link element 1604 that carries MLD common information (e.g. MLD MAC Address) as well as information of the other links of the MLD. The ML element 1604 identifies the Host link ID i.e. the link ID assigned to the Host link (link on which the frame is transmitted). Information of the Host link is not carried in the ML element 1604, but instead the Host link ID is used to refer to Host Link Information 1602 carried by the Beacon/Broadcast Probe Response frame 1600.

The ML element also carries basic information of the other links (Link ID, SSID, BSSID, Operating channel etc.) of the AP MLD with which the AP transmitting the frame is affiliated with. Information that is same as the Host link may not be repeated. This is known as inheritance which means that the information is already present either in the host frame/element, or a Common Information field. Host element refers to the Multiple BSSID element which carries more information regarding the link referenced by the Link ID. Field of the Multi-link element 1604 is not repeated in the Per-link Information fields unless the information is different for that link, in which case the information is also present in the Per-link Information field. It will be appreciated that there may be some exceptions for some fields, e.g. SSID, which may be repeated for faster discovery. Further, SSID may be included in the Per-link information field if the SSID associated with a link is different from the SSID indicated in the host frame or the common information field. Non-AP MLDs use the information of the other links in the ML element 1604 to gather full information of the APs on the links (e.g. by scanning the links, or by referencing RNR or Neighbor Report elements carried in the host frame) and may associate with the APs that advertise the same SSID.

Figure 17:
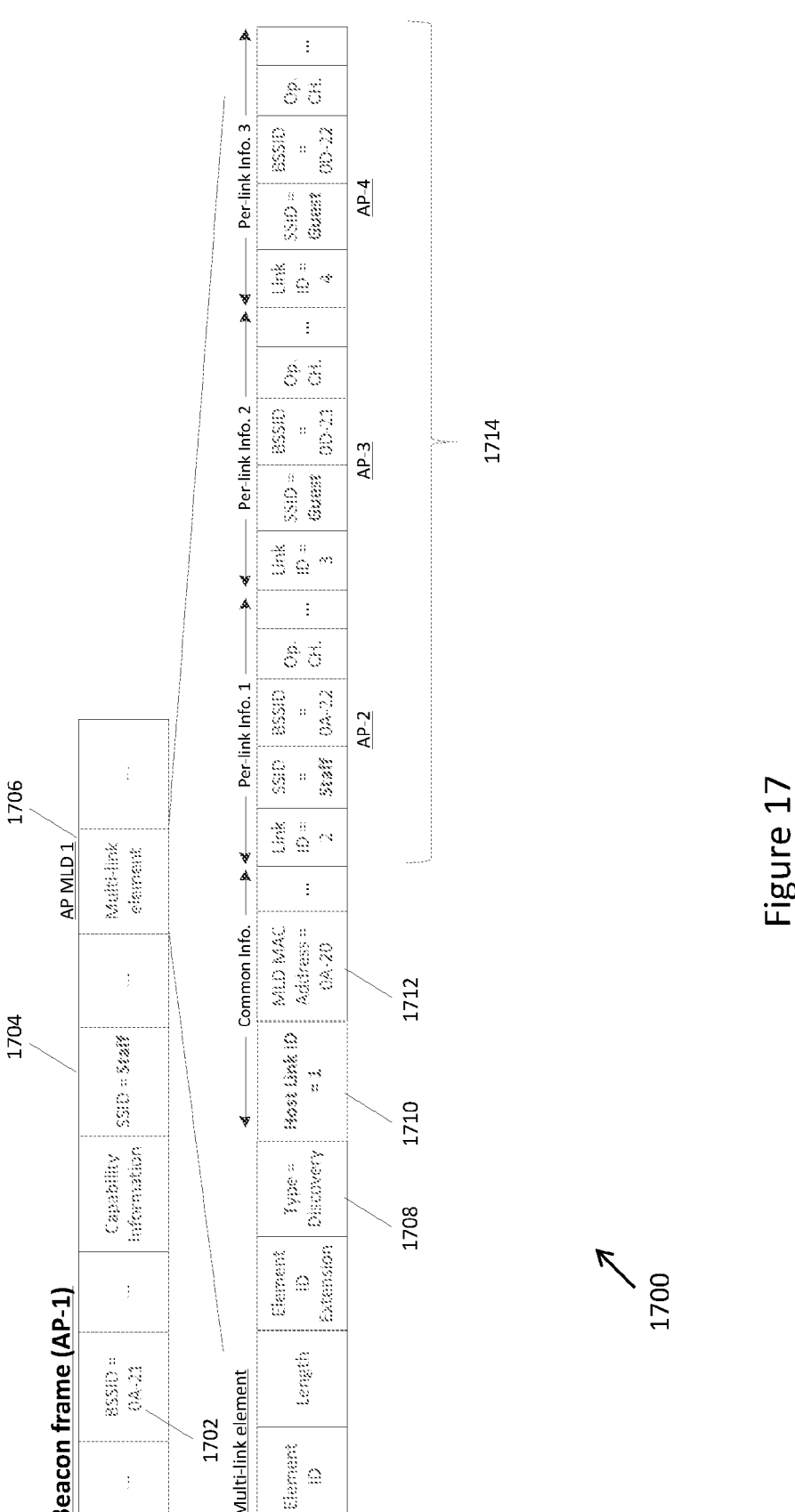
FIG. 17 depicts an illustration of a Beacon frame transmitted by an AP-1 of the network as shown in FIGS. 4A and 4B in accordance with a first embodiment.

FIG. 17 depicts an illustration of a Beacon frame 1700 transmitted by AP-1 404 of the network 400 as shown in FIGS. 4A and 4B in accordance with a first embodiment. The Beacon frame 1700 indicates BSSID MAC address 1702 of AP-1 404 as "0A-21" and associated SSID 1704 as "Staff". Multi-link element 1706 indicates Type field 1708 as "Discovery". Under common information, Host Link ID 1710 is set as "1" indicating that the Link ID 1 is assigned to the host link; and MLD MAC address 1712 is indicated as "0A-20". Multi-link element 1706 also comprises 3 Per-link Information fields 1714 that represent AP-2, AP-3 and AP-4. Each Per-link Information field provides information such as the Link ID, the SSID, the BSSID and operating channel for the represented/reported AP. It will be appreciated that while the Common control field and the Presence Bitmap field are not illustrated in ML element 1706, the ML element format is the same as the ML element 1500 in FIG. 15.

Figure 18:
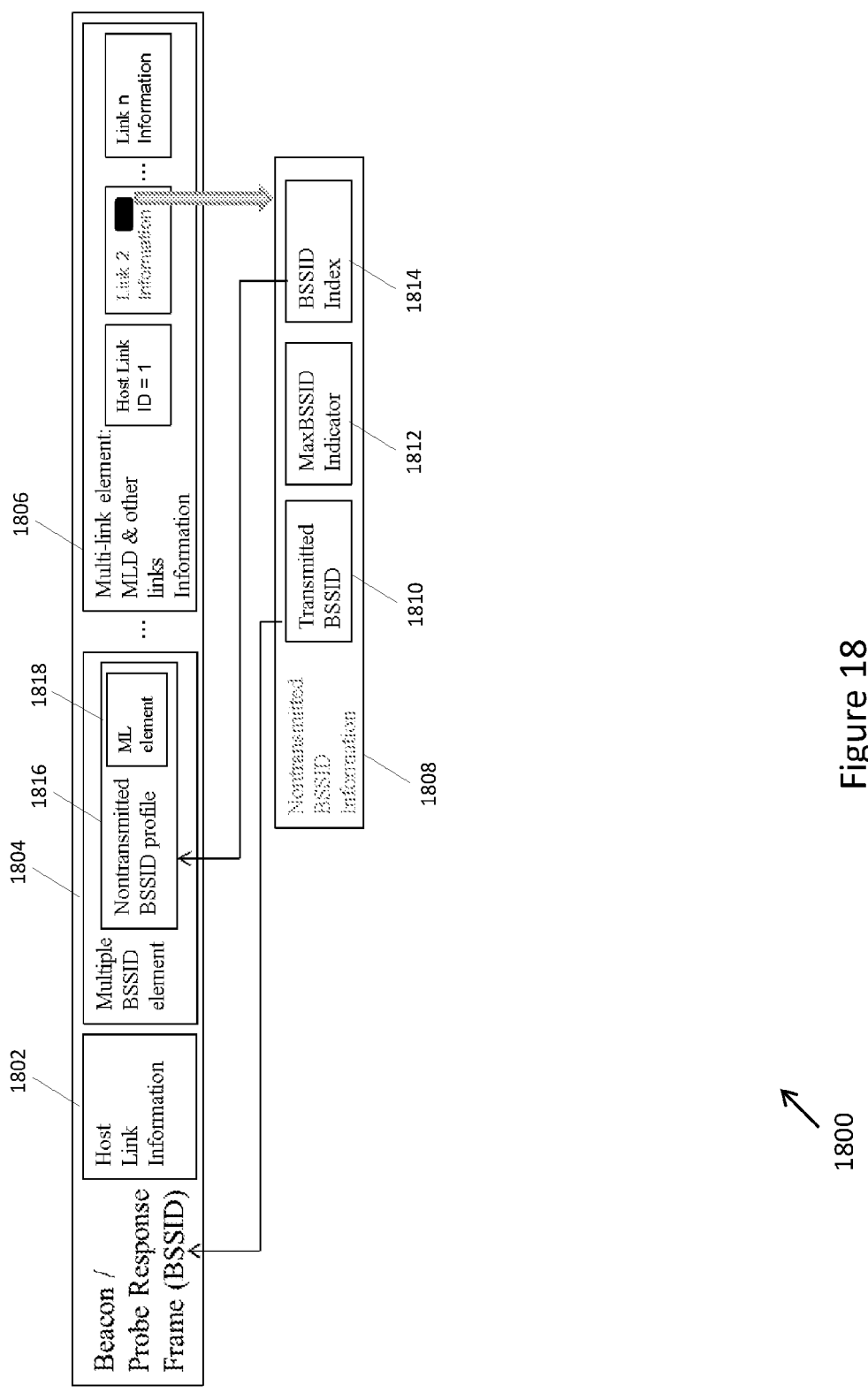
FIG. 18 depicts a simplified illustration of a Beacon/Broadcast Probe Response frame configured for Tier 1 virtualization with VAPs in accordance with a first embodiment.

FIG. 18 depicts a simplified illustration of a Beacon/Probe Response frame 1800 configured for Tier 1 virtualization with VAPs in accordance with a first embodiment. The Beacon/Probe Response frame 1800 comprises Host Link Information 1802, Multiple BSSID element 1804 and Multi-link element 1806 (same format as ML element 1500). In the present example, it is preferred that at least one BSSID in a virtual MLD transmits Beacon frames (i.e. it is a transmitting BSSID) so that each SSID has its own Beacon frame. If a link of the MLD corresponds to a Nontransmitted BSSID, instead of or in addition to the BSSID, the link information in the ML element 1806 also provides information (such as Nontransmitted BSSID Information 1808) required to identify the Transmitted BSSID corresponding to the Nontransmitted BSSID for example, in a RNR element or in a Neighbor Report elements carried in the host frame, or a Beacon/Probe Response frame of a different VAP. Transmitted BSSID field 1810 identifies the AP that transmit the Beacon frame 1800 that carries a Nontransmitted BSSID profile 1816, while the Max BSSID Indicator field 1812 & the BSSID Index field 1814 can be used together with the Transmitted BSSID field 1810 to compute the nontransmitted BSSID.

The Nontransmitted BSSID profile 1816 (in Multiple BSSID element 1804) may also carry another ML element 1818 as an optional subelement if the nontransmitted BSSID is affiliated with an MLD. If a link corresponds to a physical AP or a co-hosted AP that transmit own Beacon frames, the per-link information identifies the BSSID of the AP. Further, If the ML element 1818 is carried within the Nontransmitted BSSID profile 1816 in Multiple BSSID element 1804, Host Link ID field within the ML element 1818 indicates the Link ID assigned to the link that the AP corresponding to the nontransmitted BSSID operates on (and not the link on which the Beacon frame carrying the Multiple BSSID element is transmitted on). AP may also split a nontransmitted BSSID profile across more than one Multiple BSSID elements in a frame. If the transmitted BSSID indicated in the Transmitted BSSID field 1810 in the Nontransmitted BSSID information 1808 matches the BSSID of the frame, a non-AP MLD can use the Nontransmitted BSSID information 1818 to obtain full information of the link corresponding to the Nontransmitted BSSID from the Multiple BSSID element 1804 carried in the same frame. Otherwise, the non-AP MLD may scan the links to gather full information of the links from Beacon/Probe Response frames from APs corresponding to the transmitted BSSID.

The SSID fields in the Multi-link element may be replaced with Short SSID fields. A short SSID is a 32-bit CRC calculated over an SSID. The Operating Channel field indicates the Operating channel of the link and is comprised of an Operating Class field and a Channel Number field, that together uniquely identifies a channel on which the link operates.

Figure 19:
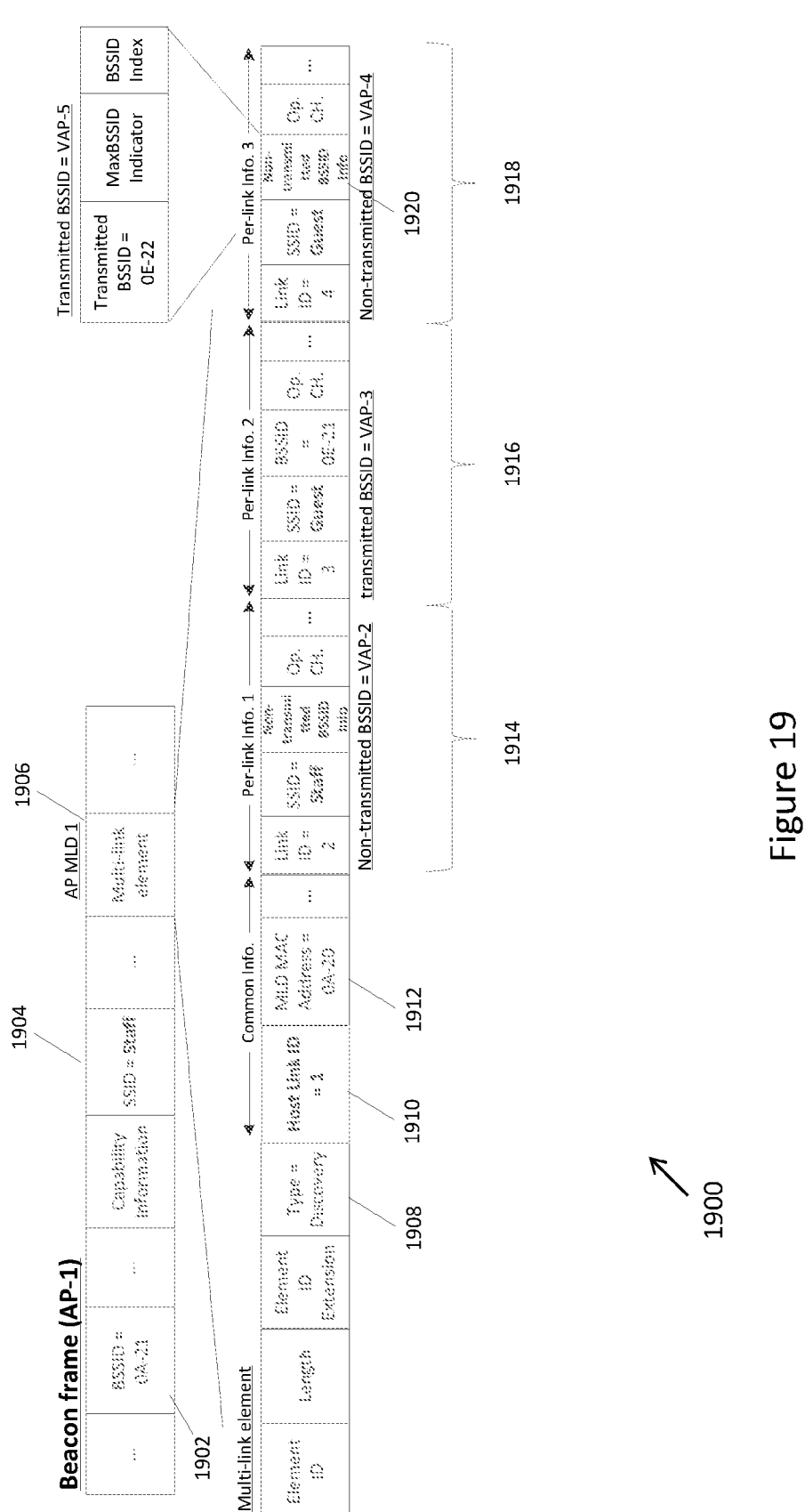
FIG. 19 depicts an illustration of a Beacon frame transmitted by an AP-1 of the network as shown in FIGS. 6A and 6B in accordance with a first embodiment.

FIG. 19 depicts an illustration of a Beacon frame transmitted by AP-1 604 of the network 600 as shown in FIGS. 6A and 6B in accordance with a first embodiment. The Beacon frame 1900 indicates BSSID MAC address 1902 of AP-1 604 as "0A-21" and associated SSID 1904 as "Staff". Multi-link element 1906 indicates Type field 1908 as "Discovery". Under common information, Host Link ID 1910 is indicated as "1" and MLD MAC address 1912 is indicated as "0A-20". Multi-link element 1906 also comprises 3 Per-link Information fields 1914, 1916 and 1918 that represent VAP-2 606, VAP-3 608 and VAP-4 610 respectively. Per-link Information field 1914 provides information for the represented VAP-2 606 such as the Link ID (indicated as "2"), the SSID (indicated as "Staff"), the Nontransmitted BSSID Information and operating channel. Per-link Information field 1916 provides information for the represented VAP-3 608 such as the Link ID (indicated as "3"), the SSID (indicated as "Guest"), the BSSID (indicated as 0E-21) and operating channel. Per-link Information field 1918 provides information for the represented VAP-4 610 such as the Link ID (indicated as "4"), the SSID (indicated as "Guest"), Nontransmitted BSSID Information 1920 and operating channel. Nontransmitted BSSID Information 1920 provides information for VAP-5 612 (since VAP-4 610 & VAP-5 612 are virtual APs of the same AP and form VAP Set 2) such as Transmitted BSSID (indicated as 0E-22), MaxBSSID Indicator and BSSID Index. It will be appreciated that while the Common control field and the Presence Bitmap field are not illustrated in ML element 1906, the ML element format is the same as the ML element 1500 in FIG. 15.

Figure 20:
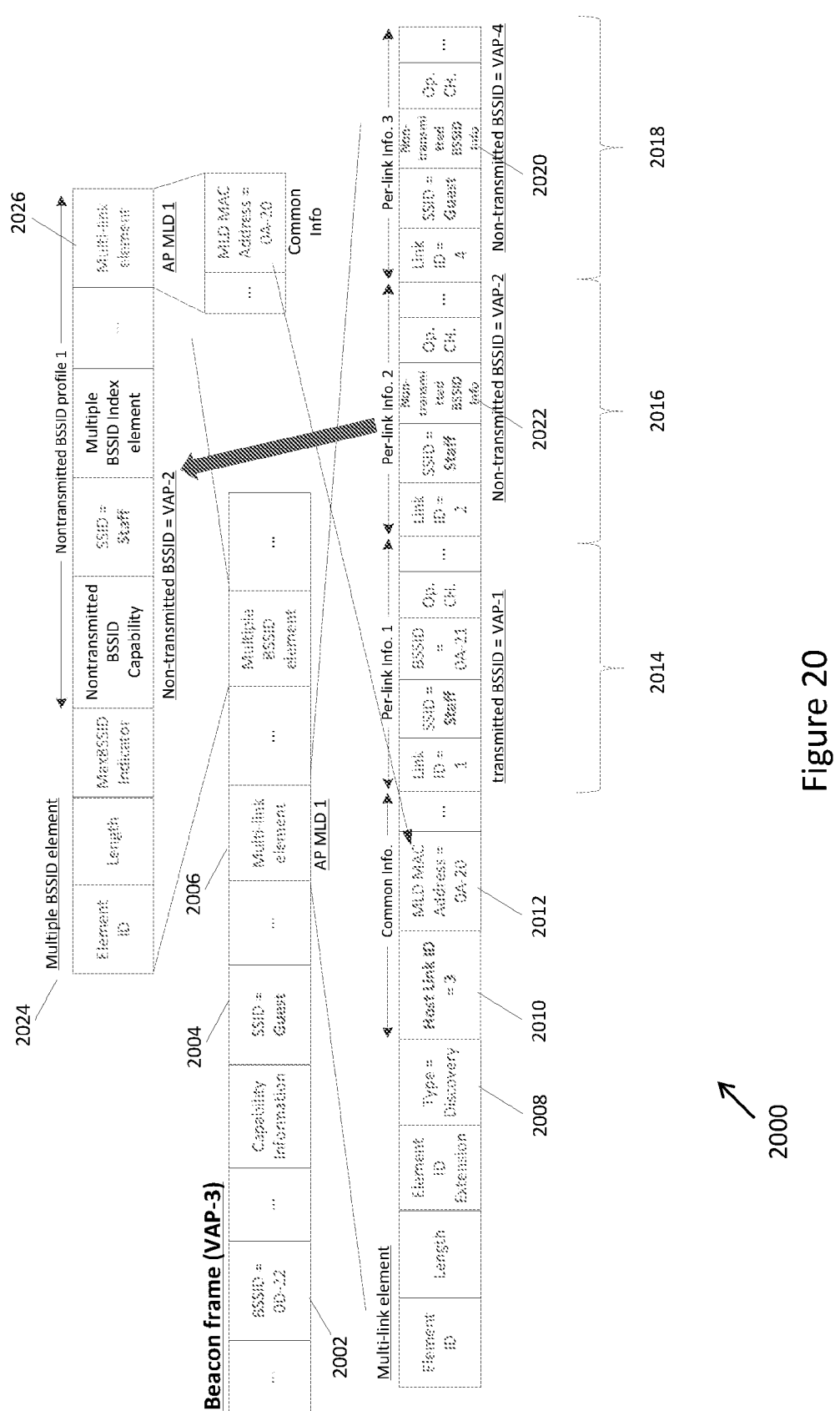
FIG. 20 depicts an illustration of a Beacon frame transmitted by a VAP-3 of the network as shown in FIGS. 6A and 6B in accordance with a first embodiment.

FIG. 20 depicts an illustration of a Beacon frame 2000 transmitted by VAP-3 608 of the network 600 as shown in FIGS. 6A and 6B in accordance with a first embodiment. The Beacon frame 2000 indicates BSSID MAC address 2002 of VAP-3 608 as "0D-22" and associated SSID 2004 as "Guest". Multi-link element 2006 indicates Type field 2008 as "Discovery". Under common information, Host Link ID 2010 is set as "3" indicating that the Link ID assigned to the host link is 3, and MLD MAC address 2012 is indicated as "0A-20". Multi-link element 2006 also comprises 3 Per-link Information fields 2014, 2016 and 2018 that represent AP-1 604, VAP-2 606 and VAP-4 610 respectively. Per-link Information field 2014 provides information for the represented AP-1 604 such as the Link ID (indicated as "1"), the SSID (indicated as "Staff"), the BSSID (indicated as "0A-21") and operating channel. Per-link Information field

2016 provides information for the represented VAP-2 606 such as the Link ID (indicated as "2"), the SSID (indicated as "Staff"), Nontransmitted BSSID Information 2022 and operating channel. Per-link Information field 2018 provides information for the represented VAP-4 610 such as the Link ID (indicated as "4"), the SSID (indicated as "Guest"), Nontransmitted BSSID Information 2020 and operating channel. Nontransmitted BSSID Information 2020 provides information for VAP-5 612 i.e. it points to a nontransmitted BSSID of a different VAP set.

The Beacon frame 2000 also comprises a Multiple BSSID element field 2024 providing information of nontransmitted BSSID VAP-2 606 (since VAP-2 606 & VAP-3 608 are virtual APs of the same AP and form VAP Set 1). The Multiple BSSID element field 2024 includes a nontransmitted BSSID profile for VAP-2 606, comprising at least information of the SSID (indicated as "Staff") and another Multi-link element 2026 that carries information of AP MLD1 since VAP-2 corresponds to the nontransmitted BSSID profile and is affiliated with AP MLD1. Nontransmitted BSSID Information 2022 points to this nontransmitted BSSID profile of VAP-2 606 (i.e. nontransmitted BSSID profile of the same VAP-set). Since the information of the MLD is already carried in the host frame 2000, the ML element 2026 carried in the Nontransmitted BSSID profile only carries the MLD MAC address (indicated as "0A-20") in the common information field, that can be used to reference back to the ML element 2006 in the host frame. It will be appreciated that while the Common control field and the Presence Bitmap field are not illustrated in ML elements 2006 and 2026, the ML element format is the same as the ML element 1500 in FIG. 15.

Figure 21:
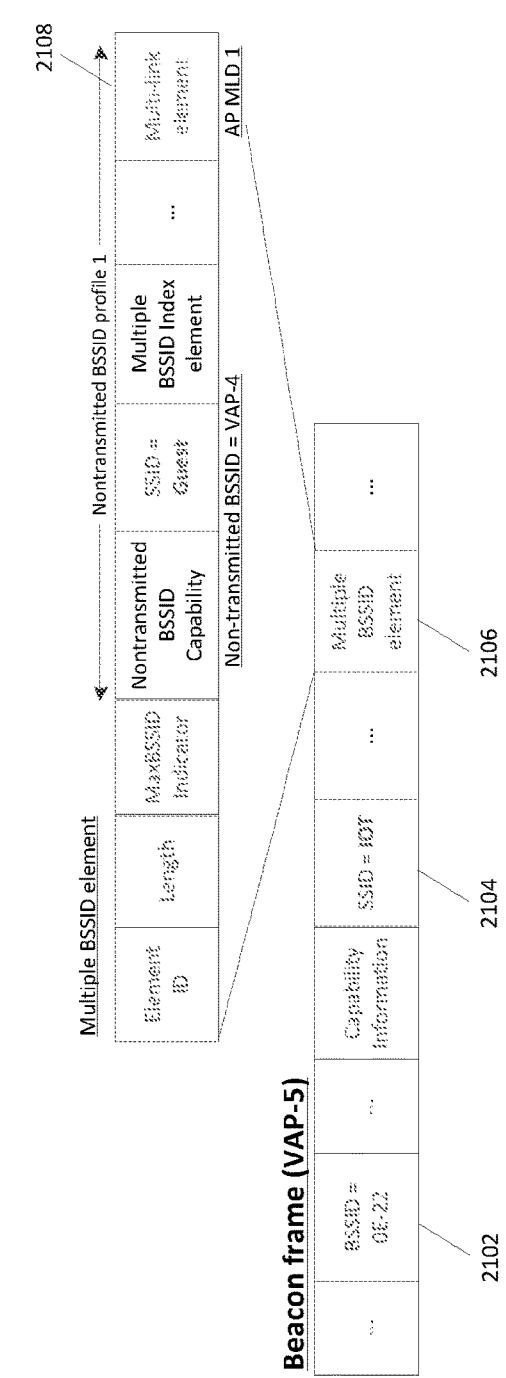
FIG. 21 depicts an illustration of a Beacon frame transmitted by a VAP-5 of the network as shown in FIGS. 6A and 6B in accordance with a first embodiment.

FIG. 21 depicts an illustration of a Beacon frame 2100 transmitted by VAP-5 612 of the network as shown in FIGS. 6A and 6B in accordance with a first embodiment. The Beacon frame 2100 indicates BSSID MAC address 2102 of VAP-5 604 as "0E-22" and associated SSID 2104 as "IOT". Multiple BSSID element 2106 provides information of nontransmitted BSSID VAP-4 610 (since VAP-4 610 & VAP-5 612 are virtual APs of the same AP and form VAP Set 1). The Multiple BSSID element field 2106 includes a nontransmitted BSSID profile for VAP-4 610, comprising at least information of the SSID (indicated as "Guest") and a Multi-link element 2108. Generally, a nontransmitted BSSID profile of a VAP that is part of an AP MLD also carries a Multi-link element that carry MLD related information. In this case, Multi-link element 2108 carries the MLD related information of AP MLD 602.

Figure 22:
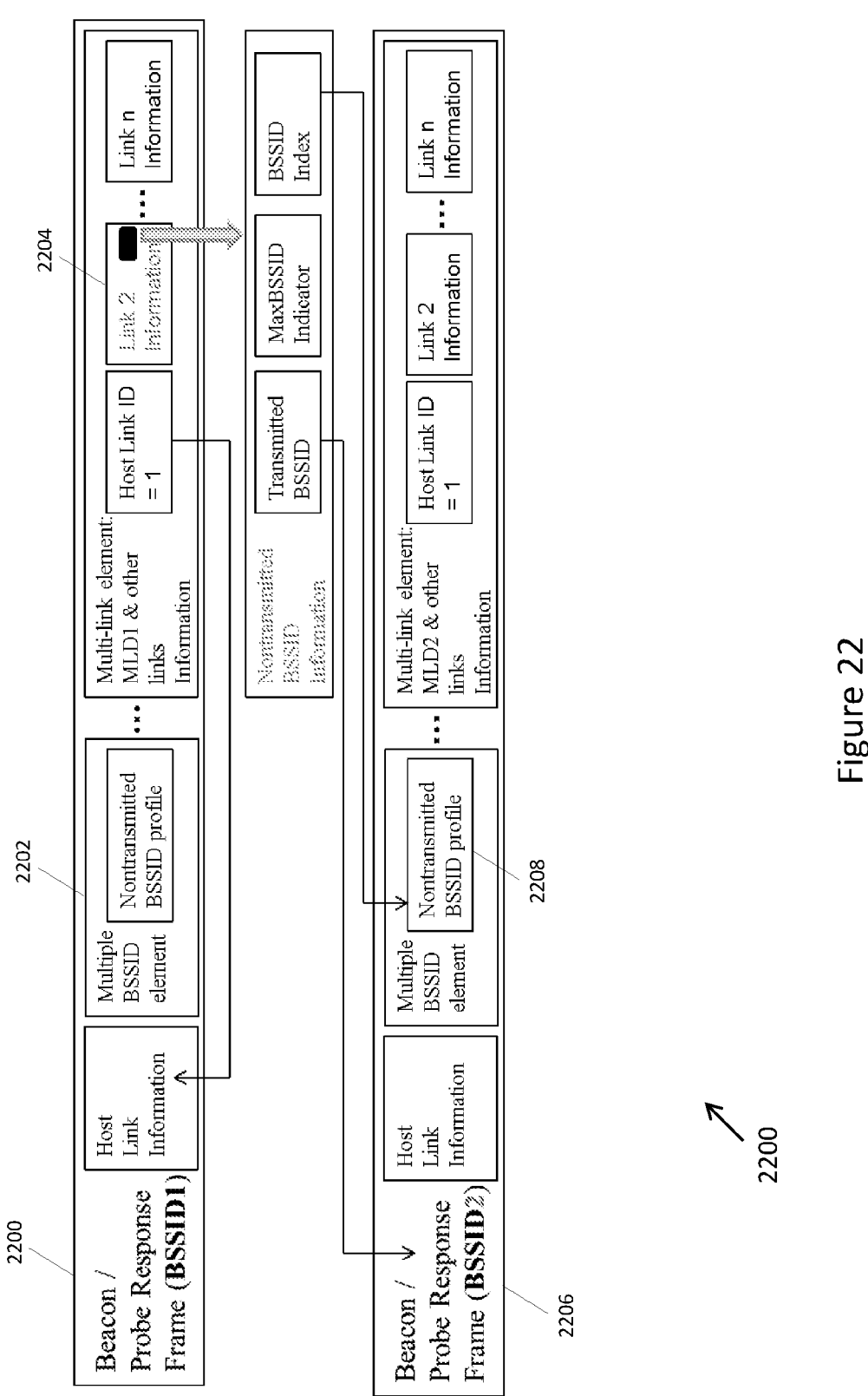
FIG. 22 depicts a simplified illustration of Beacon/Probe Response frame configured for Tier 2 virtualization in accordance with a first embodiment.

Under Tier-2 virtualization, Beacon and Probe Response frames have the same format as Tier 1 except that since all VAP of an AP MLD advertise the same SSID, the SSID field is not advertised in individual per-link information fields. The SSID field may be advertised in the Common Information field of the Multi-link element, or may be skipped altogether if the value is the same as the SSID advertised by the host Beacon or Probe Response frame. In Tier 2 virtualization, VAPs of the same physical AP cannot be in the same MLD, so the nontransmitted BSSID information in the Per-link Information field cannot be found in the Multiple BSSID element of the host frame but must be recovered from the RNR or Neighbor Report elements carried in the host frame or from Multiple BSSID element carried in other AP's Beacon or Probe Response frames. For example in FIG. 22, in the case of Beacon/Probe Response frame 2200 for a BSSID1, nontransmitted BSSID information in Link 2 Information field 2204 cannot be found in Multiple BSSID element 2202 of the host frame 2200 but must be recovered from Multiple BSSID element 2208 carried in Beacon/Probe Response frame 2206 for a BSSID2. The Transmitted BSSID field in the Nontransmitted BSSID Information points to the Beacon frame 2206 of BSSID2, while the BSSID Index is used to locate the nontransmitted BSSID profile in the Multiple BSSID element carried in the Beacon frame 2206.

Figure 23:
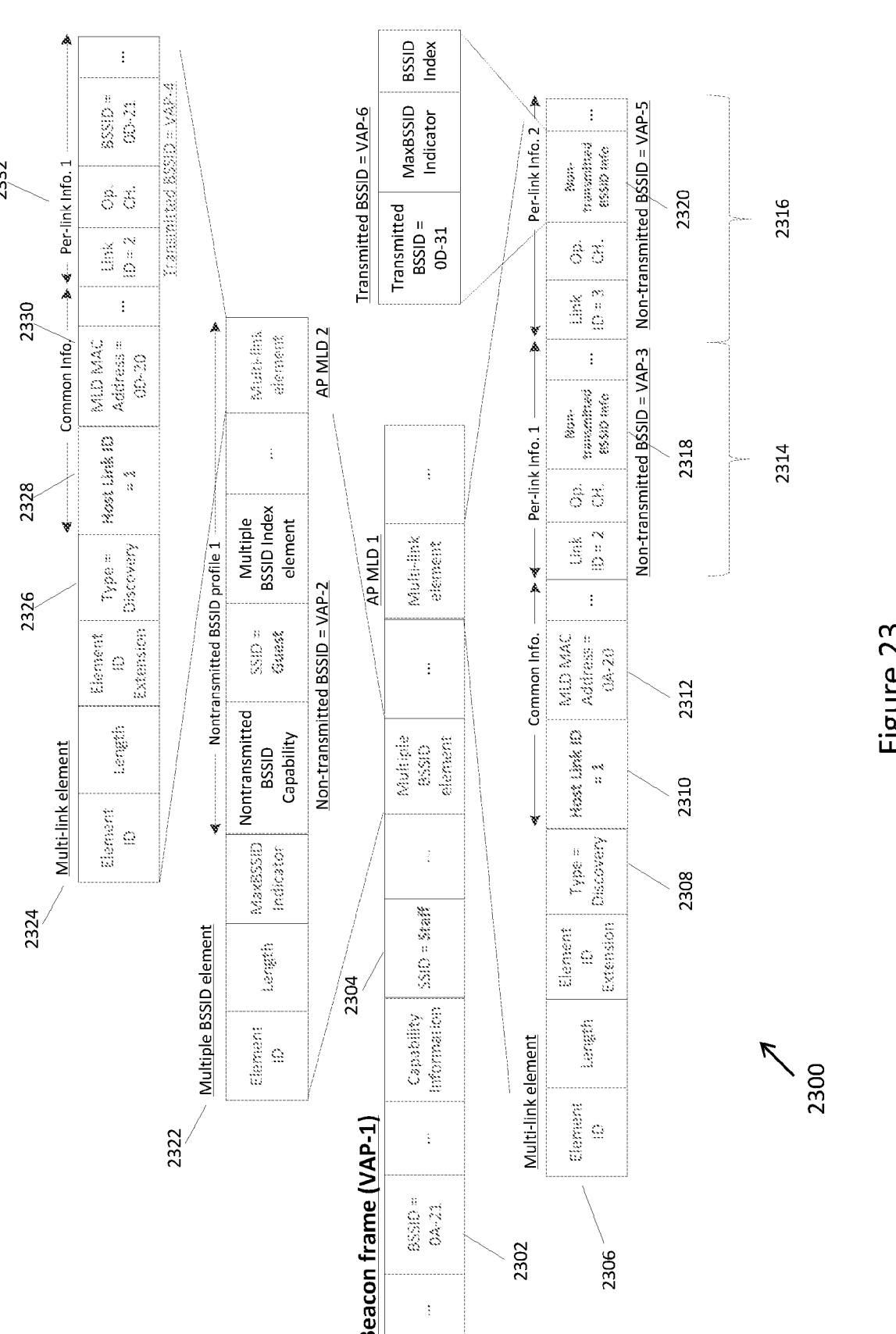
FIG. 23 depicts an illustration of a Beacon frame transmitted by a VAP-1 of the network as shown in FIGS. 10A and 10B in accordance with a first embodiment.

FIG. 23 depicts an illustration of a Beacon frame 2300 transmitted by VAP-1 1008 of the network 1000 as shown in FIGS. 10A and 10B in accordance with a first embodiment. The Beacon frame 2300 indicates BSSID MAC address 2302 of VAP-1 1008 as "0A-21" and associated SSID 2304 as "Staff". Multi-link element 2306 indicates Type field 2308 as "Discovery". Under common information, Host Link ID 2310 is indicated as "1" and MLD MAC address 2312 is indicated as "0A-20" (i.e. the MAC Address of AP MLD1 1002). Multi-link element 2306 also comprises 2 Per-link Information fields 2314 and 2316 that represent VAP-3 1012 and VAP-5 1016 respectively. Per-link Information field 2314 provides information for the represented VAP-3 1012 such as the Link ID (indicated as "2"), operating channel and Nontransmitted BSSID Information 2318. Per-link Information field 2316 provides information for the represented VAP-5 1016 such as the Link ID (indicated as "3"), operating channel and Nontransmitted BSSID Information 2320. Nontransmitted BSSID Information 2320 provides information for VAP-6 1018 such as Transmitted BSSID (indicated as 0D-31), MaxBSSID Indicator and BSSID Index.

The Beacon frame 2300 also comprises a Multiple BSSID element 2322 providing information of nontransmitted BSSID VAP-2 1010 (since VAP-1 1008 & VAP-2 1010 form a VAP Set 1). The Multiple BSSID element 2322 includes a nontransmitted BSSID profile 1 for VAP-2 1010, comprising at least information of the SSID (indicated as "Guest") and another Multi-link element 2324. Multi-link element 2324 indicates Type field 2326 as "Discovery". Under common information, Host Link ID 2328 is set as "1" and indicates the Link ID assigned to the host link on which the Beacon frame 2300 is transmitted; and MLD MAC address 2330 is indicated as "0D-20" (i.e. the MAC Address of AP MLD2 1004). Multi-link element 2324 also comprises a Per-link Information field 2332 that represent VAP-4 1014, providing information for the represented VAP-4 1014 such as the Link ID (indicated as "2"), operating channel and BSSID (indicated as 0D-21). It will be appreciated that while the Common control field and the Presence Bitmap field are not illustrated in ML elements 2306 and 2324, the ML element format is the same as the ML element 1500 in FIG. 15.

It is to be noted that in the ML element 2324 carried within the nontransmitted BSSID profile 1 of the Multiple BSSID element 2322 in the Beacon frame 2300 transmitted by VAP-1 1008, the Host link ID field indicates the Link ID (1) assigned to the VAP corresponding to the nontransmitted BSSID profile 1 (i.e. VAP-2 1010). In this example the Link ID happens to be same as the Link ID (1) assigned to the VAP transmitting the Beacon frame 2300, but they would have been different if a global Link ID assignment was used instead of local Link ID assignment. Also, since all the links of the AP MLD2 advertise the same SSID, MLD level SSID may be defined for AP MLD2 and the SSID fields are omitted in the per-link info. Fields of the ML element 2324.

Figure 24:
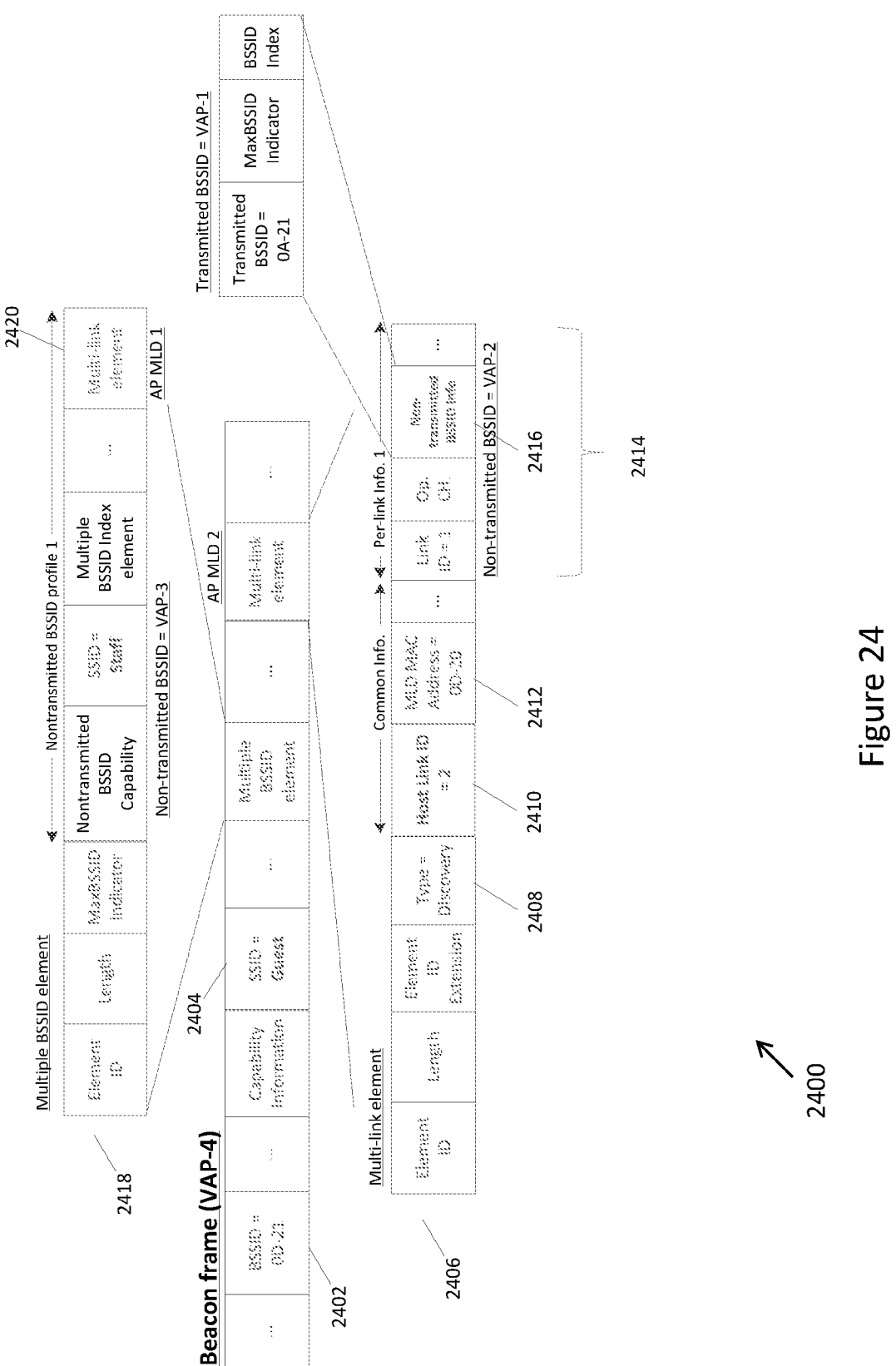
FIG. 24 depicts an illustration of a Beacon frame transmitted by a VAP-4 of the network as shown in FIGS. 10A and 10B in accordance with a first embodiment.

FIG. 24 depicts an illustration of a Beacon frame 2400 transmitted by VAP-4 1014 of the network 1000 as shown in FIGS. 10A and 10B in accordance with a first embodiment. The Beacon frame 2400 indicates BSSID MAC address 2402 of VAP-4 1014 as "0D-21" and associated SSID 2404 as "Guest". Multi-link element 2406 indicates Type field 2408 as "Discovery". Under common information, Host Link ID 2410 is indicated as "2" and MLD MAC address 2412 is indicated as "0D-20". Multi-link element 2406 also comprises a Per-link Information field 2414 that represent VAP-2 1010. Per-link Information field 2414 provides information for the represented VAP-2 1010 such as the Link ID (indicated as "1"), operating channel and Nontransmitted BSSID Information 2416. Nontransmitted BSSID Information 2416 provides information for VAP-1 1008 such as Transmitted BSSID (indicated as 0A-21), MaxBSSID Indicator and BSSID Index.

The Beacon frame 2400 also comprises a Multiple BSSID element 2418 providing information of nontransmitted BSSID VAP-3 1012 (since VAP-3 1012 & VAP-4 1014 form a VAP Set). The Multiple BSSID element 2418 includes a nontransmitted BSSID profile 1 for VAP-3 1012, comprising at least information of the SSID (indicated as "Staff") and another Multi-link element 2420 that carries the MLD MAC address of the AP MLD1 1002 in its common information field. It will be appreciated that while the Common control field and the Presence Bitmap field are not illustrated in ML elements 2406 and 2420, the ML element format is the same as the ML element 1500 in FIG. 15.

Figure 25:
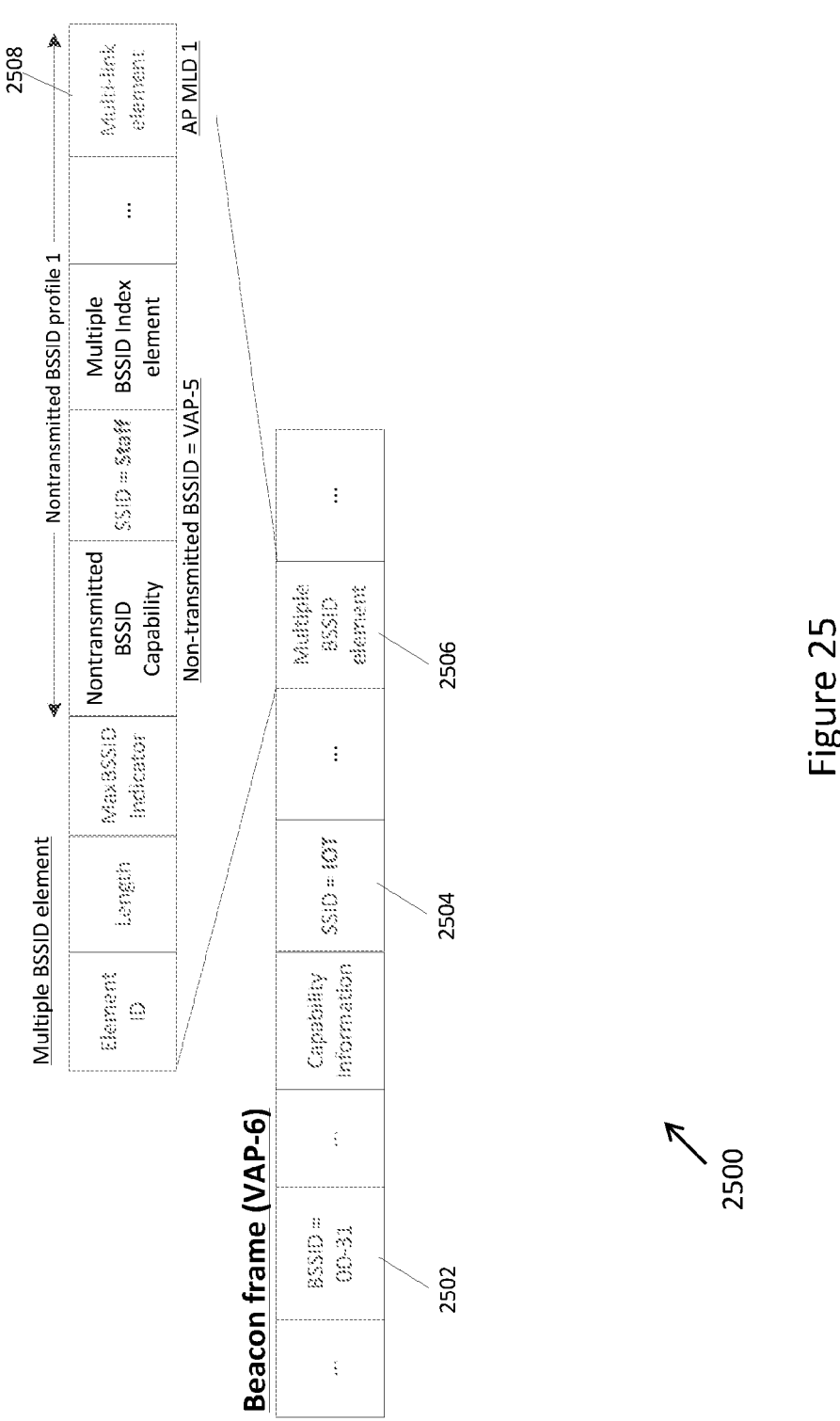
FIG. 25 depicts an illustration of a Beacon frame transmitted by a VAP-6 of the network as shown in FIGS. 10A and 10B in accordance with a first embodiment.

FIG. 25 depicts an illustration of a Beacon frame 2500 transmitted by VAP-6 1018 of the network 1000 as shown in FIGS. 10A and 10B in accordance with a first embodiment. The Beacon frame 2500 indicates BSSID MAC address 2502 of VAP-6 1018 as "0D-31" and associated SSID 2504 as "IOT". The Beacon frame 2500 also comprises a Multiple BSSID element 2506 providing information of nontransmitted BSSID VAP-5 1016 (since VAP-5 1016 & VAP-6 1018 form a VAP Set). The Multiple BSSID element 2506 includes a nontransmitted BSSID profile 1 for VAP-5 1016, comprising at least information of the SSID (indicated as "Staff") and another Multi-link element 2508 that carries the MLD MAC address of the AP MLD1 1002 in its common information field.

Figure 26:
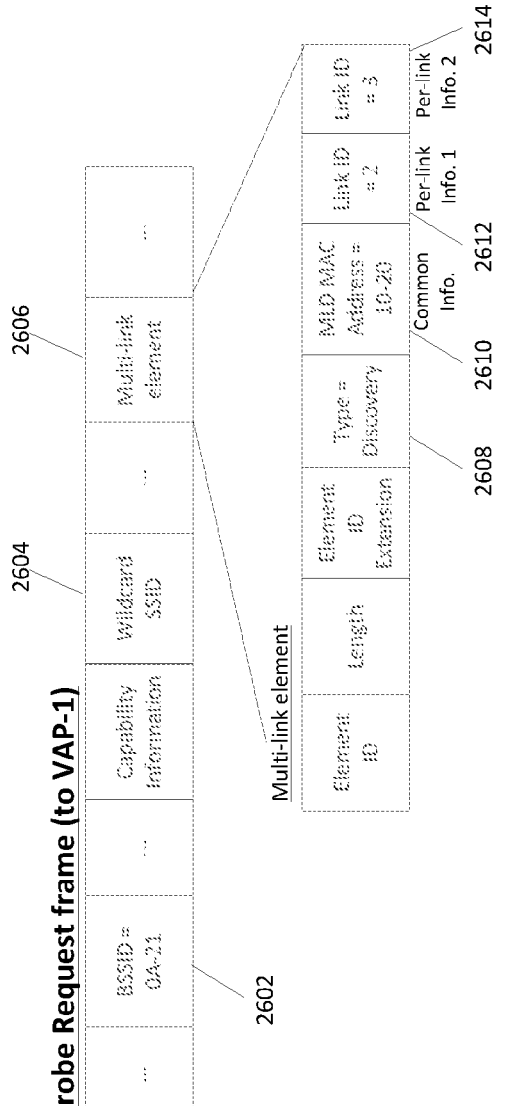
FIG. 26 depicts an illustration of a Probe Request frame transmitted by a non-AP MLD to a VAP-1 of the network as shown in FIGS. 10A and 10B in accordance with a first embodiment.

A non-AP MLD can request full information about other links of an AP MLD by sending a Probe Request frame on any one link of the AP MLD. FIG. 26 depicts an illustration of a Probe Request frame 2600 transmitted by a non-AP MLD to VAP-1 1008 of the network 1000 as shown in FIGS. 10A and 10B in accordance with a first embodiment. The Probe Request frame 2600 comprises a BSSID field 2602 indicated as "A-21" i.e. the MAC address of VAP-1 1008, a Wildcard SSID 2604 and a Multi-link element 2606. The Multi-link element 2606 indicates Type field 2608 as "Discovery". Under common information, MLD MAC address 2610 is indicated as "10-20" and signals the AP MLD whose information is desired. Multi-link element 2606 also comprises two Per-link Information fields 2612 and 2614 indicating Link ID 2 and Link ID 3 respectively. In other words, the multi-link element 2606 indicates the AP MLD and the Links for which full information is desired. The Per-link information fields indicate the additional links (i.e. other than the link on which the frame is transmitted) for which further information is desired. If information of all the links of the AP MLD are desired, the Per-link information fields may be omitted.

Figure 27:
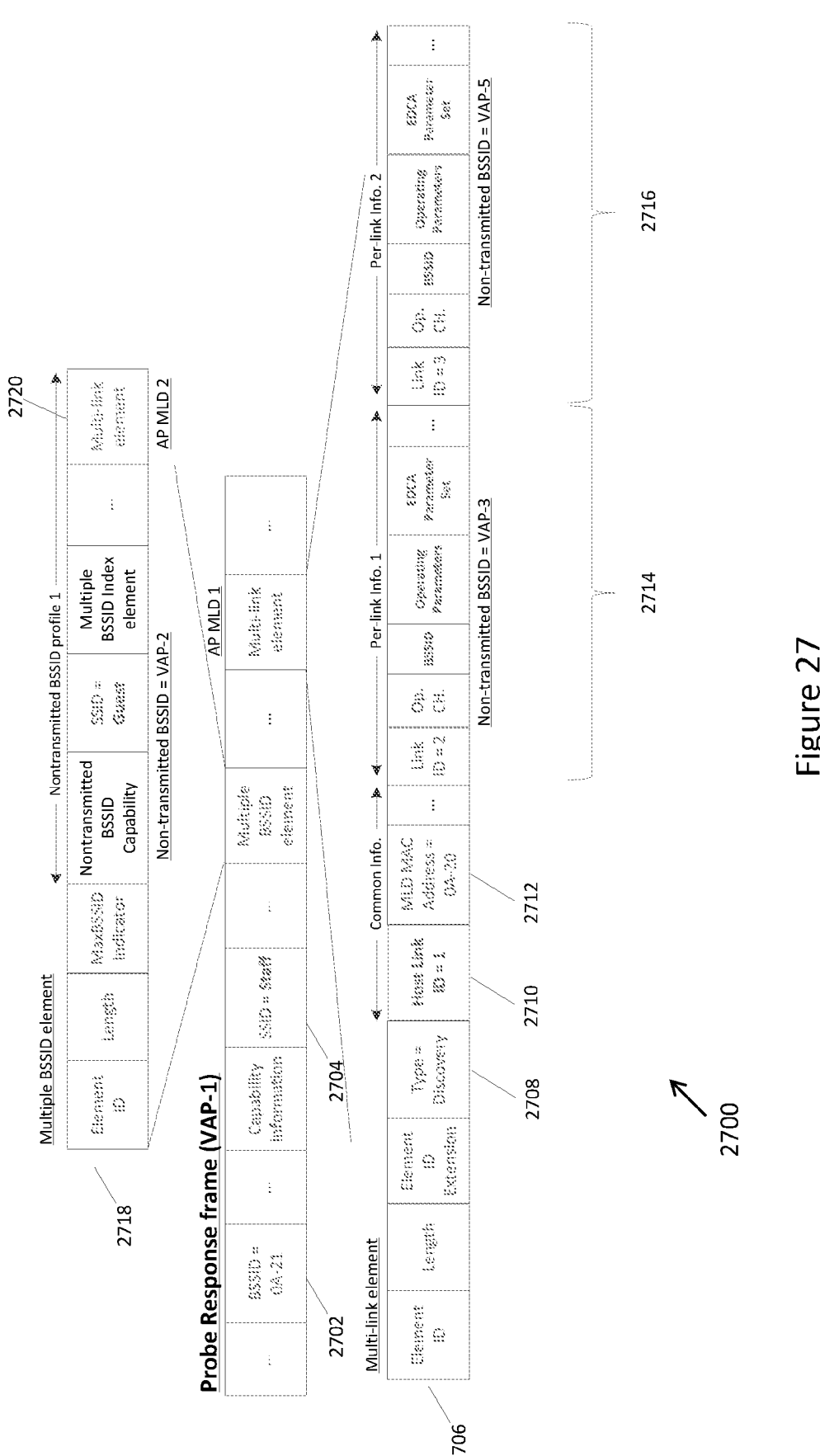
FIG. 27 depicts an illustration of a Probe Response frame transmitted from VAP-1 of the network as shown in FIGS. 10A and 10B to a non-AP MLD in accordance with a first embodiment.

In response to the Probe Request frame 2600, the AP MLD sends a unicast Probe Response frame 2700 that carry full information about the requested links i.e. Link IDs 1, 2 and 3 as shown in FIG. 27. Probe Response frame 2700 is sent is transmitted from VAP-1 1008 to the non-AP MLD that transmitted the Probe Request frame 2600. The Probe Response frame 2700 indicates BSSID MAC address 2702 of VAP-1 1008 as "0A-21" and associated SSID 2704 as "Staff". Multi-link element 2706 indicates Type field 2708 as "Discovery". Under common information, Host Link ID 2710 is indicated as "1" and MLD MAC address 2712 is indicated as "0A-20". Multi-link element 2706 also comprises 2 Per-link Information fields 2714 and 2716 that represent VAP-3 1012 and VAP-5 1016 respectively. Per-link Information field 2714 provides information for the represented VAP-3 1012 such as the Link ID (indicated as "2"), operating channel, BSSID, Operating Parameters and EDCA Parameter Set. Per-link Information field 2716 provides information for the represented VAP-5 1016 such as the Link ID (indicated as "3"), operating channel, BSSID, Operating Parameters and EDCA Parameter Set. In other words, the multi-link element 2706 includes the full information of the requested links, including those that correspond to Nontransmitted BSSIDs.

The Probe Response frame 2700 also comprises a Multiple BSSID element 2718 providing information of nontransmitted BSSID VAP-2 1010 (since VAP-1 1008 & VAP-2 1010 form a VAP Set). The Multiple BSSID element 2718 includes a nontransmitted BSSID profile 1 for VAP-2 1010, comprising at least information of the SSID (indicated as "Guest") and another Multi-link element 2720 that carries the MLD MAC address of the AP MLD2 1004 in its common information field. It will be appreciated that while the Common control field and the Presence Bitmap field are not illustrated in ML elements 2706 and 2720, the ML element format is the same as the ML element 1500 in FIG. 15. Instead of Unicast Probe Response frames, Broadcast Probe response frames may also be used if multiple probe requests are received at almost same time, or if it is near the TBTT, Beacon frame may carry full information instead of a Probe Response frame.

Figure 28:
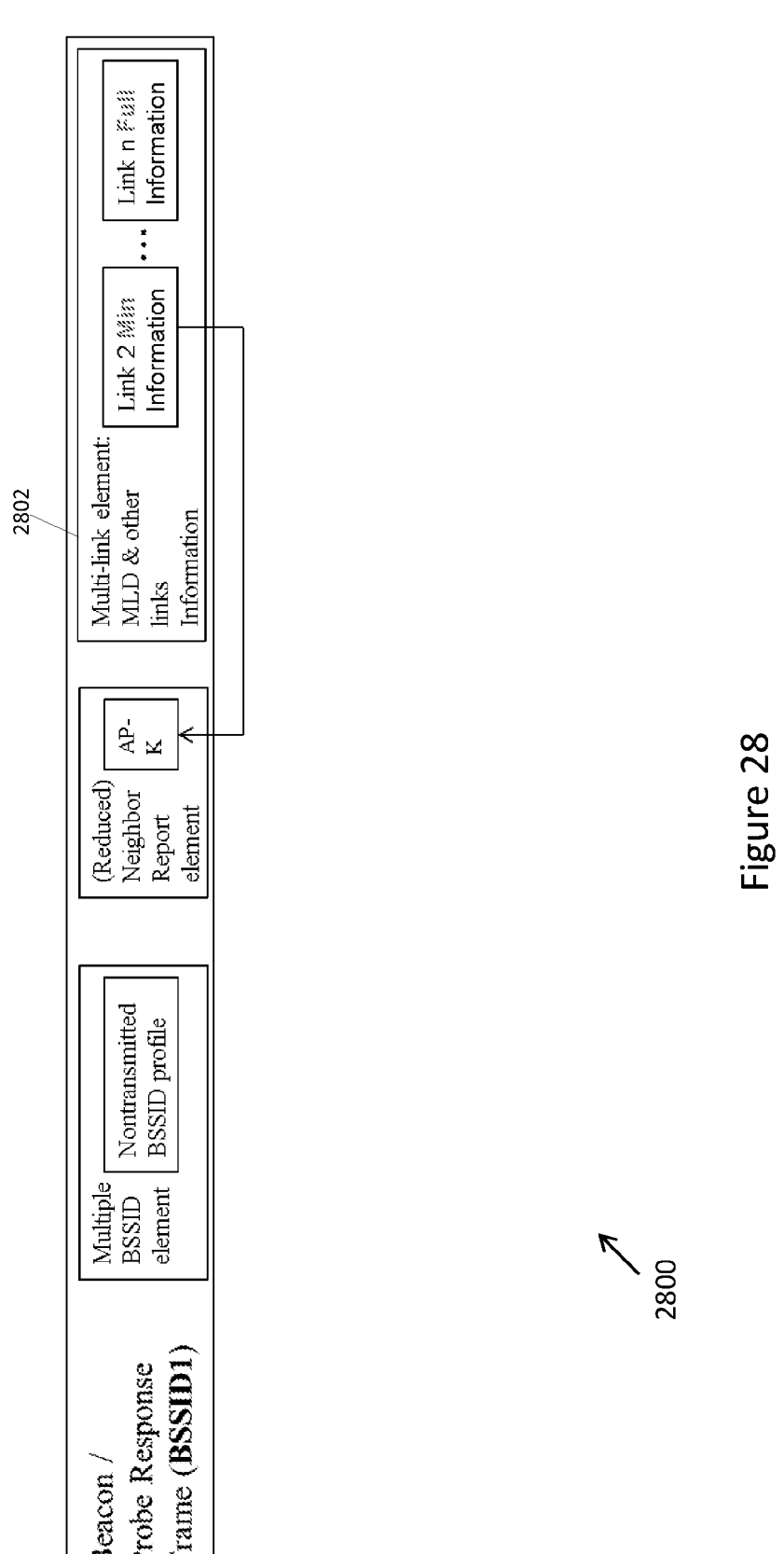
FIG. 28 depicts a simplified illustration of a Beacon/Probe Response frame in accordance with a second embodiment.

In the second embodiment, Beacon & Probe Response frames may carry RNR elements and/or Neighbor Report elements that carry information of the other APs (co-located or not co-located). The elements also indicate the MLD MAC address and the Link ID associated with APs that are affiliated with MLDs. Further, nontransmitted BSSIDs whose profiles are included in Multiple BSSID element in the same frame are not included. As can be seen in Beacon/Probe Response frame 2800 of FIG. 28, the Multi-link element 2802 carries minimal information of links already included in the RNR/Neighbor Report elements (Link ID), and carry basic/full information of the other links (Link ID, SSID, BSSID, Operating channel, TBTT etc.) except the host link.

Taking network 1000 of FIG. 10A as an example, in Beacon frames transmitted by VAP-1 1008, if VAP-2 1010 & VAP-3 1012 are nontransmitted BSSID, information about VAP-4 1014, VAP-5 1016 & VAP-6 1018 are carried in Reduced Neighbor Report elements, while the Multi-link element carry full information of VAP-3 1012 & minimal information of VAP-5 1016. However, if all VAPs are co-hosted APs that transmit their own Beacons, they may also be included in the Reduced Neighbor Report elements. Advantageously, non-AP MLDs can receive information of all the APs hosted on the same device from a single frame.

Figure 29:
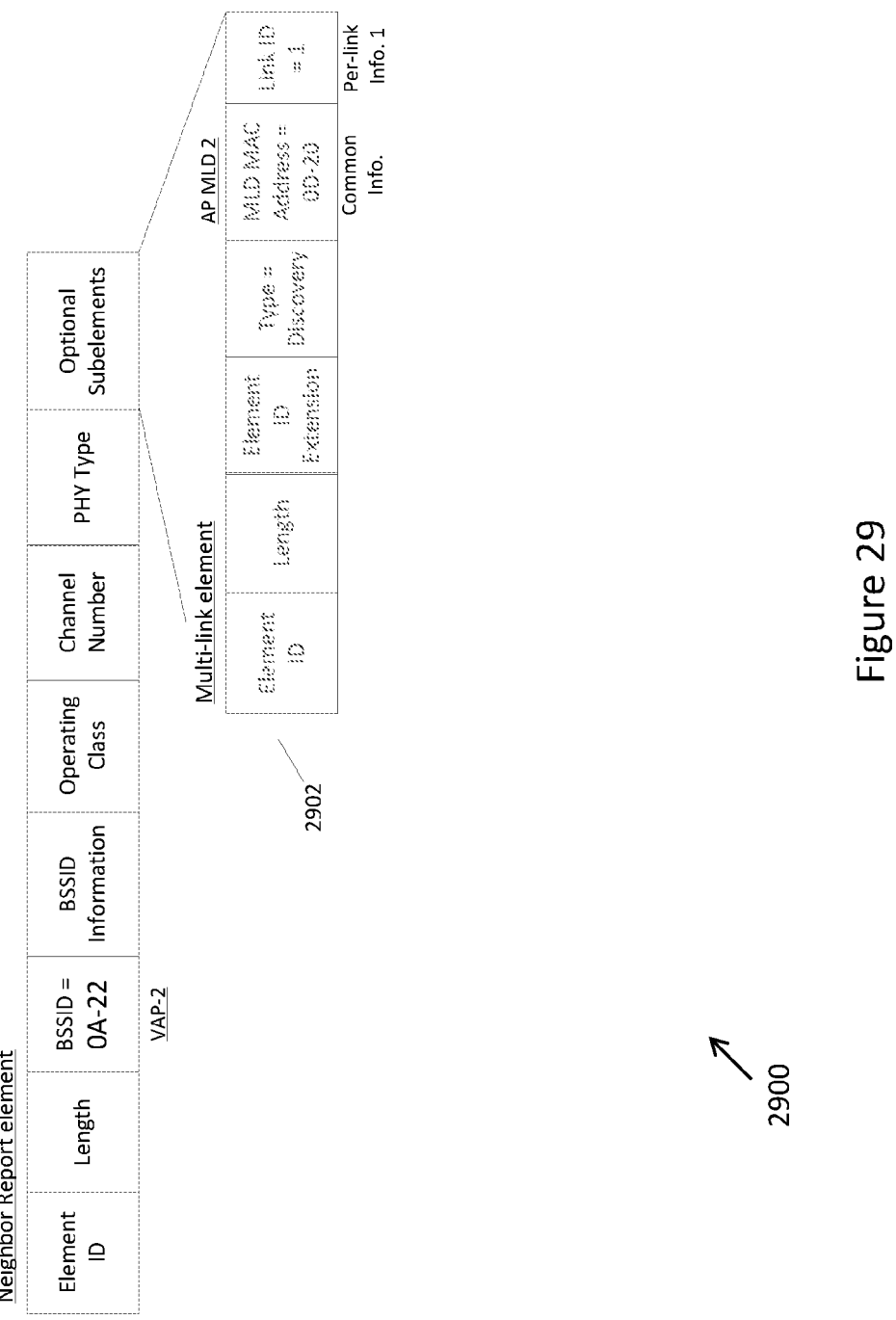
FIG. 29 depicts an illustration of a Neighbor Report (NR) element in accordance with a second embodiment.

In an example, a Neighbor Report element 2900 as shown in FIG. 29 may be used to provide information of an AP or VAP, wherein a Multi-link element 2902 may be included as an optional subelement. In this case, the Neighbor Report element 2900 provides information of the VAP-2 1010 in FIG. 10A, and is affiliated with AP MLD2 1004 and indicates BSSID corresponding to VAP-2 as "0A-22". The multi-link element 2902 indicates the AP MLD and the Link ID with which this AP (VAP-2) is affiliated with. For example, the Multi-link element 2902 indicates Type field 2904 as "Discovery". Under common information, MLD MAC address 2906 is indicated as "0D-20" i.e. the MLD MAC address of AP MLD2 1004. The Multi-link element 2902 also comprises a Per-link Information field 2908 that represent VAP-2 and provides information for the represented VAP-2 such as the Link ID (indicated as "1").

Figure 30:
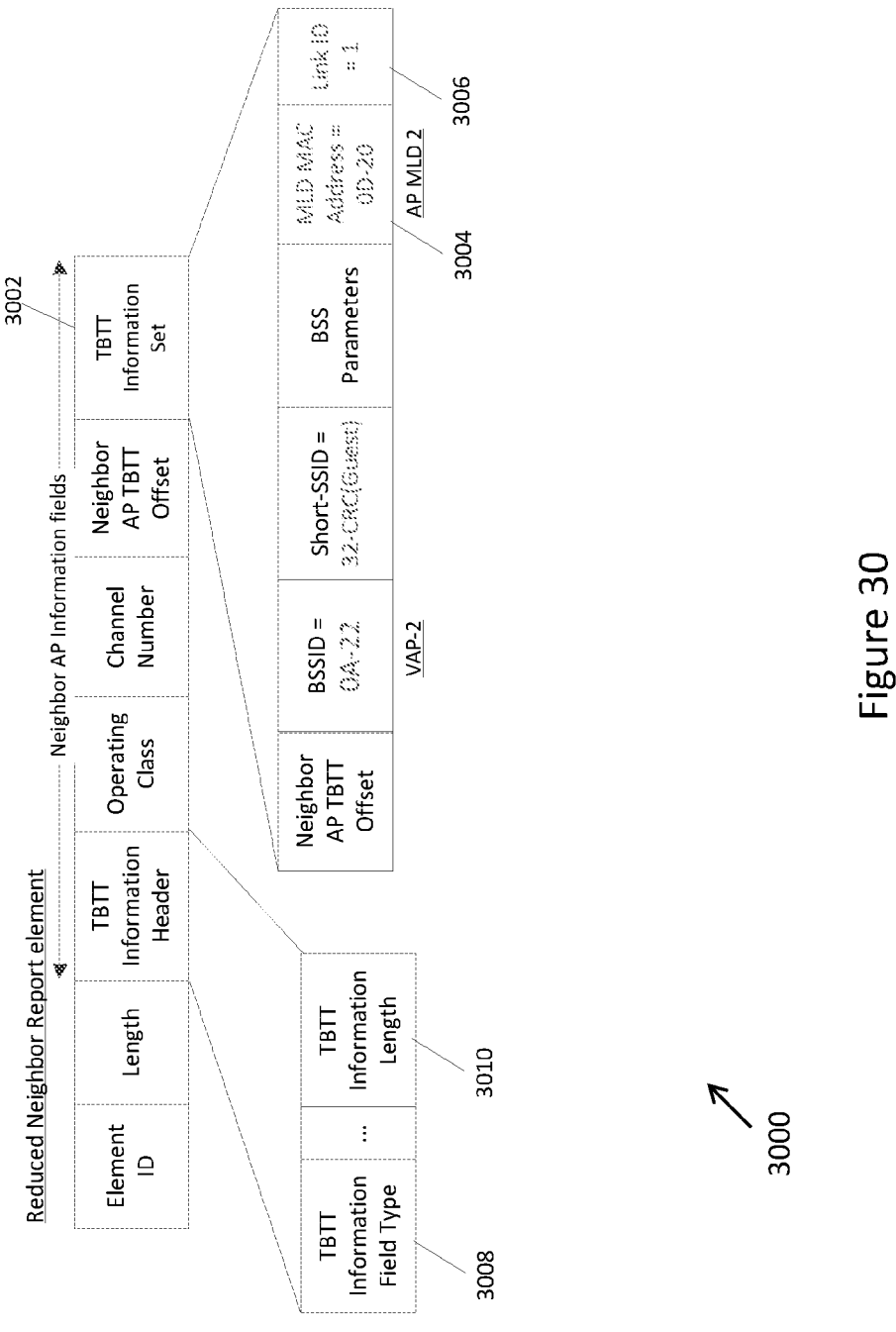
FIG. 30 depicts an illustration of a Reduced Neighbor Report (RNR) element in accordance with a second embodiment.

In an example, a Reduced Neighbor Report element 3000 as shown in FIG. 30 may be used to provide information of multiple APs or VAPs. In this case, Reduced Neighbor Report element 3000 provides information for a VAP-2 1010 in FIG. 10A, and is affiliated with AP MLD2 1004, indicating in TBTT Information set field 3002 the BSSID of VAP-2 and indicating Short-SSID of VAP-2 as "32-CRC(Guest)". Two fields are also added to the TBTT Information set field 3002. The new added fields 3004 and 3006 indicate respectively the AP MLD MAC address and the Link ID with which this AP (VAP-2) is affiliated with. The "TBBT Information Field Type" sub-field 3008 by itself or together with the "TBTT Information Length" subfield 3010 of the RNR element indicates the presence of additional the MLD Information. For example, if "TBBT Information Field Type" is set to a value other than 0, it indicates that the TBTT Information Set carries the MLD information. E.g. if set to 1, the Link ID field is carried, and if it is set to 2, both Link ID and MLD MAC Address are carried. Alternatively, if the "TBTT Information Length" is set to 13, the Link ID field is carried, and if it is set to 18, the MLD MAC Address is carried, and if set to 19, both Link ID and MLD MAC Address are carried.

Figure 31:
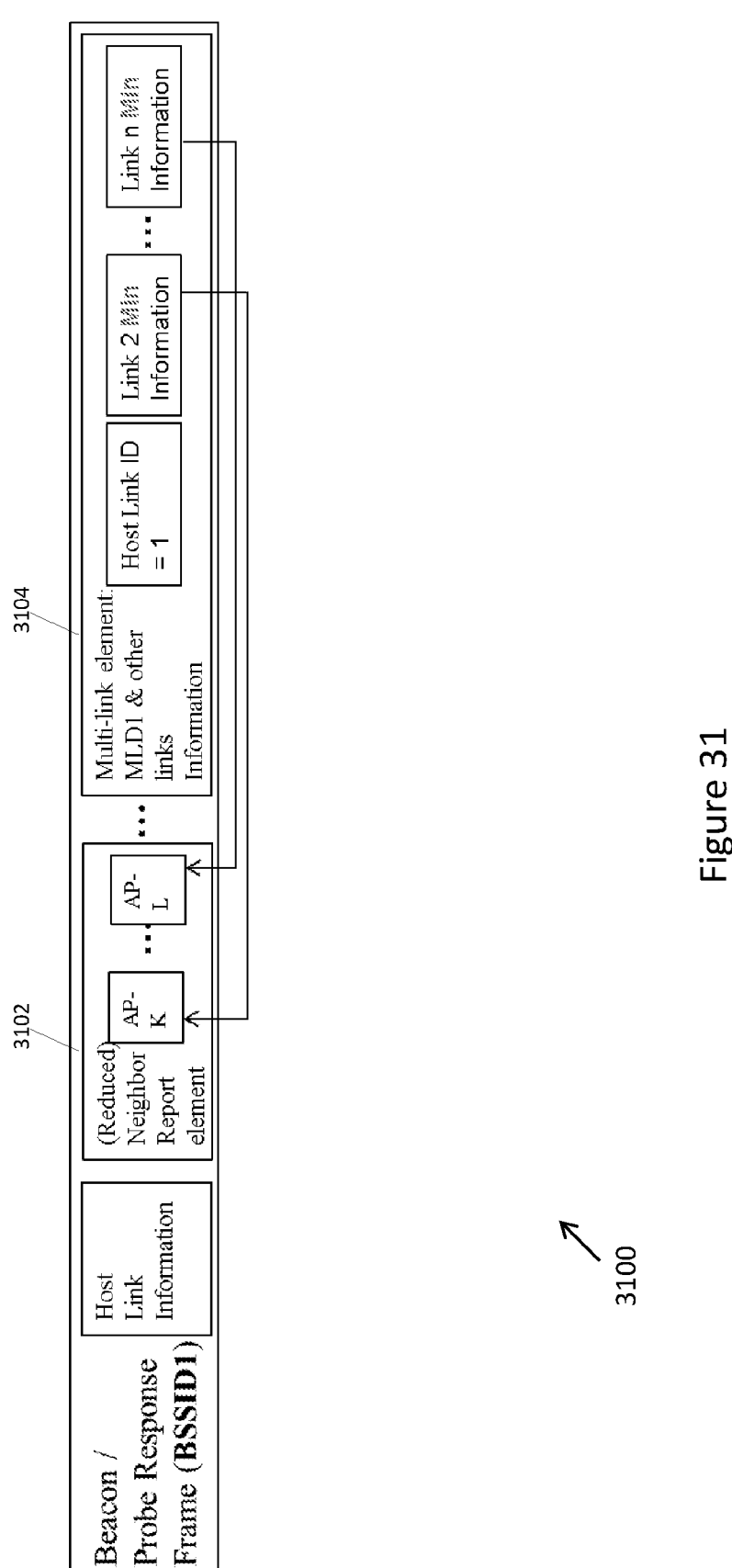
FIG. 31 depicts a simplified illustration of a Beacon/Probe response frame in accordance with a third embodiment.

In the third embodiment, Beacon & Probe Response frames carry a Multi-link element that carries MLD common information (e.g. MLD MAC Address) as well as information of the other links of the MLD. Host frame carries RNR elements or Neighbor Report elements that carry information of all the co-located APs. Link IDs are allocated in a global manner for all co-located MLDS. As shown in Beacon/Probe Response frame 3100 of FIG. 31, Multi-link element 3104 carries minimal information of the other links (Link ID, BSSID) which is used to reference to the RNR or Neighbor Report element 3102 for more information. Advantageously, no modifications are made to the RNR or Neighbor Report elements for legacy compatibility. BSSID is used to link information in the RNR element or Neighbor Report elements to the Multi-link element. This is because the RNR element will always carry the BSSID of the reported AP. Non-AP MLDs can use the information in the Multi-link element and the RNR element or Neighbor Report elements to initiate Multi-link Setup without needing to scan the other links to gather full information of the links.

Figure 32:
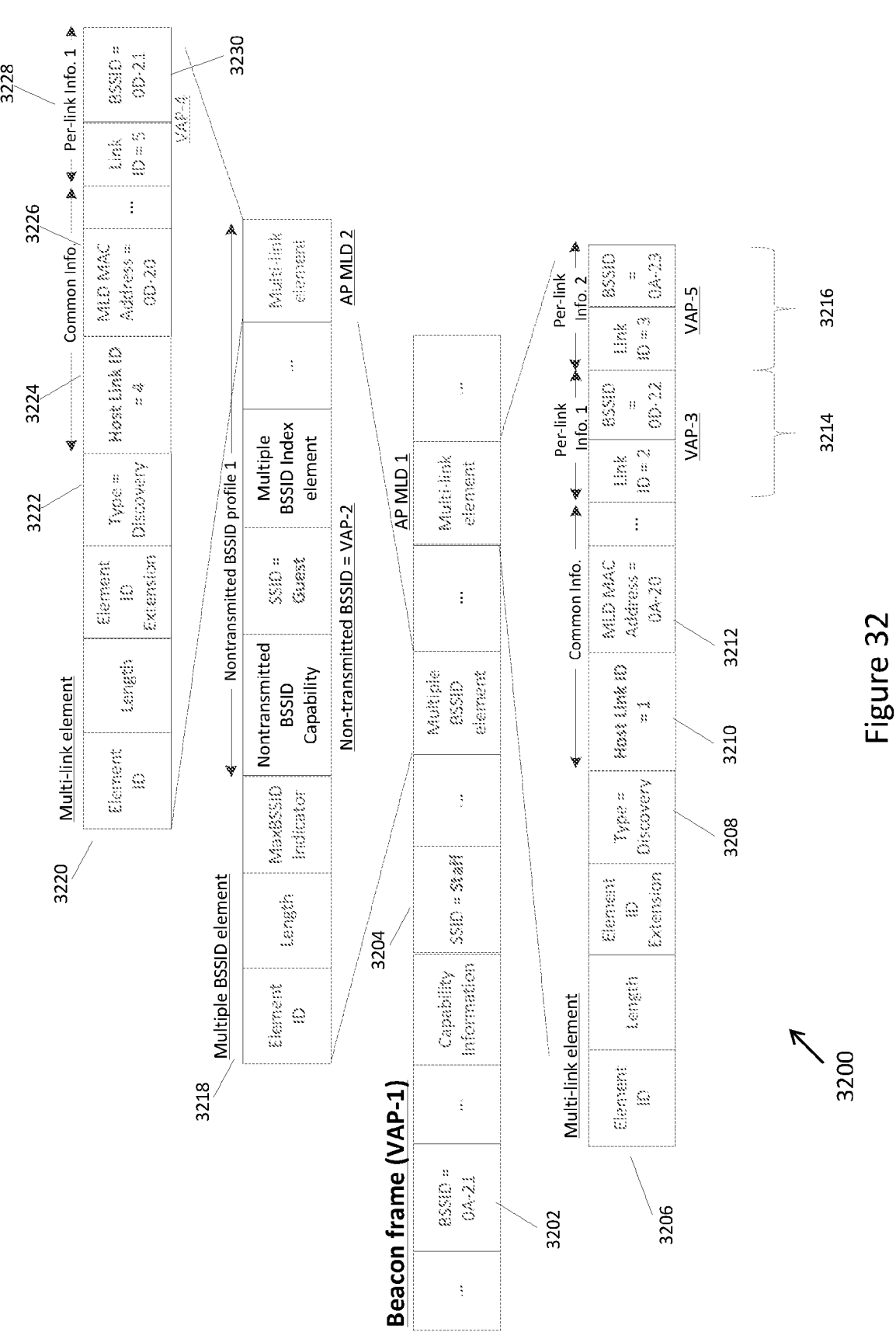
FIG. 32 depicts an illustration of a Beacon frame transmitted by VAP-1 of the network as shown in FIGS. 10A and 10B in accordance with a third embodiment.

FIG. 32 depicts an illustration of a Beacon frame transmitted by VAP-1 1008 of the network 1000 as shown in FIGS. 10A and 10B in accordance with a third embodiment. In this example, the assignment of Link IDs is global for co-located AP MLDs i.e. Link IDs of co-located MLDs do not repeat. E.g.: Link IDs of AP MLD 1: 1 (VAP-1), 2 (VAP-3), 3 (VAP-5), Link IDs of AP MLD 2: 4 (VAP-2), 5 (VAP-4). The Beacon frame 3200 indicates BSSID MAC address 3202 of VAP-1 1008 as "0A-21" and associated SSID 3204 as "Staff". Multi-link element 3206 carries information of the AP MLD with which VAP-1 1008 is affiliated with i.e. the AP MLD1 1002. The Multi-link element 3206 indicates Type field 3208 as "Discovery". Under common information, Host Link ID 3210 is set as "1" indicating that VAP-1 1008 operates on the link that is assigned Link ID 1, and MLD MAC address 3212 is indicated as "0A-20". Multi-link element 3206 also comprises 2 Per-link Information fields 3214 and 3216 that represent the other APs affiliated with AP MLD1 1002, i.e. VAP-3 1012 and VAP-5 1016 respectively. Per-link Information field 3214 provides information for the represented VAP-3 1012 such as the Link ID (indicated as "2") and BSSID indicated as "0D-22". Per-link Information field 3216 provides information for the represented VAP-5 1016 such as the Link ID (indicated as "3") and BSSID indicated as "0A-23".

Figure 33:
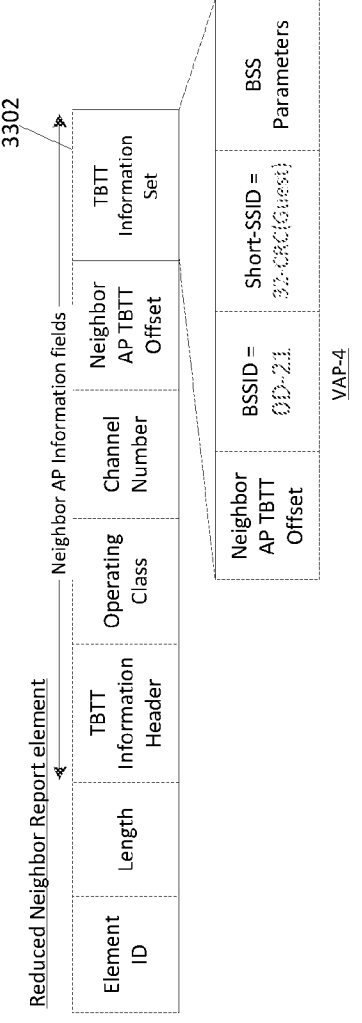
FIG. 33 depicts an illustration of a Reduced Neighbor Report element in the Beacon frame as shown in FIG. 32 in accordance with a third embodiment.

The Beacon frame 3200 transmitted by VAP-1 1008 also comprises a Multiple BSSID element 3218 providing information of nontransmitted BSSID VAP-2 1010 (since VAP-1 1008 & VAP-2 1010 form a Multiple BSSID Set and VAP-1 1008 is the transmitting BSSID for this Multiple BSSID set). The Multiple BSSID element 3218 includes a nontransmitted BSSID profile 1 for VAP-2 1010, comprising at least information of the SSID (indicated as "Guest") and another Multi-link element 3220 that provides information of the AP MLD with which VAP-2 is affiliated with, i.e. AP MLD2 1004. Multi-link element 3220 indicates Type field 3222 as "Discovery". Under common information, Host Link ID 3224 is set as "4" indicating that the link on which the VAP-2 operates on is assigned the Link ID 4, and MLD MAC address 3226 is indicated as "0D-20". Multi-link element 3220 also comprises a Per-link Information field 3228 that represents VAP-4 1014. Per-link Information field 3228 provides information for the represented VAP-4 1014 such as the Link ID (indicated as "5") and BSSID 3230 indicated as "0D-21". For example, the BSSID 3230 is used to link information in RNR element 3300 of FIG. 33 to the Multi-link element 3220. RNR element 3300 includes in TBTT Information Set field 3302 information of VAP-4 1014 such as BSSID (which is used to link information to the Multi-link element 3220) and a short-SSID of the SSID: Guest.

It is to be noted that in the Multi-link element 3220 carried within the nontransmitted BSSID profile 1 of the Multiple BSSID element 3218 in the Beacon frame 3200 transmitted by VAP-1 1008, the Host link ID field indicates the Link ID "4" assigned to the VAP corresponding to the nontransmitted BSSID profile 1 (i.e. VAP-2 1010). In this example the Link ID "4" is different from the Link ID "1" assigned to the VAP-1 1008 transmitting the Beacon frame 3200 since global Link ID assignment was used instead of local Link ID assignment.

Figure 34:
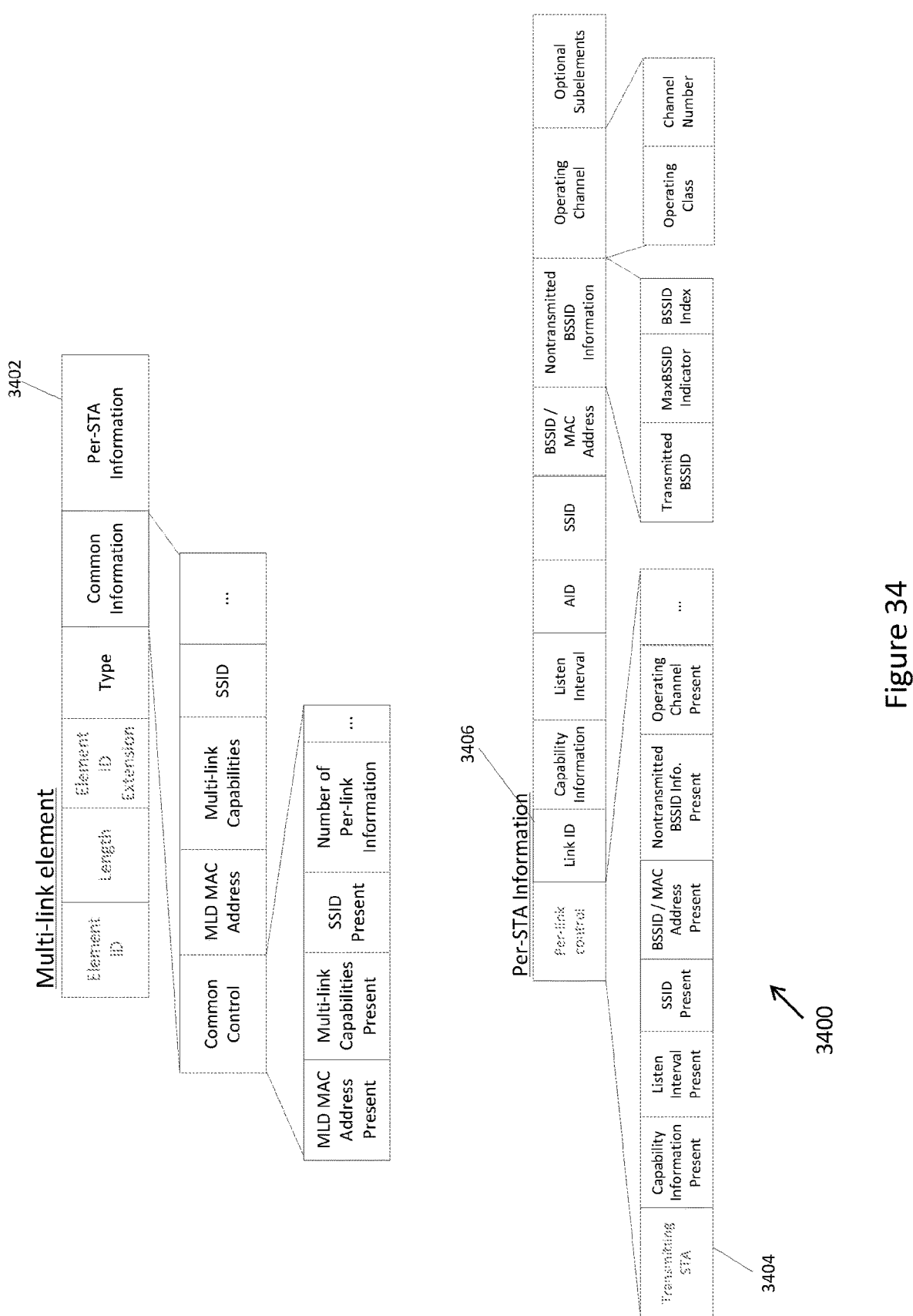
FIG. 34 depicts an illustration of a Multi-link element for unified signalling in accordance with a fourth embodiment.

FIG. 34 depicts an illustration of a Multi-link element 3400 for unified signaling in accordance with a fourth embodiment. Per-link Information may be called Per-STA Information (as shown in Per-STA Information field 3402), and zero or more Per-STA Information may be present in the Multi-link element 3400, each field carrying information of one AP of the AP MLD or one STA of a non-AP MLD. Per-STA Information field 3402 also includes information of the Host AP that transmits the frame which includes the Multi-link element, or the Host AP corresponding to a nontransmitted BSSID profile in which the Multi-link element is included. The Transmitting STA field 3404 (e.g. a bit set to 1) in the Per-STA Information field 3402 indicates that this Per-STA Information field 3402 carries information of the Host AP, and the Link ID field 3406 indicates the Link ID assigned to the link on which the Host AP operates. Other fields of the Per-STA Information field may be omitted for a Host AP. At most, there should be one Per-STA Information field for a Host AP in a Multi-link element. If information of some APs or VAPs are already carried in some other elements, e.g. if information of VAP-5 is also carried in a Multiple BSSID element or RNR element, only basic info about the link is provided that enables a receiving non-AP STA to gather full information by referencing the other element as described in previous embodiments. As a variation, instead of a field, each Per-STA Information 3402 may also be a sub-element carrying its own element ID and length.

Figure 35:
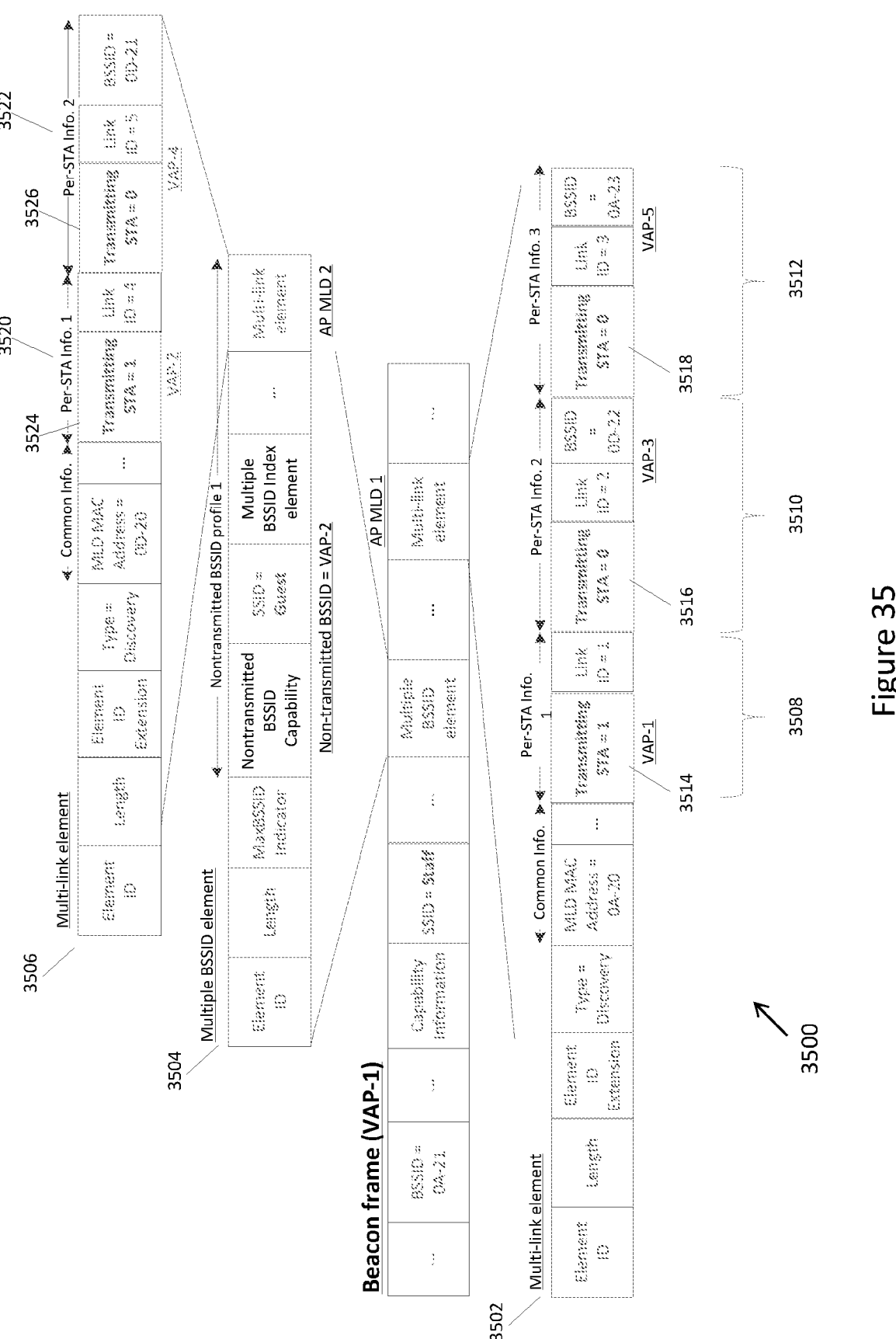
FIG. 35 depicts an illustration of a Beacon frame transmitted by VAP-1 of the network as shown in FIGS. 10A and 10B in accordance with a fourth embodiment.

FIG. 35 depicts an illustration of a Beacon frame 3500 transmitted by VAP-1 1008 of the network 1000 as shown in FIGS. 10A and 10B in accordance with a fourth embodiment. In this example too, the assignment of Link IDs is global for co-located AP MLDs i.e. Link IDs of co-located MLDs do not repeat. E.g.: Link IDs of AP MLD 1: 1 (VAP-1), 2 (VAP-3), 3 (VAP-5), Link IDs of AP MLD 2: 4 (VAP-2), 5 (VAP-4). In multi-link element 3502 of the Beacon frame 3500, there are 3 Per STA information fields 3508, 3510 and 3512 providing information for VAP-1 1008, VAP-3 1012 and VAP-5 1016 respectively. Per STA information fields 3508 indicates Transmitting STA field 3514 as "1" as indication that the VAP that it is representing (i.e. VAP-1 1008) is the transmitting STA of the Beacon frame 3500. Likewise, Transmitting STA fields 3516 and 3518 are indicated as "0" as indication that VAP-3 1012 and VAP-5 1016 are not the transmitting STA of the Beacon frame 3500. In Multi-link element 3506 carried within the nontransmitted BSSID profile 1 of Multiple BSSID element 3504, Transmitting STA field 3524 in Per STA information field 3520 is indicated as "1", indicating that the represented VAP-2 1010 is the VAP to which the nontransmitted BSSID profile 1 represents. Transmitting STA field 3526 in Per STA information field 3522 is indicated as "0", indicating that the represented VAP-4 1014 is not the VAP to which the nontransmitted BSSID profile 1 represents. The Transmitting STA bit in the Multi-link element within a nontransmitted BSSID profile is not to be confused as implying that the indicated VAP is a transmitting BSSID, the bit simply indicates the VAP which is represented by the nontransmitted BSSID profile. It is to be noted that in Multi-link element 3506 carried within the nontransmitted BSSID profile 1 of the Multiple BSSID element 3504 in the Beacon frame 3500 transmitted by VAP-1 1008, the Transmitting STA field 3524 is set to 1 in the first Per-STA Information field and indicates the Link ID "4" assigned to the VAP corresponding to the nontransmitted BSSID profile 1 (i.e. VAP-2 1010). In this example, the Link ID "4" is different from the Link ID "1" assigned to the VAP-1 1008 transmitting the Beacon frame 3500 since global Link ID assignment was used instead of local Link ID assignment.

Figure 36:
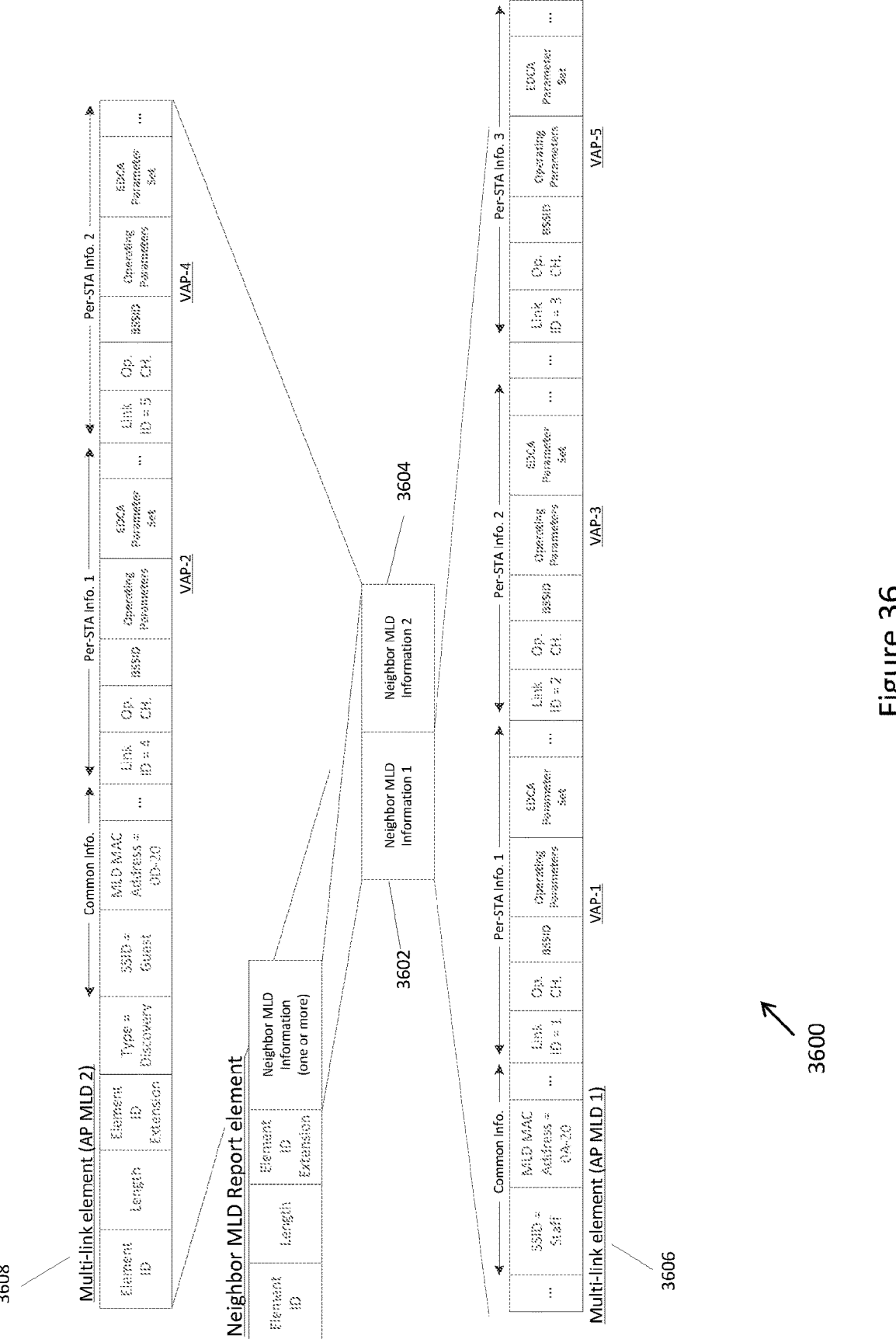
FIG. 36 depicts an illustration of a Neighbor MLD Report element transmitted by VAP-6 of the network as shown in FIGS. 10A and 10B in accordance with a fourth embodiment.

In deployments that are solely targeted for EHT devices, the advertisement of neighboring MLDs can be made more efficient by defining a new Neighbor MLD Report element 3600 as shown in FIG. 36. Each Neighbor MLD Information field 3602 and 3604 carries a Multi-link Element i.e. Multi-link element 3606 and 3608 respectively. The link information can be partial or full. A bit in each Neighbor Information field is used to indicate a co-located MLD. For example, VAP-6 1018 in FIG. 10A can advertise co-located AP MLD 1 & AP MLD 2 by transmitting the Neighbor MLD Report element 3600.

If information of some APs or VAPs are already carried in some other elements, e.g. if information of VAP-5 is also carried in a Multiple BSSID element or RNR element, only basic information about the link is provided that enables a receiving non-AP STA to gather full information by referencing the other element as described in previous embodiments. The example Neighbor MLD Report element 3600 is carried in a frame transmitted by VAP-6 1018 in network 1000 of FIG. 10A and advertises AP MLD1 1002 and AP MLD2 1004. Since VAP-6 1018 is not included in any of the reported AP MLDs, the "Transmitting STA" bits in all Per-STA Information fields are set to 0 in this case.

Figure 37:
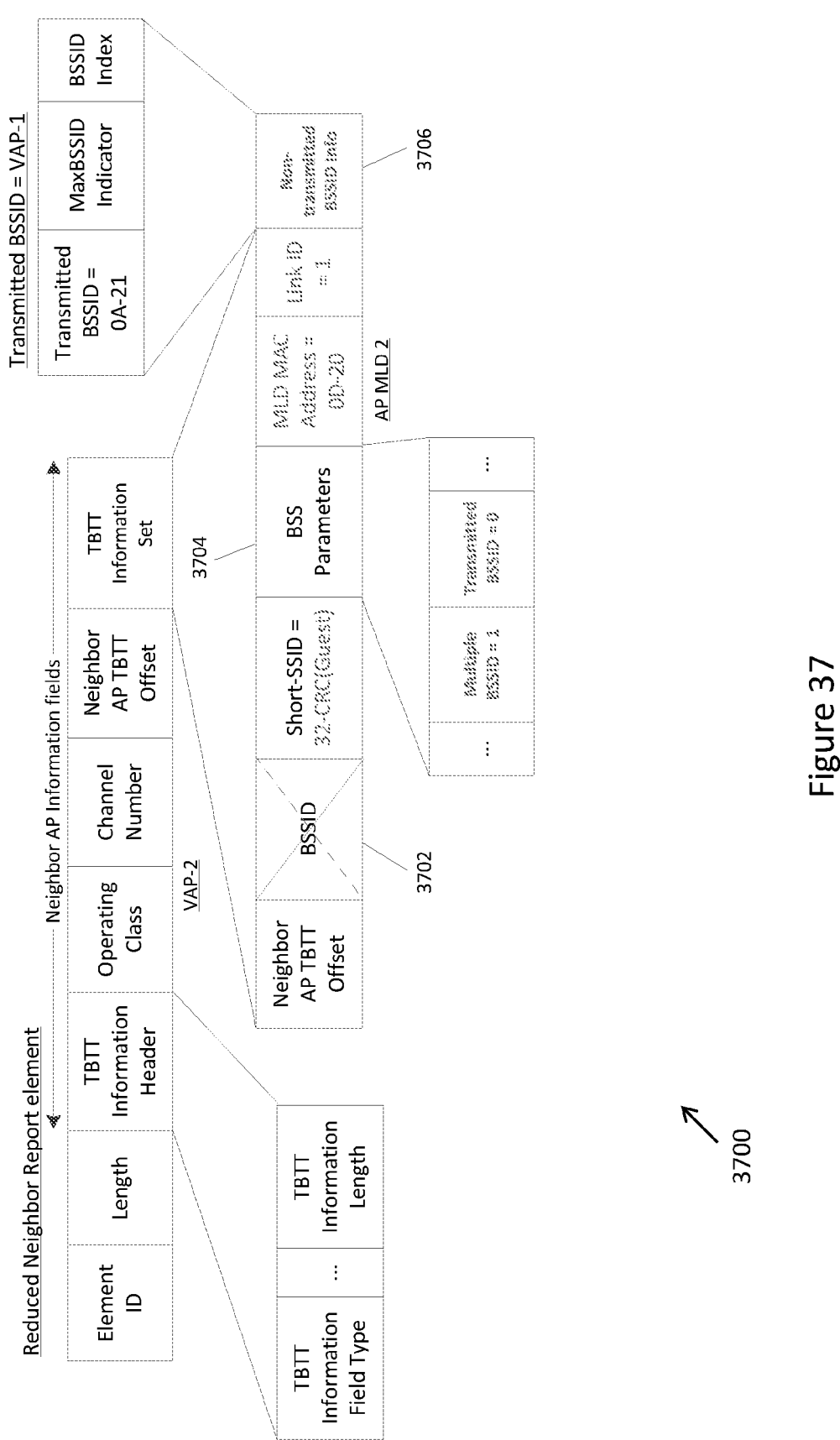
FIG. 37 depicts an illustration of a RNR element transmitted by VAP-6 of the network as shown in FIGS. 10A and 10B in accordance with a fourth embodiment.

If an AP reported in a RNR element corresponds to a nontransmitted BSSID (indicated by the BSS Parameters field: Multiple BSSID=1; Transmitted BSSID=0), the BSSID may be omitted in the RNR element and instead it carries the Nontransmitted BSSID Information field, which carries information required to identify the Transmitted BSSID corresponding to the AP as well as other information required to calculate the AP's BSSID. An example signaling is shown in RNR element 3700 of FIG. 37, wherein BSSID field 3702 is omitted because BSS parameters field 3704 (Multiple BSSID=1; Transmitted BSSID=0) indicates that the RNR element corresponds to a nontransmitted BSSID. Therefore, the RNR element 3700 carries instead a Nontransmitted BSSID Information field 3706 to identify the Transmitted BSSID corresponding to the AP as well as other information required to calculate the AP's BSSID.

Figure 38:
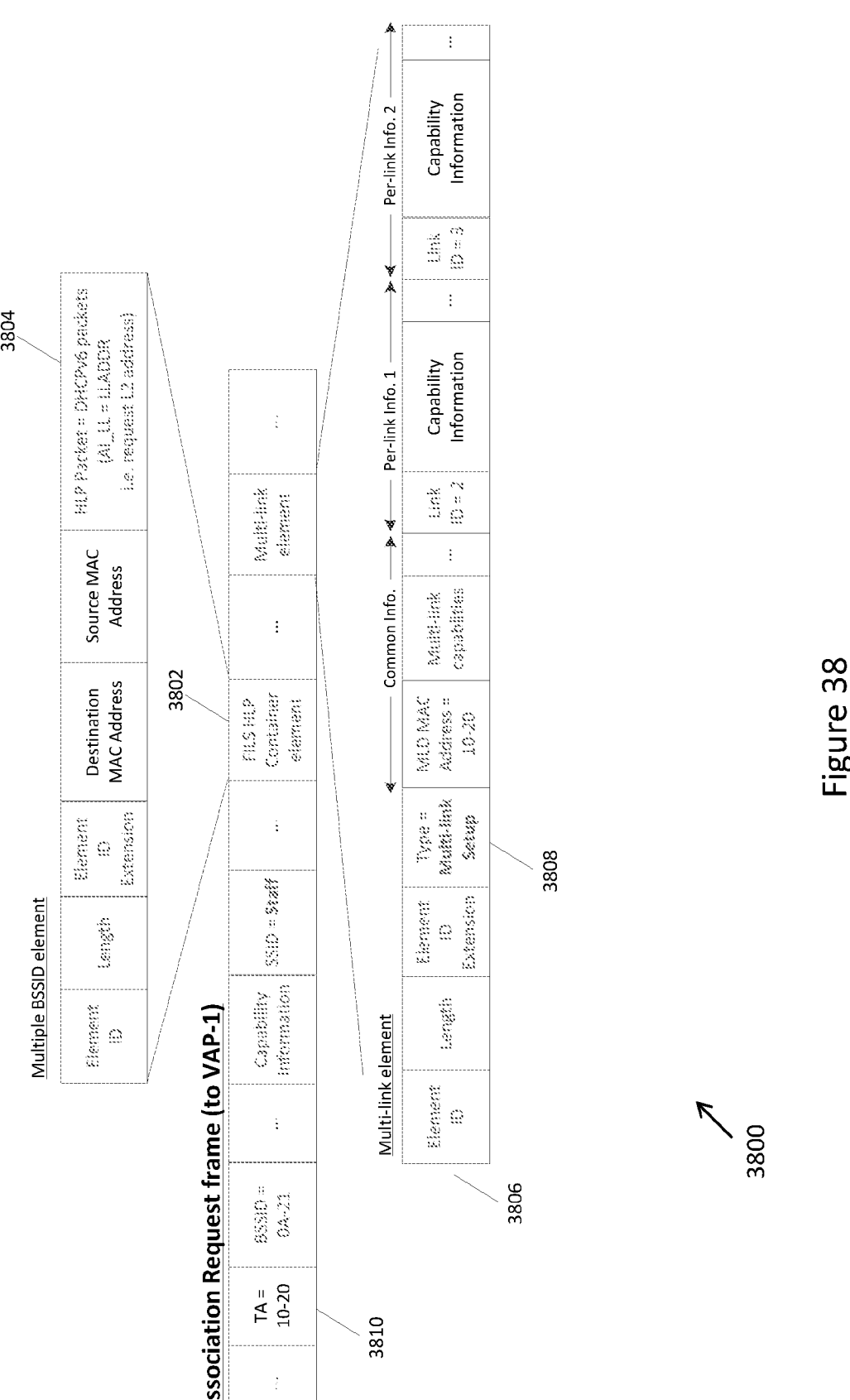
FIG. 38 depicts an illustration of an Association Request frame transmitted to VAP-1 of the network as shown in FIGS. 10A and 10B in accordance with a fourth embodiment.
Figure 39:
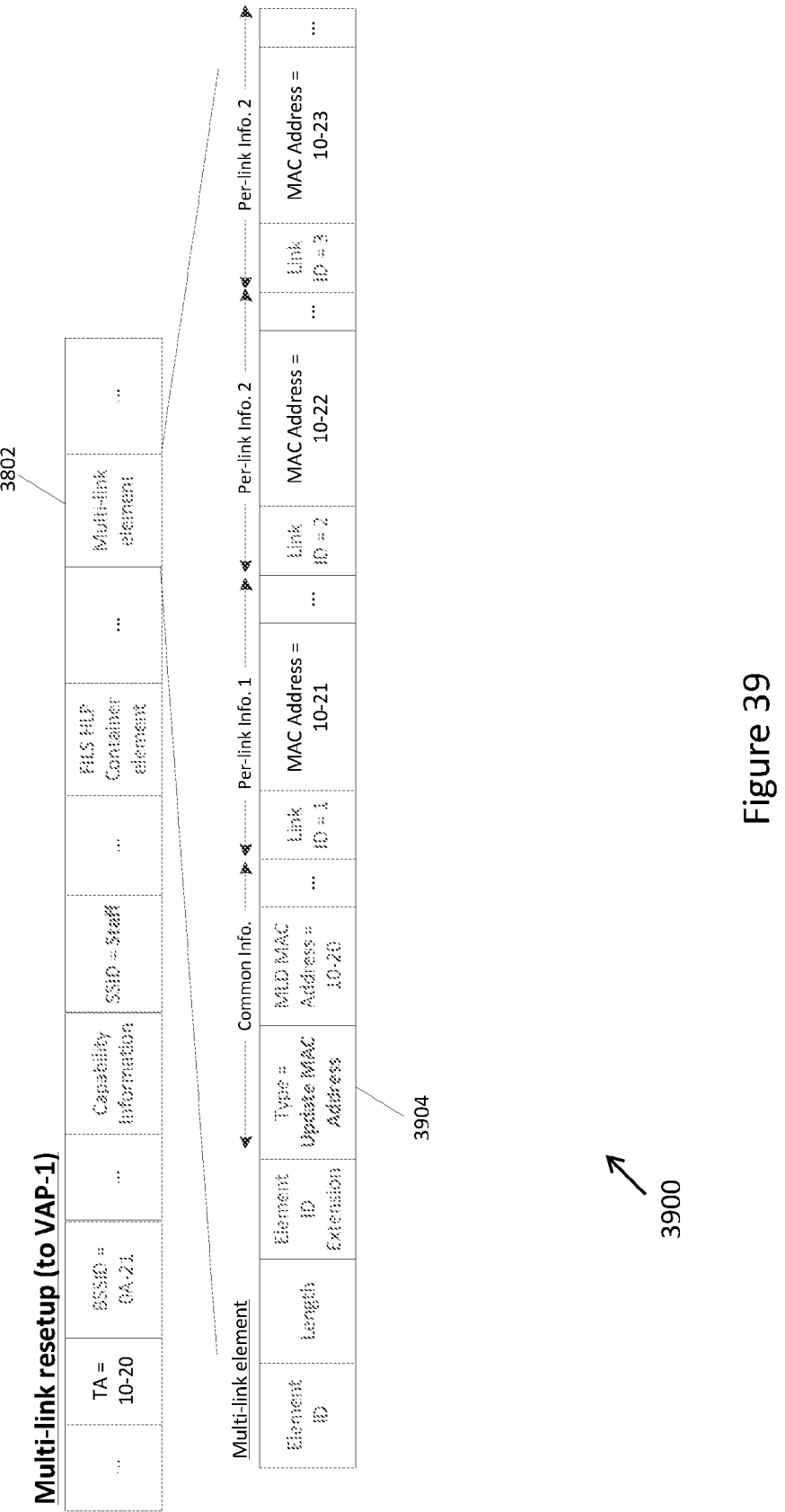
FIG. 39 depicts an illustration of a Multi-link resetup frame transmitted to VAP-1 of the network as shown in FIGS. 10A and 10B for updating L2 MAC addresses in accordance with a fourth embodiment.

During a typical Multi-link setup procedure, a non-AP STA will include the MAC addresses of its links by including them in the Multi-link element and if the Multi-link setup is successful, the AP MLD will update its record of the non-AP MLD with the MAC Addresses. However, in certain deployments, e.g. in enterprise networks, non-AP MLDs may be assigned MAC addresses for its links by the network. Initially non-AP MLDs may only contain one global MAC address which is used as both the MLD MAC address, as well as the link MAC Address for any one link at a time for discovery and multi-link setup. During Multi-link setup (with reference to Association Request frame 3800 of FIG. 38), the non-AP STA may request MAC addresses for one or more of its links by including one or more FILS HLP container elements 3802 in the Multi-link setup frame (e.g. in Association Request frame 3800, wherein the Type field 3808 of Multi-link element 3806 is indicated as "Multi-link Setup"). The FILS HLP container 3802 may carry DHCPv6 packets 3804 requesting for one or more MAC Addresses from a connected DHCP server. In such cases, the non-AP MLD may omit the MAC Address field in the Multi-link element. For example, MAC Addresses of the non-AP STAs corresponding to the links are not included in Per-link information fields of Multi-link element 3806. Absence of the L2 MAC Addresses and the inclusion of the FILS HLP container 3802 in the Association Request frame 3800 will alert the AP MLD that the non-AP MLD is requesting for L2 MAC Addresses using Higher Layer protocols. MLD MAC Address of the non-AP MLD is used as TA/RA (as shown in TA field 3810 of the Association Request frame 3800) in Association Request/Response frames and any other frames for communication with the non-AP MLD until the non-AP MLD has obtained and updated its L2 MAC Addresses. Subsequently the AP MLD will obtain MAC addresses for the non-AP MLD (e.g. from DHCP server) and transport them to the non-AP MLD as per the Higher layer protocol encapsulation procedure described in 802.11 specification, either in the Association Response frame or in subsequent Data frames. Once the MAC Addresses have been installed in the non-AP MLD, it can inform the AP about its link MAC Addresses by sending a purpose built frame (e.g. Update MAC address Action frame) that carries a Multi-link element carrying the MAC addresses in the per-link information fields; or the non-AP MLD may use a Multi-link resetup frame (such as Multi-link resetup frame 3900 of FIG. 39) or any other suitable frame that carries a Multi-link element with the type field set to "update MAC Address" (as shown in Type field 3904 of Multi-link element 3902), and the Per-link information carrying the MAC addresses of each link. The Multi-link resetup frame 3900 may be a Reassociation Request frame. The AP MLD will update its record of the non-AP MLD upon receiving the MAC Addresses and may proceed to communicate with the non-AP MLD on all links using the L2 MAC addresses.

Figure 40:
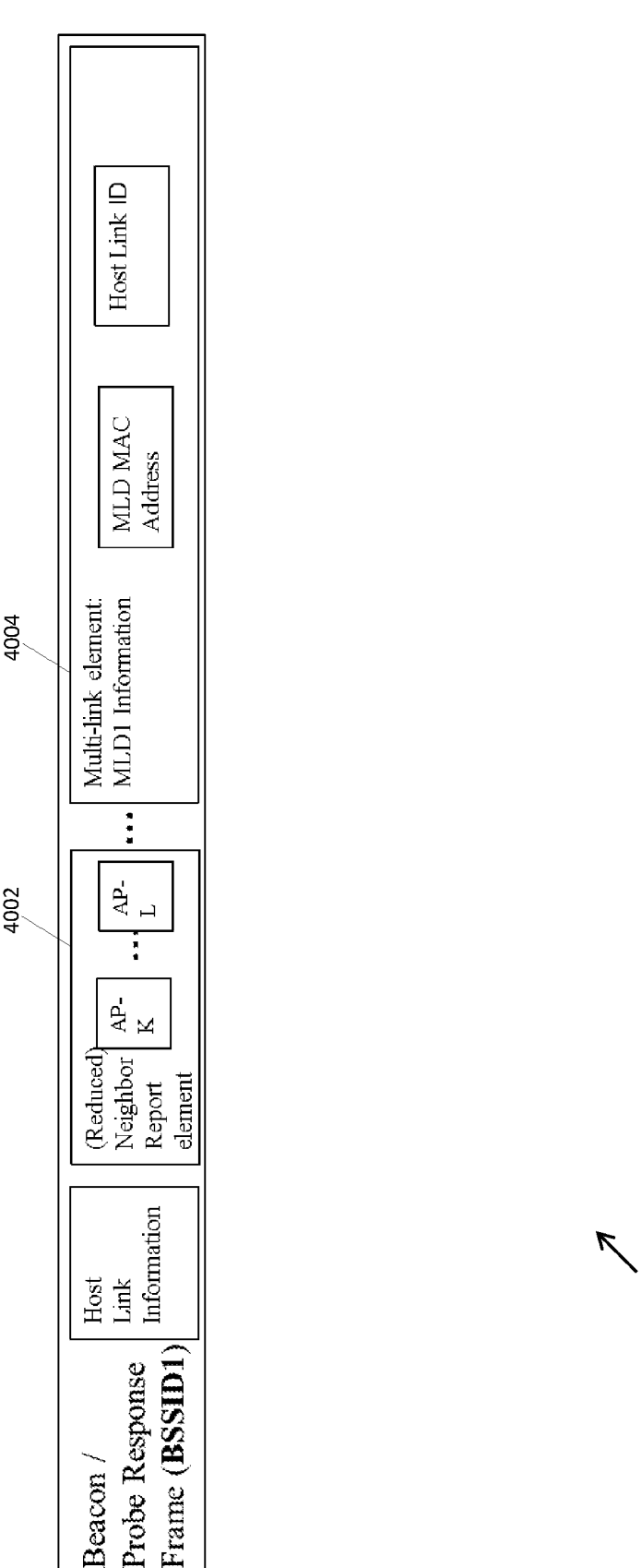
FIG. 40 depicts a simplified illustration of a Beacon/Probe Response frame in accordance with a fifth embodiment.

According to a fifth embodiment, Beacon & Probe Response frames carry a Multi-link element that only carries MLD common information (e.g. MLD MAC Address, Host Link ID) but do not carry information of the other links of the MLD. Host frame carries RNR elements or Neighbor Report elements that carry information of all the co-located APs (i.e. APs that are housed within the same physical device). An example Beacon & Probe Response frame 4000 is shown in FIG. 40, wherein information of all co-located APs are carried in RNR or Neighbor Report element 4002 while the Multi-link element 4004 only carries the MLD MAC address and Host Link ID. Of course, it is also possible that the MLD MAC Address and the Host Link ID are also directly carried in the Beacon/Probe Response frame as fields instead of being included in a Multi-link element.

Figure 41:
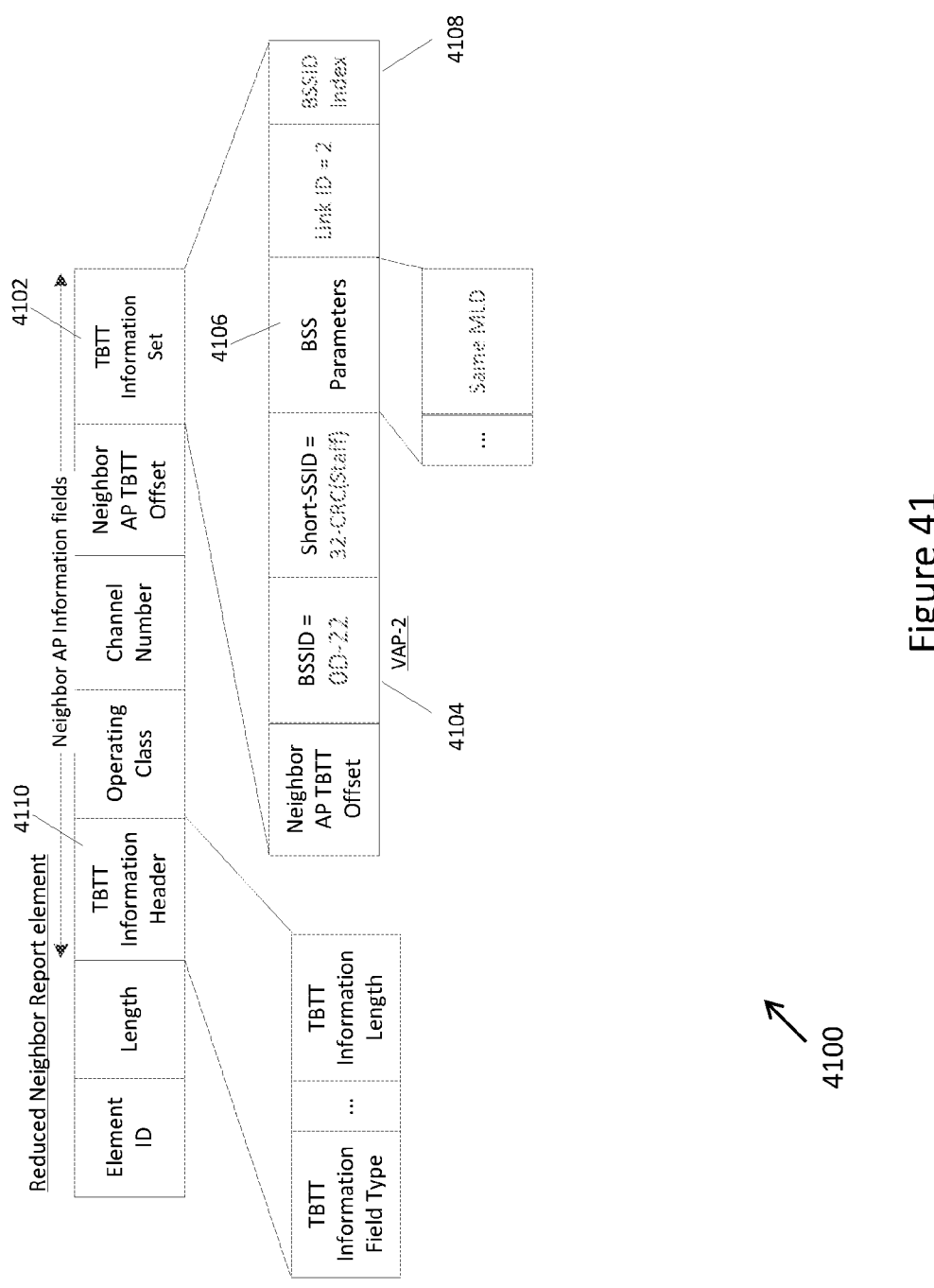
FIG. 41 depicts an illustration of a RNR element transmitted by VAP-1 of the network as shown in FIGS. 10A and 10B in accordance with a fifth embodiment.

The RNR element or Neighbor Report elements according to the fifth embodiment indicates which of the reported APs are also affiliated with the MLD that the AP transmitting the frame is affiliated with. Referring to RNR element 4100 as shown in FIG. 41, if the reported AP is part of a Multiple BSSID set, for example VAP-2 as shown in TBTT Information Set 4102, the BSSID Index 4108, together with the BSSID field 4104 indicates the corresponding transmitted BSSID (i.e. VAP-1). Further, 1 bit in the BSS Parameters field 4106 (or the TBTT Information header field 4110) indicates whether this AP reported in the RNR element 4100 is affiliated with the same AP MLD whose MLD MAC Address is carried in the frame that carries this RNR element. The RNR element may also include a change sequence number that indicates critical changes to BSS Parameter of the AP reported by this TBTT Information Set. A non-AP MLD, associated with the AP MLD with which this reported AP is affiliated with, upon receiving the RNR element can compare this change sequence number with a locally stored change sequence number and if they are different, it is alerted of some critical changes to BSS Parameter of the reported AP and can proceed to recover the relevant BSS parameter by listening to the Beacon/Probe Response frames transmitted by the reported AP. Alternatively, the BSS Index 4108 may also refer to a unique index assigned to the reported AP, among all the co-located APs. By comparing the BSS Index with a mapping of the BSS Index and the co-located AP MLDs, a non-AP MLD receiving this RNR element can figure out which reported AP is affiliated with which AP MLD.

Figure 42:
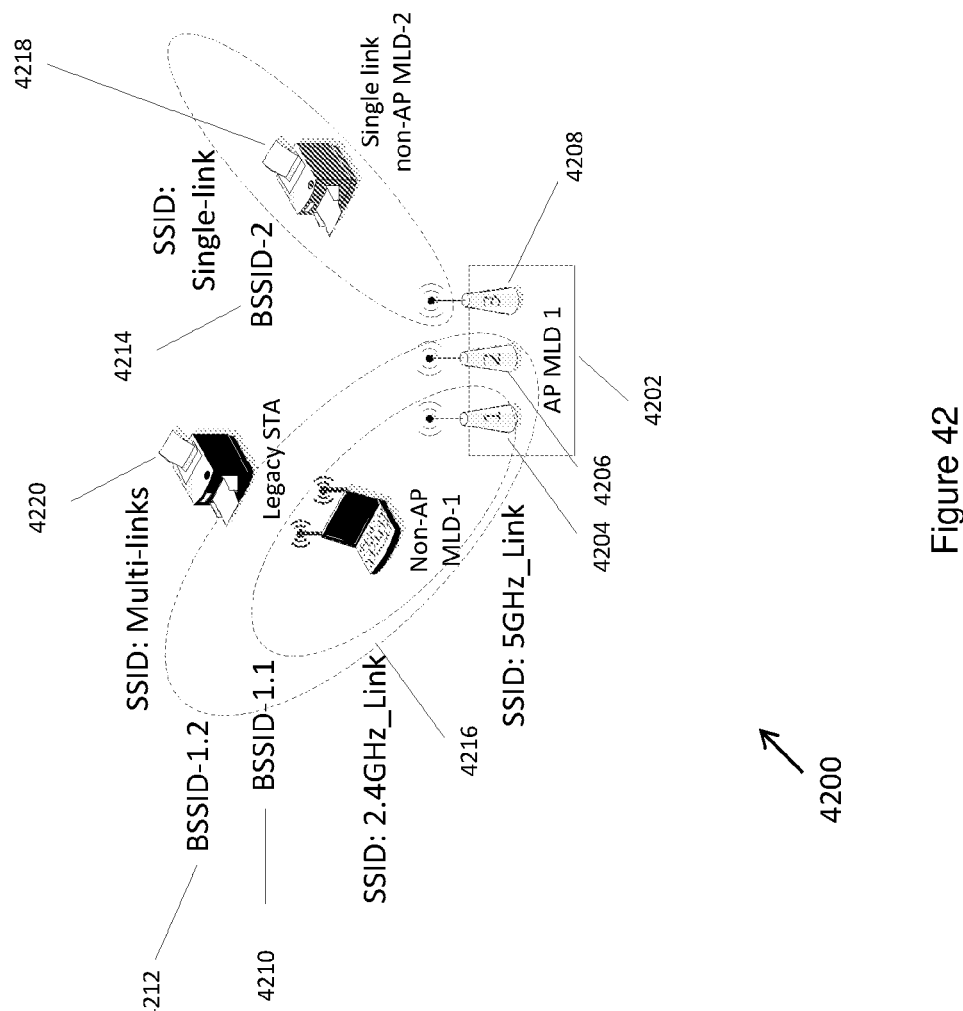
FIG. 42 depicts an illustration of an AP MLD that concurrently serves both legacy devices and MLDs in accordance with a sixth embodiment.

FIG. 42 depicts an illustration of a network 4200 according to a sixth embodiment. Network 4200 is similar to the network 500 shown in FIG. 5A and FIG. 5B, but also supports additional SSIDs that specially cater to legacy non-AP STAs. In addition to advertising SSID: Multi-links, AP-1 4204 also advertises the SSID: 5 GHz_Link exclusively for legacy non-AP STAs operating on the 5 GHz band, and AP-2 506 also advertises SSID: 2.4 GHz_Link exclusively for legacy non-AP STAs operating on the 2.4 GHz band e.g. the legacy STA 4220. In this deployment, the existing SSID field in the Beacon frames transmitted by the APs carry the SSID assigned for legacy non-AP STAs, while the SSID assigned for non-AP MLDs are advertised within the Multi-link element. This way it is possible to create a separate network policy for MLDs and legacy STAs.

Figures 43A, 43B:
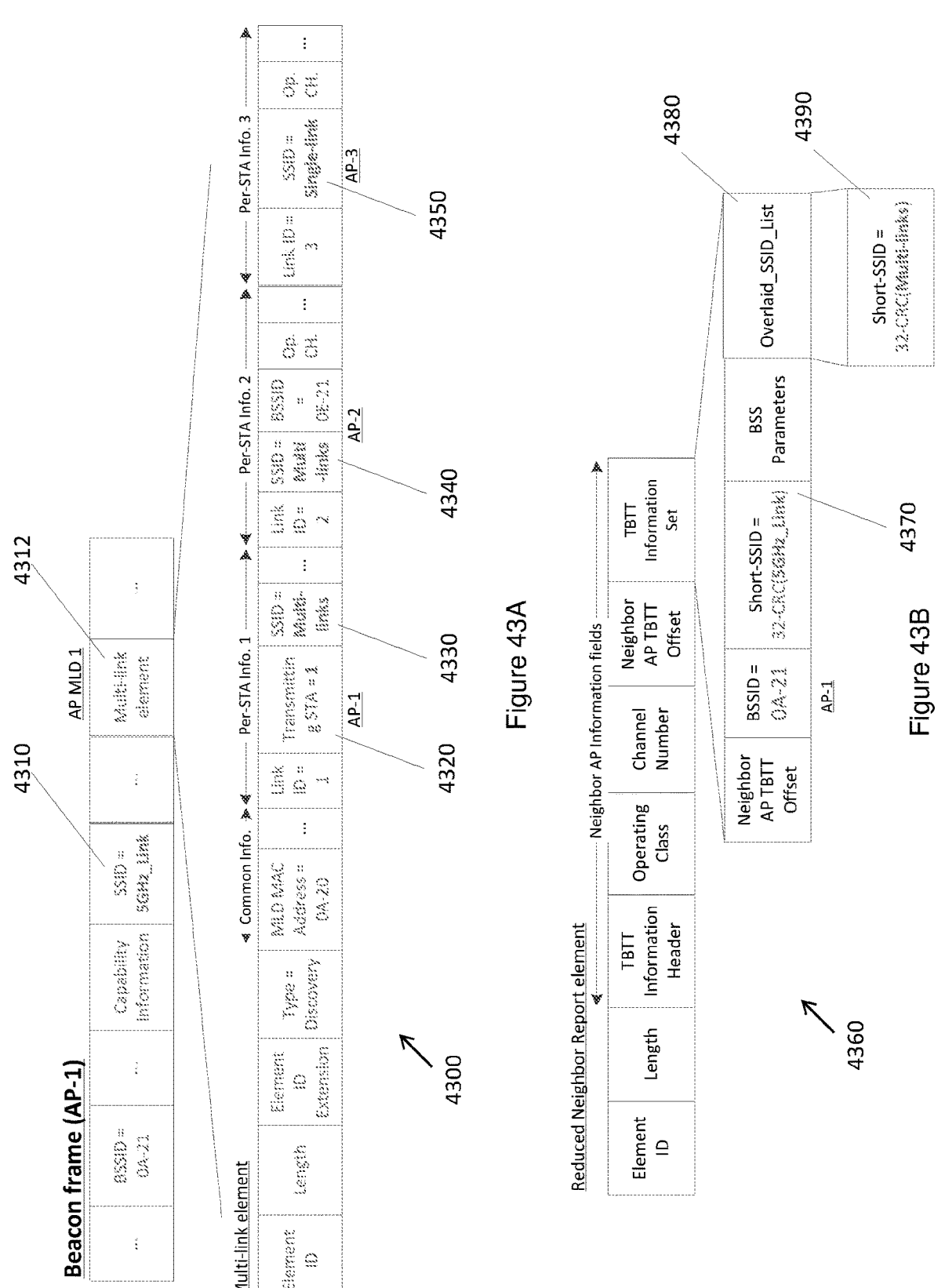
FIG. 43A depicts a simplified illustration of a Beacon/Probe Response frame in accordance with a sixth embodiment.
FIG. 43B depicts illustration of a RNR element in accordance with a sixth embodiment.

FIG. 43A depicts a Beacon frame 4300 transmitted, for example by the AP-1 4304 in FIG. 42. In the SSID field 4310 in the Beacon frame, the SSID: 5 GHz_link is advertised for legacy non-AP STAs. In Multi-link element 4312, information of AP MLD1 4202 is advertised. Here, the multi-link element 4312 carries basic information of all three APs of the AP MLD1 4202. The first Per-STA Info. field carries information of AP-1 4204 and hence has the "Transmitting STA" bit 4320 set to 1. It also carries the SSID field 4330 which is set as "Multi-links". Similarly, the second Per-STA Info. field carries information of AP-2 4206 and hence has the "Transmitting STA" bit set to 0. It also carries the SSID field 4340 which is set as "Multi-links" as well. Similarly, the third Per-STA Info. field carries information of AP-3 4208 and hence has the "Transmitting STA" bit 5 set to 0. It also carries the SSID field 4350 which is set as "Single-link" since the AP-3 4208 caters to single link non-MLD devices. Of course, if AP-3 4208 also caters to legacy non-AP STAs, it can also advertise another SSID for the legacy non-AP STAs, or it may use the same "Single-link" SSID for the legacy non-AP STAs as well. If all the APs affiliated with an AP MLD advertise the same SSID for non-AP MLDs on all the links, the SSID for non-AP MLDs may be signalled in the Common Info. field, and the SSID field may be omitted in the Per-STA Info. Fields. Further, if the SSID advertised by the APs of the AP MLD is the same as the SSID for legacy STAs, then the SSID field may be completely omitted in the Multi-link element and non-AP MLDs receiving this Beacon (and Multi-link element) will infer the SSID based on inheritance.

It is also possible that instead of (or in addition to) the Multi-link element 4312, one or more RNR elements may also be used to advertise the SSID: Multi-links for non-AP MLDs by including in the RNR element a list of short-SSIDs corresponding to the one or more overlaid SSIDs. This is illustrated in FIG. 43B, in which the RNR element 4360 advertises information of the AP-1 4204 of FIG. 42. The Short-SSID field 4370 indicates the Short-SSID for the legacy and non-AP STAs and a new field Overlaid_SSI-D_List 4380 is added to the RNR element to advertise the one or more Short-SSIDs corresponding to the SSIDs that are overlaid over the legacy SSID, i.e., the other SSIDs that AP-1 4204 also supports on the same link. In this example, the Overload_SSID_List carries a single Short-SSID corresponding to the SSID: Multi-links. Upon receiving the RNR element, non-AP MLDs are able to figure out that AP-1 4204 also provides access to the network Multi_Links.

In this deployment, it may be seen that the SSID for the non-AP MLDs (i.e. SSID: Multi-links) is overlaid over both link 1 (AP-1) & link 2 (AP-2). As such, the MLME-START.request primitives that is used when starting the BSSs on AP-1 and AP-2 need to be modified to also include the parameter Overlaid_SSID_List which indicates the list of one or more SSIDs that are overlaid over the legacy SSID, for e.g. the Overlaid_SSID_List includes the SSID:Multi-links in case of AP-1 4204 & AP-2 4206, and the SSID: Single-link in the case of AP-3 4208. An example of such a MLME-START.request primitive is as follows:

```
MLME-START.request(
SSID,
BSSType,
...,
Overlaid_SSID_List
)
```

When one or more SSIDs are overloaded over a legacy SSID, one issue that may come up is that when a physical AP serves both legacy non-AP STAs and non-AP MLDs, the AP will transmit broadcast and group address Data frames that belong to both SSIDs on the same link (channel). For example, AP-1 4204 will transmit broadcast Data frame for SSID: Multi-links on the 5 GHz link (link 1), intended for the non-AP MLD-1 on the 5 GHz link. However, a legacy non-AP STA 4220 operating on the 5 GHz link will also receive this broadcast Data frame. Since the Transmitter Address (TA) is set as AP-1's MAC Address and the Receiver Address (RA) is set as broadcast MAC address, the legacy non-AP STA 4220 will consider this frame as intended for itself too and will attempt to decode it. However, since the Group security key (GTK) for SSID: Multi-links may be different from the GTK for the SSID: 5 GHz_link, the non-AP STA will not be able to decode the Data payload. This problem will also occur in the other case i.e. broadcast Data frame intended for legacy STAs will also be unnecessarily decoded by non-AP MLDs.

Figures 44A, 44B, 44C:
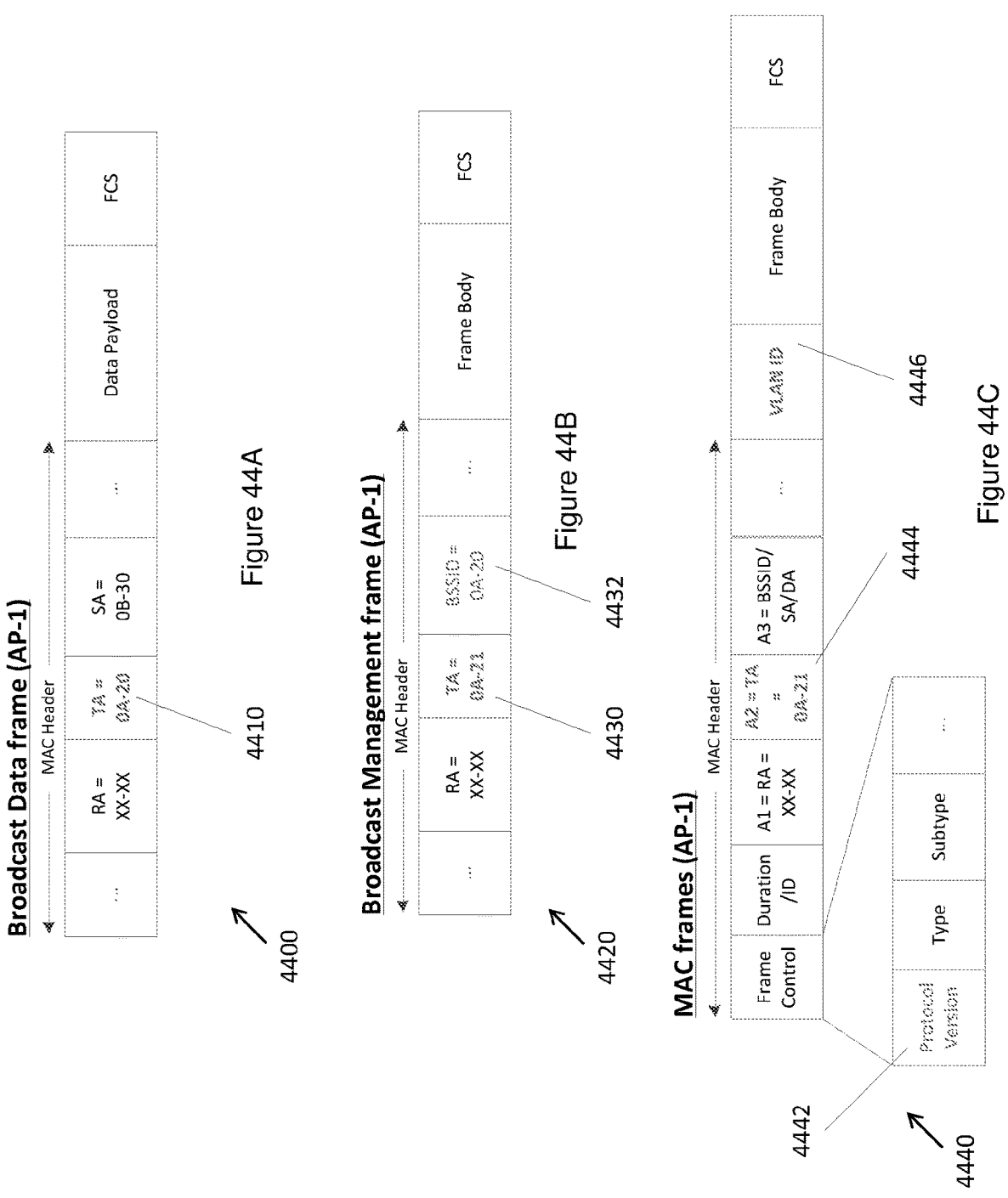
FIG. 44A depicts a simplified illustration of a Broadcast Data frame in accordance with a sixth embodiment.
FIG. 44B depicts a simplified illustration of a Broadcast Management frame in accordance with a sixth embodiment.
FIG. 44C depicts a simplified illustration of a generic MAC frame in accordance with a sixth embodiment.

One method to overcome this issue is to use the MLD MAC Address as the TA (Address 2) in broadcasted Data frames (e.g. 4400) shown in FIG. 44A. Here, the TA field 4410 is set as the MLD MAC Address of AP MLD-1 4202. Since the TA is different from the AP-1's MAC Address, legacy non-AP STAs will discard this frame, however since non-AP MLDs are aware of the MLD MAC Address, they will correctly receive the broadcast Data frame 4400. Similarly, the non-AP MLDs can be configured to ignore any broadcast Data frames that contain the AP's L2 MAC Address in the TA field. Similar method can also be employed for Broadcast Management frames that are only intended for non-AP STAs associated with a specific SSID. However, in the case of Management frames, instead of the Address 2 (TA) field, the Address 3 field can be used to differentiate broadcast frames intended for non-AP MLDs by setting Address 3 as the AP MLD's MAC Address instead of the BSSID of the link (i.e. the L2 MAC Address of the affiliated AP operating on the link). Referring to the broadcast Management frame 4420 in FIG. 44B transmitted by the AP-1 4204 of FIG. 42, the TA field 4430 is set as the L2 MAC Address of the AP-1 4204 (0A-21), but the BSSID field 4432 is set as the MLD MAC Address (0A-20) of the AP MLD-1 4202. Since the BSSID is different from the AP-1's MAC Address, legacy non-AP STAs will discard this frame, however since non-AP MLDs are aware of the MLD MAC Address, they will correctly receive the broadcast Management frame 4420. Similarly, except for certain critical broadcast frames (such as Beacon frames, Probe Response frames, FILS Discovery frames, Channel Switch Announcement frames etc.), the non-AP MLDs can be configured to ignore broadcast Management frames of other types that contain the AP's L2 MAC Address in the BSSID field.

Figure 7:
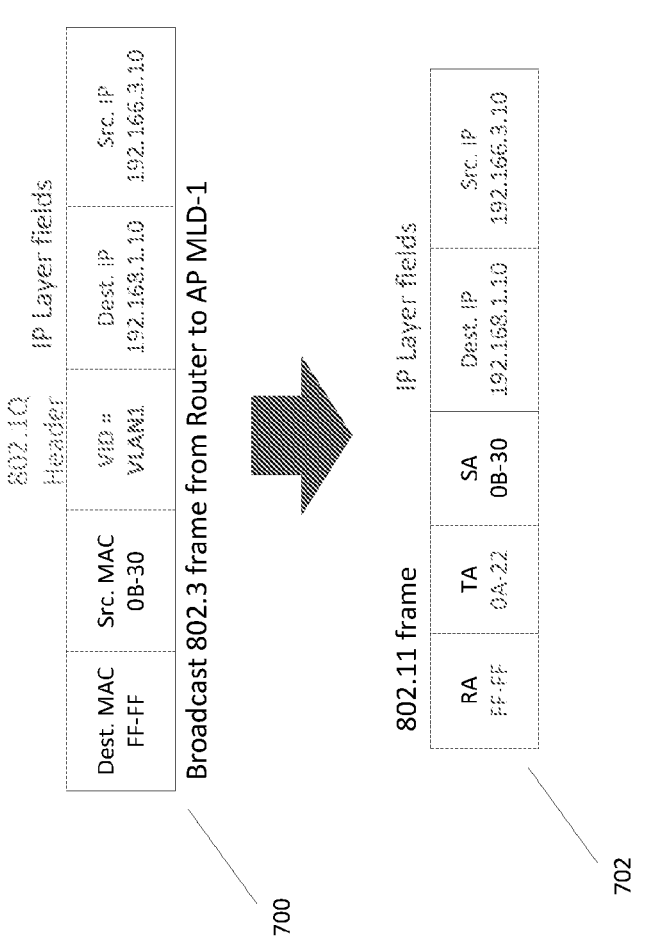
FIG. 7 depicts an illustration of a broadcasted 802.11 frame and 802.3 frame for the networks illustrated in FIGS. 4A to 6B.

Although the above mentioned two methods can help to avoid broadcast storms for specific types of frames, a more generic method applicable to all frame types can also be envisioned. FIG. 44C illustrates a generic MAC frame 4440 that is specifically designed for use with split network cases such as when interconnecting with VLANs, or when two or more SSIDs are overlaid over the same wireless channel. The MAC frame 4440 is differentiated from legacy MAC frames, for example, by setting the Protocol Version field 4442 in the Frame Control field of the MAC Header to a previously unused value (e.g. 2). When the Protocol Version field 4442 is set to this new value (e.g. 2) and higher, a new field VLAN ID 4446 is carried in the MAC frame, for example right before the Frame Body field. When the AP interconnects the wireless networks with wired networks that implements VLANs, the VLAN ID field 4446 is set as the corresponding VLAN ID used in the wired network (as shown in FIG. 7 and FIG. 12). If the AP does not intercon- nect with wired VLANs, a unique VLAN ID is assigned to each SSID operating in a link and is communicated with the non-AP STAs operating in the link, for example during the Association process.

For example, in the network 4200 of FIG. 42, aside from the SSID: Multi-links, another SSID: Multi-links-guest may also be served by both AP-1 4204 and AP-2 4206 on links 1 & 2 respectively. VLAN ID 1 & 2 may be assigned to SSID: Multi-links and SSID: Multi-links-guest respectively. In all MAC frames intended for non-AP MLDs or non-AP STAs that have joined the SSID: Multi-links, the VLAN ID field 4446 is set as 1, while in all MAC frames intended for non-AP MLDs or non-AP STAs that have joined the SSID: Multi-links-guest, the VLAN ID field 4446 is set as 2. A non-AP MLD or a non-AP STA can then further filter the MAC frames based on the VLAN ID field 4446 (on top of filtering based on RA/TA/BSSID fields). The TA field 4444 is set to the L2 MAC Address of the transmitting STA as per conventional method.

Yet, other methods to avoid the broadcast storms is to introduce new frame types (e.g. a new Data frame type), that are only understood by the EHT devices. All data frames intended for EHT devices (MLDs or non-MLDs) use the new data frame type. Or, the 11be specification may also enforce that the Data frames intended for EHT and future amendment STAs are always carried in an EHT PPDU (and not in legacy PPDUs: 11a, 11n, 11ac or 11ax). Since legacy devices are not able to decode EHT PPDUs, they will discard the Data frames intended only for EHT and future amendment STAs. In these ways, the broadcast storms, for the prevention of which VLANs and VAPs were originally created, can be averted.

FIG. 45 shows a flow diagram 4500 illustrating a com- munication method according to various embodiments. At step 4502, a frame is generated at an AP included in a plurality of APs affiliated with an AP MLD, wherein each of the plurality of APs advertises a BSSID and provides a link identified by a Link ID, the frame carrying a multi-link element containing information about the AP MLD and plurality of APs. At step 4504, the frame is transmitted on a link, the Multi-link element indicating a Link ID of the link on which the frame is transmitted.

Figure 46:
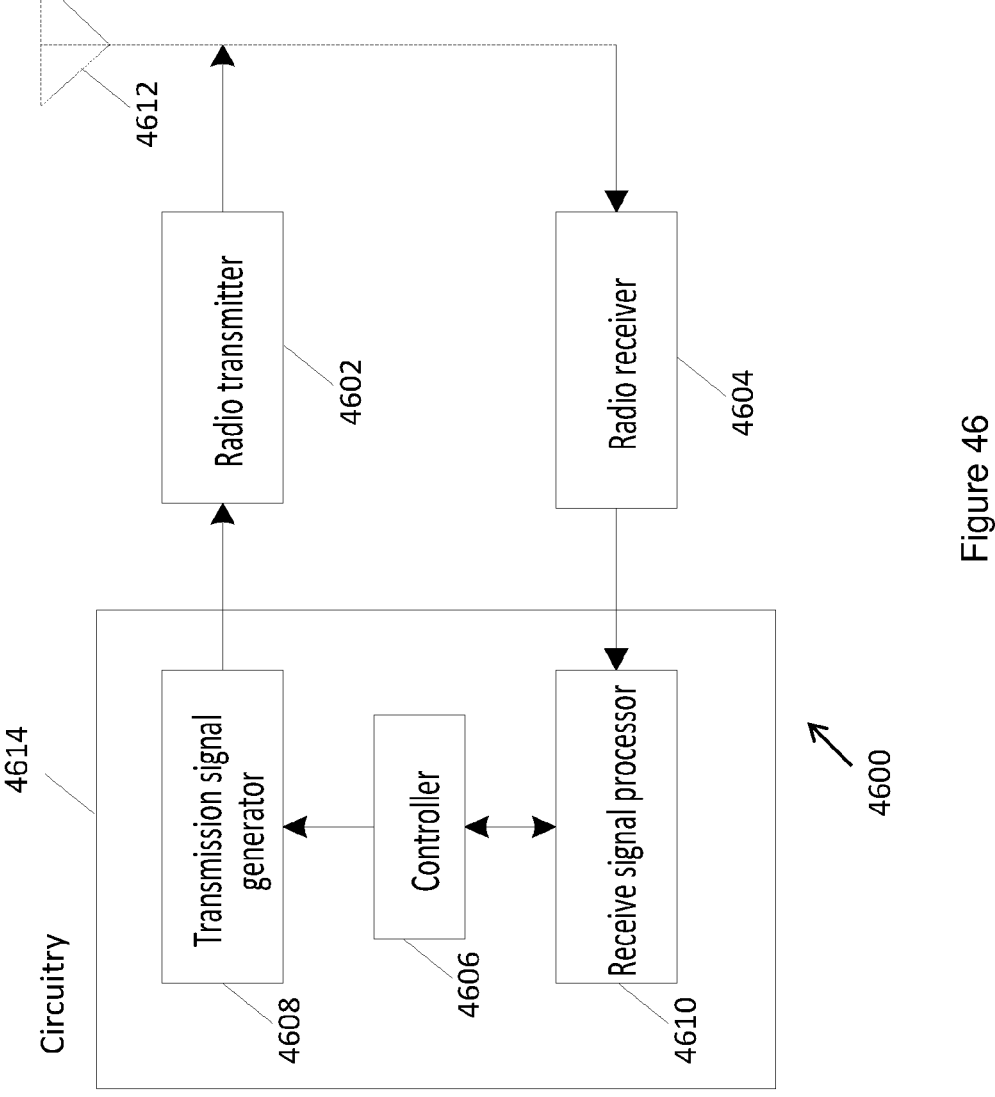
FIG. 46 shows a schematic, partially sectioned view of one of the affiliated APs or STAs of a multi-link device that can be implemented for EHT virtualization for MLD devices in accordance with various embodiments.

FIG. 46 shows a schematic, partially sectioned view of a communication apparatus 4600 that can be implemented for EHT virtualization in accordance with the first to sixth embodiments. The communication apparatus 4600 may be implemented as an STA or AP included in a plurality of STAs or APs affiliated with an AP MLD or a non-AP MLD according to various embodiments.

Various functions and operations of the communication apparatus 4600 are arranged into layers in accordance with a hierarchical model. In the model, lower layers report to higher layers and receive instructions therefrom in accor- dance with IEEE specifications. For the sake of simplicity, details of the hierarchical model are not discussed in the present disclosure.

As shown in FIG. 46, the communication apparatus 4600 may include circuitry 4614, at least one radio transmitter 4602, at least one radio receiver 4604 and multiple antennas 4612 (for the sake of simplicity, only one antenna is depicted in FIG. 46 for illustration purposes). The circuitry may include at least one controller 4606 for use in software and hardware aided execution of tasks it is designed to perform, including control of communications with one or more other multi-link devices in a MIMO wireless network. The at least one controller 4606 may control at least one transmission signal generator 4608 for generating frames to be sent through the at least one radio transmitter 4602 to one or more other STAs, APs or MLDs and at least one receive signal processor 4610 for processing frames received through the at least one radio receiver 4604 from the one or more other STAs, APs or MLDs. The at least one transmis- sion signal generator 4608 and the at least one receive signal processor 4610 may be stand-alone modules of the commu- nication apparatus 4600 that communicate with the at least one controller 4606 for the above-mentioned functions. Alternatively, the at least one transmission signal generator 4608 and the at least one receive signal processor 4610 may be included in the at least one controller 4606. It is appre- ciable to those skilled in the art that the arrangement of these functional modules is flexible and may vary depending on the practical needs and/or requirements. The data process- ing, storage and other relevant control apparatus can be provided on an appropriate circuit board and/or in chipsets.

In various embodiments, when in operation, the at least one radio transmitter 4602, at least one radio receiver 4604, and at least one antenna 4612 may be controlled by the at least one controller 4606. Furthermore, while only one radio transmitter 4602 is shown, it will be appreciated that there can be more than one of such transmitters.

In various embodiments, when in operation, the at least one radio receiver 4604, together with the at least one receive signal processor 4610, forms a receiver of the communication apparatus 4600. The receiver of the com- munication apparatus 4600, when in operation, provides functions required for multi-link communication. While only one radio receiver 4604 is shown, it will be appreciated that there can be more than one of such receivers.

The communication apparatus 4600, when in operation, provides functions required for EHT virtualization. For example, the communication apparatus 4600 may be an AP included in a plurality of APs affiliated with an AP MLD, wherein each of the plurality of APs advertises a BSSID and provides a link identified by a Link Identifier (ID). The circuitry 4614 may, in operation, generate a frame carrying a multi-link element containing information about the AP MLD and the plurality of APs. The transmitter 4602 may, in operation, transmit the frame on a link, the Multi-link element indicating a Link ID of the link on which the frame is transmitted.

The AP may be a member of a multiple BSSID set or a member of a co-hosted BSSID set, or not a member of either a multiple BSSID set or a co-hosted BSSID set, and wherein the frame may be one of a Beacon frame, a Probe Response frame, a FILS Discovery frame or an Association Response frame.

The AP may be a member of a multiple BSSID set and the circuitry 4314 may be further configured to include in the frame a Multiple BSSID element, the Multiple BSSID element comprising a nontransmitted BSSID profile that carries another Multi-link element, the another Multi-link element containing information about another AP MLD with which another AP corresponding to the nontransmitted BSSID profile is affiliated with and a plurality of links affiliated with the another AP MLD, the another Multi-link element further indicating a Link ID of a link on which the another AP operates. The another Multi-link element may further comprise a Type field, a Common Information field carrying the Link ID of the link on which the another AP operates, and one or more Per-link Information fields, each Per-link Information field representing a link of the plurality of links affiliated with the another AP MLD excluding the link on which on which the another AP operates, each Per-link Information field carrying a Link ID and link specific information of the represented link, the link specific information indicating a BSSID and an operating channel associated with the represented link. The link specific information may further indicate an SSID corresponding to the BSSID of the represented link if the SSID is different from that of the link carried in the Common Information field. If the represented link corresponds to a nontransmitted BSSID, the link specific information may further indicate a Transmitted BSSID, a MaxBSSID Indicator and a BSSID Index corresponding to the nontransmitted BSSID.

Each BSSID may be included in a plurality of BSSIDs that is affiliated with the AP MLD, wherein the plurality of BSSIDs may be mapped to two or more SSIDs, and wherein the Multi-link element may further indicate the SSID corresponding to each link. A SSID or one or more BSSIDs mapped to the SSID may be indicated in a MAC data service primitive MA-UNITDATA.request, and wherein the transmitter 4602 may be further configured to transmit a data frame corresponding to the MAC data service primitive MA-UNITDATA.request if the AP corresponds to the one or more BSSIDs mapped to the SSID.

Each BSSID may be included in a plurality of BSSIDs that is affiliated with the AP MLD, wherein the plurality of BSSIDs may be mapped to a single SSID, and wherein the Multi-link element may further indicate the SSID. The AP MLD may bridge wireless frames between the plurality of APs and a network implementing a plurality of VLANs such that each SSID of a plurality of SSDs is mapped to a corresponding VLAN. The Multi-link element may further comprise a Type field, a Common Information field carrying the Link ID of the link on which the Multi-link element is transmitted, and one or more Per-link Information fields, each Per-link Information field representing a link of the plurality of APs excluding the link on which the Multi-link element is transmitted, each Per-link Information field carrying a Link ID and link specific information of the represented link, the link specific information indicating a BSSID and an operating channel associated with the represented link. The link specific information may further indicate an SSID corresponding to the BSSID of the represented link if the SSID is different from that of the link carried in the Common Information field. If the represented link corresponds to a nontransmitted BSSID, the link specific information may further indicate a Transmitted BSSID, a MaxBSSID Indicator and a BSSID Index corresponding to the nontransmitted BSSID.

The circuitry 4614 may be further configured to provide information of one or more other APs by including one or more Neighbor Report elements or Reduced Neighbor Report (RNR) elements in the frame. The Multi-link element may further indicate a BSSID and an operating channel associated with each link of the plurality of APs that do not correspond to any of the APs included in the Neighbor Report elements or RNR elements. The Neighbor Report or RNR elements may further indicate a MLD MAC address of an AP MLD if a reported AP is affiliated with the AP MLD. If an AP indicated in the RNR element corresponds to a nontransmitted BSSID, the RNR element may further indicate a Transmitted BSSID, a MaxBSSID Indicator and a BSSID Index corresponding to the nontransmitted BSSID.

The circuitry 4614 may be further configured to provide information of other one or more AP MLDs different than the AP MLD with which the AP is affiliated, by including in the frame a Neighbor MLD Report element carrying information of the other one or more AP MLDs. The Multi-link element may further comprise a Type field, a Common Information field, and one or more Per-STA Information fields, each Per-STA Information field representing an AP of the plurality of APs, each Per-STA Information field carrying a Link ID and link specific information of the represented AP; each Per-STA Information field further carrying a Transmitting STA field that indicates whether the represented AP associated with the Per-STA Information field is the AP that transmits the frame carrying the Multi-link element.

For example, the communication apparatus 4600 may be a non-AP STA included in a plurality of non-AP STAs affiliated with a non-AP MLD.

The circuitry 4614, which in operation, generates a Probe Request frame carrying a Multi-link element containing a MLD MAC Address of an AP MLD and one or more Link IDs of links affiliated with the AP MLD. A transmitter 4602, which in operation, transmits the Probe Request frame to request information about the AP MLD and the one or more links of the AP MLDs. The circuitry 4614 may be further configured to generate a frame carrying another Multi-link element with a Type field set to a value indicating Update MAC Address, the another Multi-link element carrying the MLD MAC Address of the non-AP MLD and MAC Addresses of one or more links of the non-AP MLD; and wherein the transmitter 4302 may be further configured to transmit the frame to request the AP MLD to update its record of the non-AP MLD with the MAC Addresses of the one or more links.

The present disclosure can be realized by software, hardware, or software in cooperation with hardware. Each functional block used in the description of each embodiment described above can be partly or entirely realized by an LSI such as an integrated circuit, and each process described in each embodiment may be controlled partly or entirely by the same LSI or a combination of LSIs. The LSI may be individually formed as chips, or one chip may be formed so as to include a part or all of the functional blocks. The LSI may include a data input and output coupled thereto. The LSI here may be referred to as an IC, a system LSI, a super LSI, or an ultra LSI depending on a difference in the degree of integration. However, the technique of implementing an integrated circuit is not limited to the LSI and may be realized by using a dedicated circuit, a general-purpose processor, or a special-purpose processor. In addition, a FPGA (Field Programmable Gate Array) that can be programmed after the manufacture of the LSI or a reconfigurable processor in which the connections and the settings of circuit cells disposed inside the LSI can be reconfigured may be used. The present disclosure can be realized as digital processing or analogue processing. If future integrated circuit technology replaces LSIs as a result of the advancement of semiconductor technology or other derivative technology, the functional blocks could be integrated using the future integrated circuit technology. Biotechnology can also be applied.

The present disclosure can be realized by any kind of apparatus, device or system having a function of communication, which is referred as a communication device.

The communication apparatus may comprise a transceiver and processing/control circuitry. The transceiver may comprise and/or function as a receiver and a transmitter. The transceiver, as the transmitter and receiver, may include an RF (radio frequency) module including amplifiers, RF modulators/demodulators and the like, and one or more antennas.

Some non-limiting examples of such communication device include a phone (e.g., cellular (cell) phone, smart phone), a tablet, a personal computer (PC) (e.g., laptop, desktop, netbook), a camera (e.g., digital still/video camera), a digital player (digital audio/video player), a wearable device (e.g., wearable camera, smart watch, tracking device), a game console, a digital book reader, a telehealth/telemedicine (remote health and medicine) device, and a vehicle providing communication functionality (e.g., automotive, airplane, ship), and various combinations thereof.

The communication device is not limited to be portable or movable, and may also include any kind of apparatus, device or system being non-portable or stationary, such as a smart home device (e.g., an appliance, lighting, smart meter, control panel), a vending machine, and any other "things" in a network of an "Internet of Things (IoT)".

The communication may include exchanging data through, for example, a cellular system, a wireless LAN system, a satellite system, etc., and various combinations thereof.

The communication device may comprise an apparatus such as a controller or a sensor which is coupled to a communication apparatus performing a function of communication described in the present disclosure. For example, the communication device may comprise a controller or a sensor that generates control signals or data signals which are used by a communication apparatus performing a communication function of the communication device.

The communication device also may include an infrastructure facility, such as a base station, an access point, and any other apparatus, device or system that communicates with or controls apparatuses such as those in the above non-limiting examples.

A non-limiting example of a station may be one included in a first plurality of stations affiliated with a multi-link station logical entity (i.e. such as an MLD), wherein as a part of the first plurality of stations affiliated with the multi-link station logical entity, stations of the first plurality of stations share a common medium access control (MAC) data service interface to an upper layer, wherein the common MAC data service interface is associated with a common MAC address or a Traffic Identifier (TID).

Thus, it can be seen that the present embodiments provide communication devices and methods for EHT virtualization, in particular for MLD devices.

While exemplary embodiments have been presented in the foregoing detailed description of the present embodiments, it should be appreciated that a vast number of variations exist. It should further be appreciated that the exemplary embodiments are examples, and are not intended to limit the scope, applicability, operation, or configuration of this disclosure in any way. Rather, the foregoing detailed description will provide those skilled in the art with a convenient road map for implementing exemplary embodiments, it being understood that various changes may be made in the function and arrangement of steps and method of operation described in the exemplary embodiments and modules and structures of devices described in the exemplary embodiments without departing from the scope of the subject matter as set forth in the appended claims.

The invention claimed is:

1. An Access Point (AP) Multi-Link Device (MLD), comprising:
   a first affiliated AP that corresponds to a first Basic Service Set Identifier (BSSID) belonging to a first multiple BSSID set for a first channel, the first BSSID being a first transmitted BSSID; and
   a second affiliated AP that corresponds to a second BSSID belonging to a second multiple BSSID set for a second channel, the second BSSID being a second transmitted BSSID or a second nontransmitted BSSID,
   wherein the first affiliated AP advertises a first common Service Set Identifier (SSID) for the first BSSID and the second BSSID over the first channel, and in case the second BSSID is the second transmitted BSSID, the second affiliated AP advertises the first common SSID for the first BSSID and the second BSSID over the second channel, and
   wherein the first affiliated AP comprises:
   circuitry, which, in operation, generates a frame carrying a Multi-Link element for the AP MLD and a Multiple BSSID element for another AP MLD, the Multi-Link element comprising an MLD MAC Address subfield indicating an MLD MAC Address of the AP MLD and a link ID subfield indicating a link ID of the first channel, and the Multiple BSSID element comprising a nontransmitted BSSID profile of a first nontransmitted BSSID of the first multiple BSSID set; and
   a transmitter, which, in operation, transmits the generated frame on the first channel.

2. The AP MLD according to claim 1, wherein the frame is one of a Beacon frame or a Probe Response frame.

3. The AP MLD according to claim 1, wherein the another AP MLD comprises:
   a third affiliated AP that corresponds to the first nontransmitted BSSID of the first multiple BSSID set for the first channel; and
   a fourth affiliated AP that corresponds to another BSSID being either one of the second transmitted BSSID or the second nontransmitted BSSID of the second multiple BSSID set for the second channel,
   wherein, when the another BSSID is the second transmitted BSSID, the fourth affiliated AP advertises a second common SSID for the first nontransmitted BSSID and the second transmitted BSSID over the second channel.

4. The AP MLD according to claim 3, wherein the nontransmitted BSSID profile includes another Multi-Link element for the another AP MLD, which is different from the Multi-Link element for the AP MLD.

5. The AP MLD according to claim 4, wherein the another Multi-Link element included in the nontransmitted BSSID profile carries information of the third affiliated AP and the fourth affiliated AP.

6. The AP MLD according to claim 1, wherein members of the first multiple BSSID set operate on the first channel and form a first virtual AP set, and members of the second multiple BSSID set operate on the second channel and form a second virtual AP set.

7. The AP MLD according to claim 1, wherein the Multi-Link element includes a common information field that carries the MLD MAC Address subfield of the AP MLD and a per-link information field that carries link information of the second affiliated AP.

8. The AP MLD according to claim 7, wherein the per-link information field includes a Link ID subfield and a non-transmitted BSSID information field.

9. The AP MLD according to claim 1, comprising a third affiliated AP that corresponds to a third transmitted BSSID or a third nontransmitted BSSID belonging to a third multiple BSSID set for a third channel, wherein the first affiliated AP advertises the first common SSID that is also common for the third BSSID over the first channel, and in case the third BSSID is the third transmitted BSSID, the third affiliated AP advertises the first common SSID over the third channel.

10. The AP MLD according to claim 9, wherein the Multi-Link element includes per-link information fields that carry link information of the second affiliated AP and the third affiliated AP.

11. A communication method for an Access Point (AP) Multi-Link Device (MLD), wherein the AP MLD comprises a first affiliated AP that corresponds to a first Basic Service Set Identifier (BSSID) belonging to a first multiple BSSID set for a first channel, the first BSSID being a first transmitted BSSID, and comprises a second affiliated AP that corresponds to a second BSSID belonging to a second multiple BSSID set for a second channel, the second BSSID being a second transmitted BSSID or a second nontransmitted BSSID, wherein the first affiliated AP advertises a first common Service Set Identifier (SSID) for the first BSSID and the second BSSID over the first channel, and in case the second BSSID is the second transmitted BSSID, the second affiliated AP advertises the first common SSID for the first BSSID and the second BSSID over the second channel, wherein the communication method comprises:

generating, by the first affiliated AP, a frame carrying a Multi-Link element for the AP MLD and a Multiple BSSID element for another AP MLD, the Multi-Link element comprising an MLD MAC Address subfield indicating an MLD MAC Address of the AP MLD and a link ID subfield indicating a link ID of the first channel, and the Multiple BSSID element comprising a nontransmitted BSSID profile of a first nontransmitted BSSID of the first multiple BSSID set; and transmitting, by the first affiliated AP, the generated frame on the first channel.

12. The communication method according to claim 11, wherein the frame is one of a Beacon frame or a Probe Response frame.

13. The communication method according to claim 11, wherein the another AP MLD comprises:

a third affiliated AP that corresponds to the first nontransmitted BSSID of the first multiple BSSID set for the first channel; and a fourth affiliated AP that corresponds to another BSSID being either one of the second transmitted BSSID or the second nontransmitted BSSID of the second multiple BSSID set for the second channel, wherein, when the another BSSID is the second transmitted BSSID, the fourth affiliated AP advertises a second common SSID for the first nontransmitted BSSID and the second transmitted BSSID over the second channel.

14. The communication method according to claim 13, wherein the nontransmitted BSSID profile includes another Multi-Link element for the another AP MLD, which is different from the Multi-Link element for the AP MLD.

15. The communication method according to claim 14, wherein the another Multi-Link element included in the nontransmitted BSSID profile carries information of the third affiliated AP and the fourth affiliated AP.

16. The communication method according to claim 11, wherein members of the first multiple BSSID set operate on the first channel and form a first virtual AP set, and members of the second multiple BSSID set operate on the second channel and form a second virtual AP set.

17. The communication method according to claim 11, wherein the Multi-Link element includes a common information field that carries the MLD MAC Address subfield of the AP MLD and a per-link information field that carries link information of the second affiliated AP.

18. The communication method according to claim 17, wherein the per-link information field includes a Link ID subfield and a nontransmitted BSSID information field.

19. The communication method according to claim 11, wherein the AP MLD comprises a third affiliated AP that corresponds to a third transmitted BSSID or a third nontransmitted BSSID belonging to a third multiple BSSID set for a third channel, and wherein the first affiliated AP advertises the first common SSID that is also common for the third BSSID over the first channel, and in case the third BSSID is the third transmitted BSSID, the third affiliated AP advertises the first common SSID over the third channel.

20. The communication method according to claim 19, wherein the Multi-Link element includes per-link information fields that carry link information of the second affiliated AP and the third affiliated AP.

* * * * *